US012675303B2

(12) United States Patent (10) Patent No.: US 12,675,303 B2
DeLonay (45) Date of Patent: Jul. 7, 2026

(54) ARTIFICIAL INTELLIGENCE GOVERNANCE NAVIGATOR

(71) Applicant: SAS Institute Inc., Cary, NC (US)

(72) Inventor: Allie Joelle DeLonay, Madison, WI (US)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 19/357,496

(22) Filed: Oct. 14, 2025

(65) Prior Publication Data

US 2026/0044354 A1 Feb. 12, 2026

Related U.S. Application Data

(63) Continuation-in-part of application No. 19/003,023, filed on Dec. 27, 2024, now Pat. No. 12,450,144, which is a continuation-in-part of application No. 18/445,673, filed on Aug. 7, 2024, now abandoned.

(60) Provisional application No. 63/805,691, filed on May 14, 2025.

(51) Int. Cl.
  *G06F 9/451* (2018.01)
  *G06F 9/54* (2006.01)

(52) U.S. Cl.
  CPC .............. *G06F 9/451* (2018.02); *G06F 9/542* (2013.01)

(58) Field of Classification Search
  CPC ................................. G06F 9/451; G06F 9/542
  See application file for complete search history.

(56) References Cited

U.S. PATENT DOCUMENTS

| | | | |
|---|---|---|---|
| 2022/0114289 A1* | 4/2022 | Te | G06F 30/10 |
| 2023/0127525 A1* | 4/2023 | Rai | G06N 3/045 |
| | | | 706/21 |
| 2023/0306087 A1* | 9/2023 | Krishnan | G06F 16/583 |
| 2024/0155181 A1* | 5/2024 | Kim | H04N 21/4147 |
| 2024/0248901 A1* | 7/2024 | Krishnan | G06F 16/24578 |
| 2025/0103039 A1* | 3/2025 | Bromfield | G05B 23/0283 |
| 2025/0166081 A1* | 5/2025 | Vidal | G06Q 40/08 |
| 2025/0245478 A1* | 7/2025 | Thakur | G06N 3/092 |
| 2025/0278903 A1* | 9/2025 | Siebel | G06N 3/044 |
| 2025/0284967 A1* | 9/2025 | Hurwood | G06N 3/0895 |

(Continued)

*Primary Examiner* — Tadesse Hailu

(74) *Attorney, Agent, or Firm* — COATS & BENNETT, PLLC

(57) ABSTRACT

A computing device displays a graphical user interface (GUI) comprising a navigator interface component. The navigator interface component comprises an interactive graphical representation of an asset. The device, responsive to detecting a predefined event, generates an alert. The device updates the navigator interface component to indicate the alert in association with the asset in the interactive graphical representation. The device receives a selection of the asset via the interactive graphical representation. The device displays, in the GUI, a second interactive graphical representation specific to the asset. The second interactive graphical representation of the asset comprises a task control element for controlling tasks specific to management of the asset. The device receives, using the task control element: a task for resolving the alert; and an association with the task and the asset. The device updates the navigator interface component to indicate the association with the task and the asset.

30 Claims, 66 Drawing Sheets
(35 of 66 Drawing Sheet(s) Filed in Color)

(56)  References Cited

U.S. PATENT DOCUMENTS

2025/0363420 A1* 11/2025 Kilmer ................. G06K 7/1417
2025/0370445 A1* 12/2025 Reaume ............. G05B 23/0248

* cited by examiner

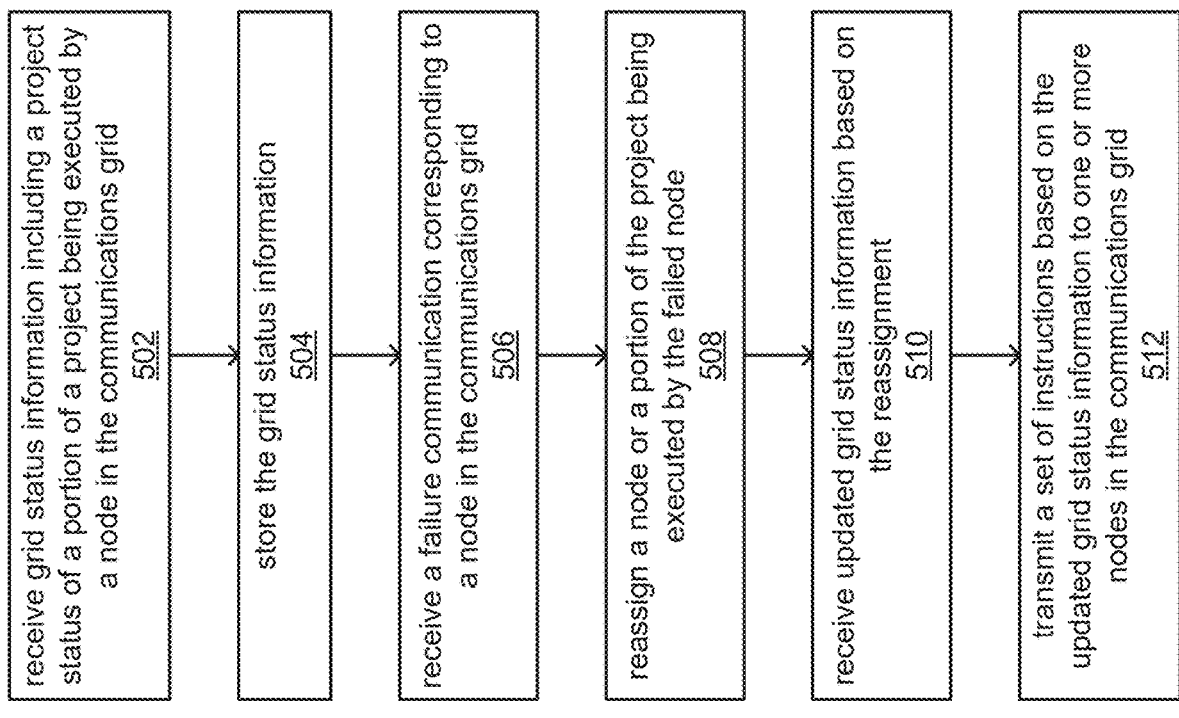

receive grid status information including a project status of a portion of a project being executed by a node in the communications grid
502 store the grid status information
504 receive a failure communication corresponding to a node in the communications grid
506 reassign a node or a portion of the project being executed by the failed node
508 receive updated grid status information based on the reassignment
510 transmit a set of instructions based on the updated grid status information to one or more nodes in the communications grid
512

500

FIG. 5 receive training data 1102 train machine-learning model using training data 1104 evaluate machine-learning model 1106 adequate accuracy? 1108 no yes receive new data 1110 analyze new data using trained machine-learning model 1112 post-processing on result 1114

1100

1300

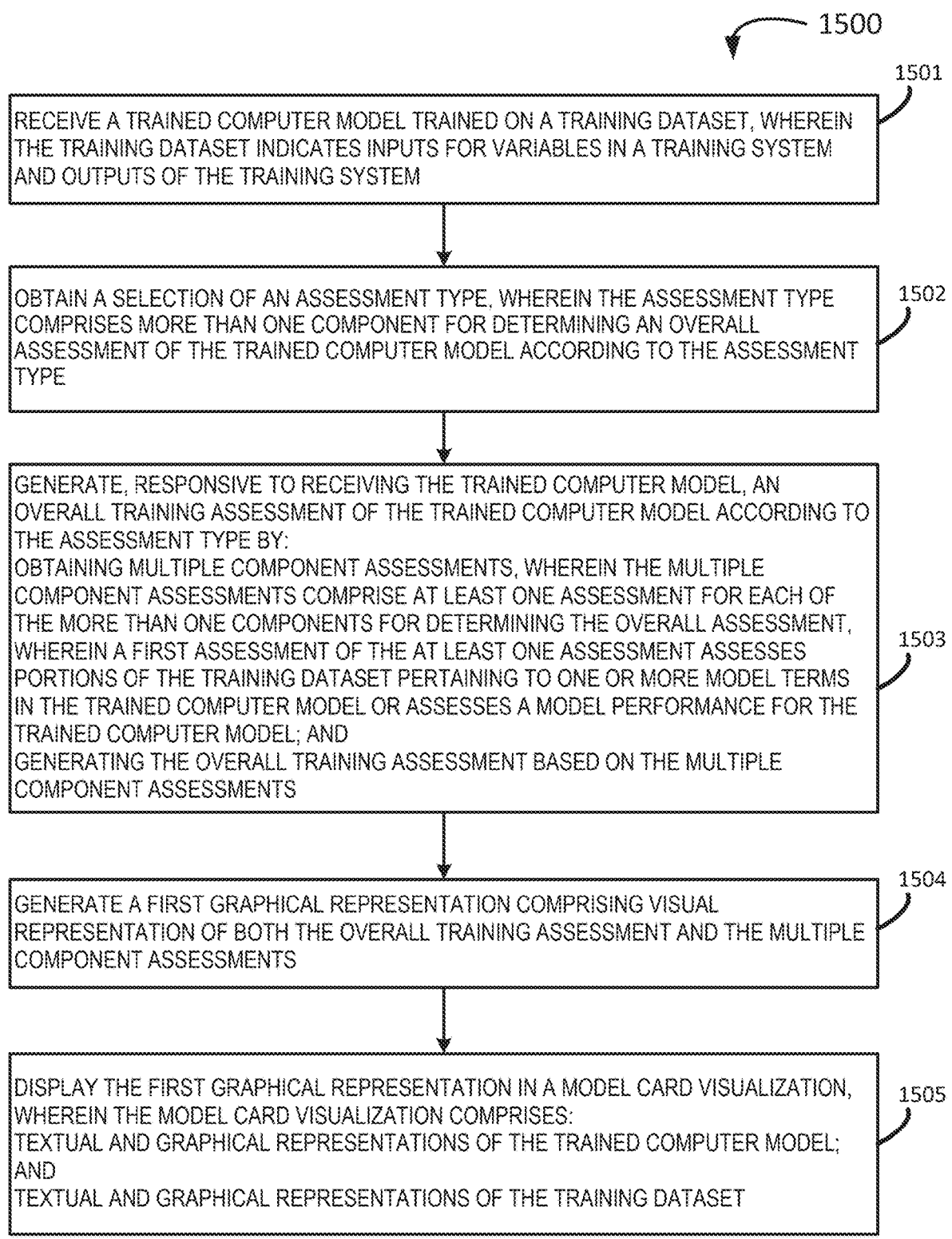

1500

1501
RECEIVE A TRAINED COMPUTER MODEL TRAINED ON A TRAINING DATASET, WHEREIN THE TRAINING DATASET INDICATES INPUTS FOR VARIABLES IN A TRAINING SYSTEM AND OUTPUTS OF THE TRAINING SYSTEM

1502
OBTAIN A SELECTION OF AN ASSESSMENT TYPE, WHEREIN THE ASSESSMENT TYPE COMPRISES MORE THAN ONE COMPONENT FOR DETERMINING AN OVERALL ASSESSMENT OF THE TRAINED COMPUTER MODEL ACCORDING TO THE ASSESSMENT TYPE

1503
GENERATE, RESPONSIVE TO RECEIVING THE TRAINED COMPUTER MODEL, AN OVERALL TRAINING ASSESSMENT OF THE TRAINED COMPUTER MODEL ACCORDING TO THE ASSESSMENT TYPE BY:
OBTAINING MULTIPLE COMPONENT ASSESSMENTS, WHEREIN THE MULTIPLE COMPONENT ASSESSMENTS COMPRISE AT LEAST ONE ASSESSMENT FOR EACH OF THE MORE THAN ONE COMPONENTS FOR DETERMINING THE OVERALL ASSESSMENT, WHEREIN A FIRST ASSESSMENT OF THE AT LEAST ONE ASSESSMENT ASSESSES PORTIONS OF THE TRAINING DATASET PERTAINING TO ONE OR MORE MODEL TERMS IN THE TRAINED COMPUTER MODEL OR ASSESSES A MODEL PERFORMANCE FOR THE TRAINED COMPUTER MODEL; AND
GENERATING THE OVERALL TRAINING ASSESSMENT BASED ON THE MULTIPLE COMPONENT ASSESSMENTS

1504
GENERATE A FIRST GRAPHICAL REPRESENTATION COMPRISING VISUAL REPRESENTATION OF BOTH THE OVERALL TRAINING ASSESSMENT AND THE MULTIPLE COMPONENT ASSESSMENTS

1505
DISPLAY THE FIRST GRAPHICAL REPRESENTATION IN A MODEL CARD VISUALIZATION, WHEREIN THE MODEL CARD VISUALIZATION COMPRISES:
TEXTUAL AND GRAPHICAL REPRESENTATIONS OF THE TRAINED COMPUTER MODEL; AND
TEXTUAL AND GRAPHICAL REPRESENTATIONS OF THE TRAINING DATASET

Admit to Hospital

| Data | Pipelines | Pipeline Comparison | Insights |

1692

| Variable Name | Type | Role | Assess for Bias ↓ | Level | Order |
|---|---|---|---|---|---|
| gender | Character | Rejected | ✓ | Nominal | Default |
| race | Character | Rejected | ✓ | Nominal | Default |
| admit | Character | Target | | Binary | Default |
| admit_prob | Numeric | Rejected | | Interval | Default |
| age | Numeric | Input | | Interval | Default |
| arrival_mode | Character | Input | | Nominal | Default |
| bmi | Numeric | Input | | Interval | Default |
| chief_complaint | Character | Input | | Nominal | Default |

Filter

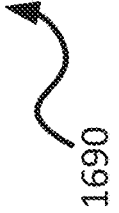

Fairness Assessment

Assess for bias variable: gender ▿

Prediction Bias    Performance Bias

Metric ◉    True positive rate (TPR) ▿
Misclassification rate (MCE)
True Posit    Multi-class log loss (MCLL)    vels
True Positi    True positive rate (TPR)

Parity: 0.08

0.125
0.100
0.075
0.050
0.025
0.000

Female    Male    Other

Variable Level

1970

Figure 21:
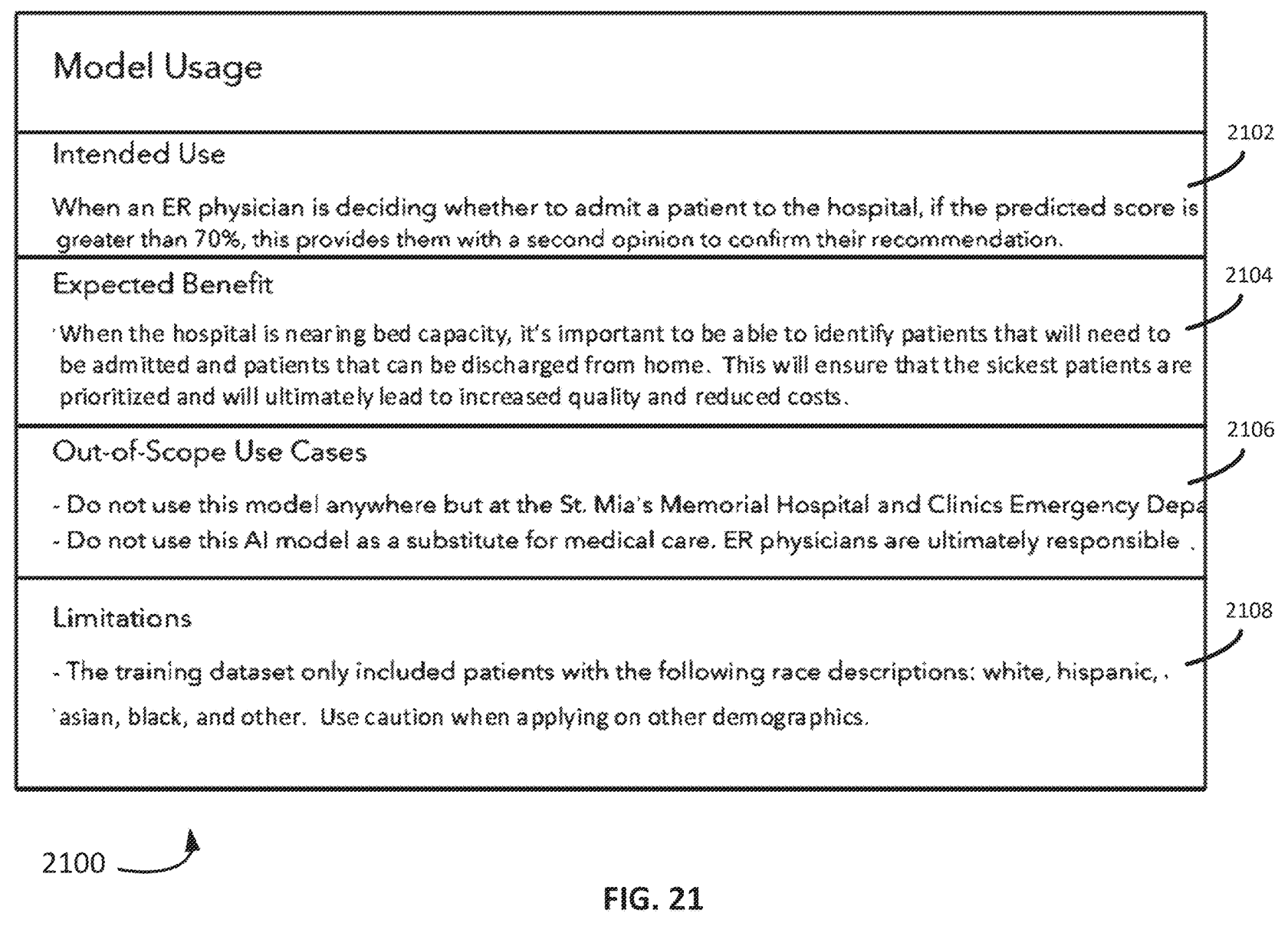

Model Usage

Intended Use — 2102

When an ER physician is deciding whether to admit a patient to the hospital, if the predicted score is greater than 70%, this provides them with a second opinion to confirm their recommendation.

Expected Benefit — 2104

When the hospital is nearing bed capacity, it's important to be able to identify patients that will need to be admitted and patients that can be discharged from home. This will ensure that the sickest patients are prioritized and will ultimately lead to increased quality and reduced costs.

Out-of-Scope Use Cases — 2106

- Do not use this model anywhere but at the St. Mia's Memorial Hospital and Clinics Emergency Depa
- Do not use this AI model as a substitute for medical care. ER physicians are ultimately responsible .

Limitations — 2108

- The training dataset only included patients with the following race descriptions: white, hispanic, , asian, black, and other. Use caution when applying on other demographics.

Figures 22B, 22C:
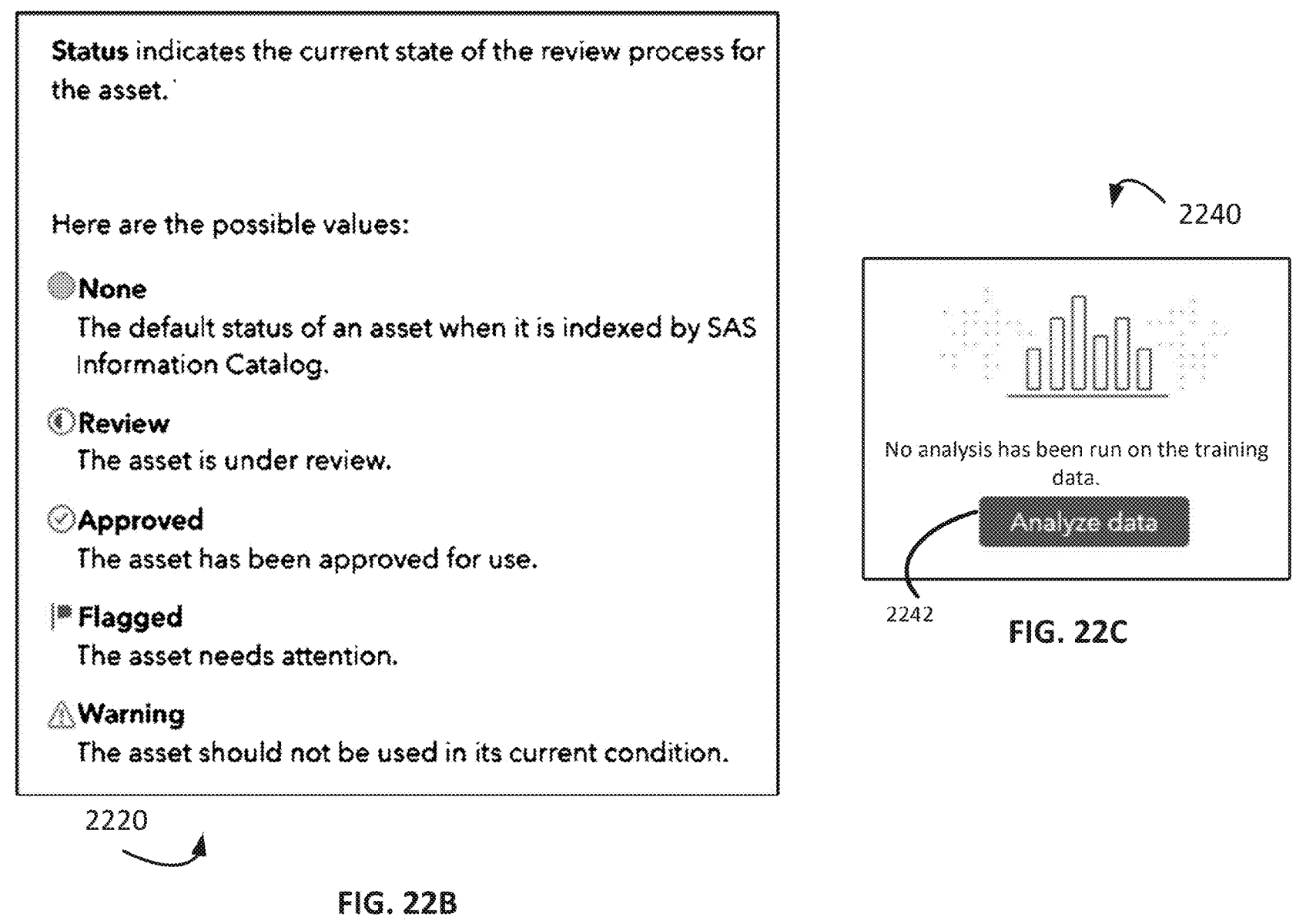

No analysis has been run on the training data.

Analyze data

Status indicates the current state of the review process for the asset.

Here are the possible values:

● None
The default status of an asset when it is indexed by SAS Information Catalog.

◉ Review
The asset is under review.

◇ Approved
The asset has been approved for use.

▓ Flagged
The asset needs attention.

⚠ Warning
The asset should not be used in its current condition.

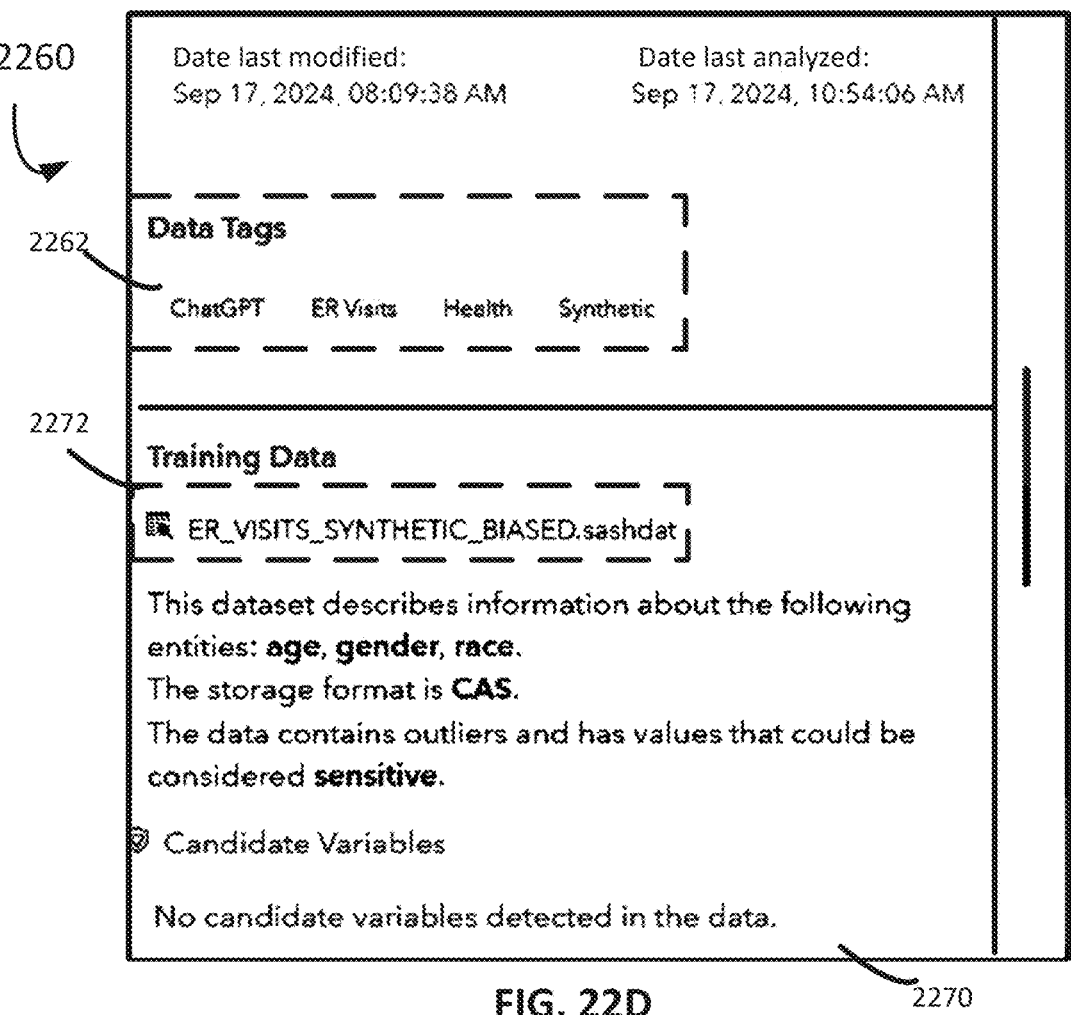

2262

Data Tags

ChatGPT      ER Visits      Health      Synthetic

2272

Training Data

🖹 ER_VISITS_SYNTHETIC_BIASED.sashdat

This dataset describes information about the following entities: age, gender, race.
The storage format is CAS.
The data contains outliers and has values that could be considered sensitive.

🛡 Candidate Variables

No candidate variables detected in the data.

Choose Tags

Asset:    ER_VISITS_SYNTHETIC_BIASED

Selected tags:

| Synthetic ✕ |    | Healthcare ✕ |    | ER Visits ✕ |

🔍 Filter

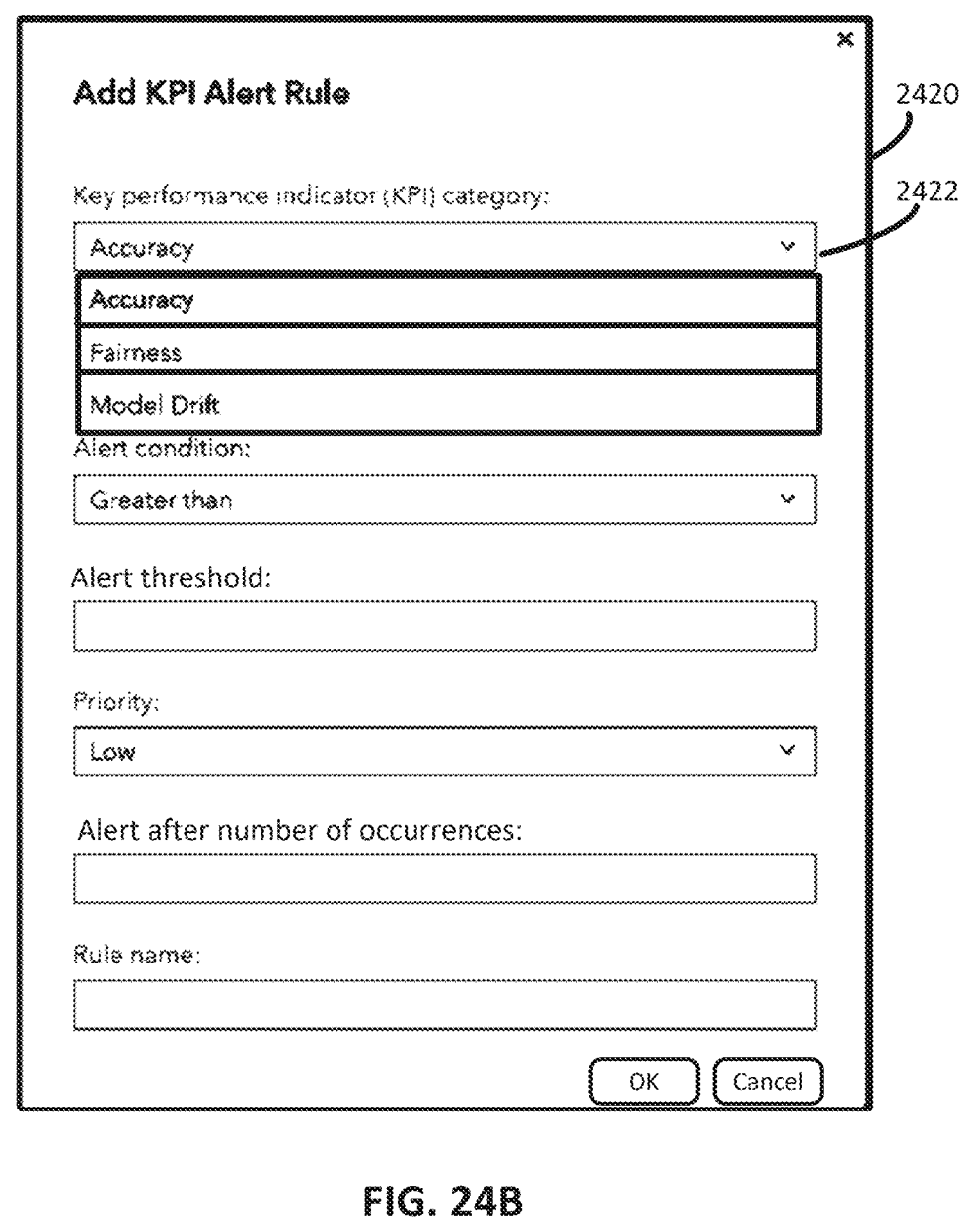

Add KPI Alert Rule

2420

Key performance indicator (KPI) category:

2422

Accuracy

Accuracy

Fairness

Model Drift

Alert condition:

Greater than

Alert threshold:

Priority:

Low

Alert after number of occurrences:

Rule name:

OK    Cancel

FIG. 24B

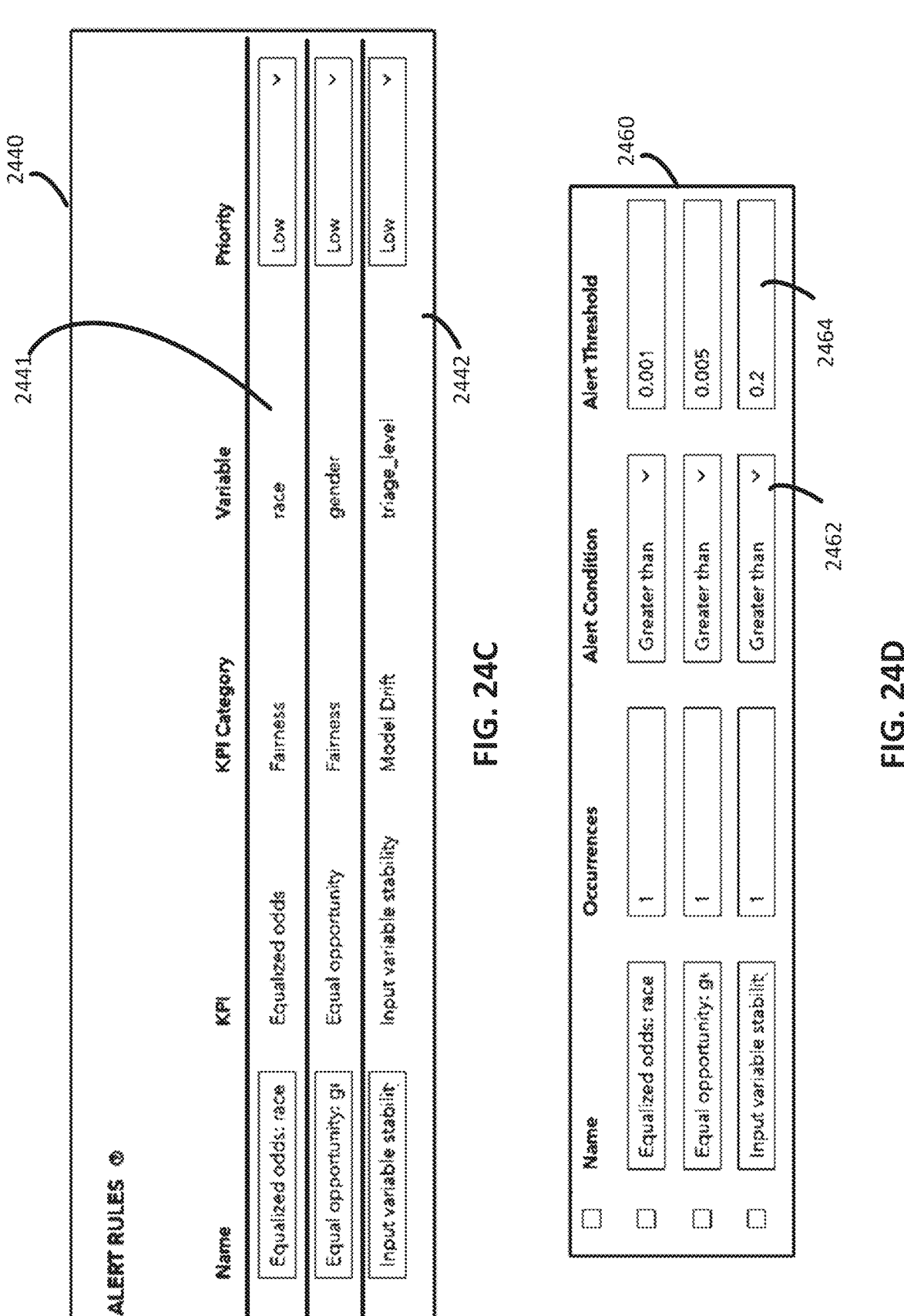

KPI ALERT RULES ⊕

| | Name | KPI | KPI Category | Variable | Priority |
|---|---|---|---|---|---|
| ☐ | | | | | |
| ☐ | Equalized odds: race | Equalized odds | Fairness | race | Low ⌄ |
| ☐ | Equal opportunity: ge | Equal opportunity | Fairness | gender | Low ⌄ |
| ☐ | Input variable stabilit | Input variable stability | Model Drift | triage_level | Low ⌄ |

| | Name | Occurrences | Alert Condition | Alert Threshold |
|---|---|---|---|---|
| ☐ | | | | |
| ☐ | Equalized odds: race | 1 | Greater than ⌄ | 0.001 |
| ☐ | Equal opportunity: ge | 1 | Greater than ⌄ | 0.005 |
| ☐ | Input variable stabilit | 1 | Greater than ⌄ | 0.2 |

(none) ⌄

Family name ⌄

| Remediate (1) | > | ✓ Family name |
| Open | | Choose other... |
| Search semantic type | | Unassign |

2580

2582

Classifications > *Age

◈ *Age

Name:

Age

Set information privacy: ⊚
○ None
○ Candidate
◉ Sensitive
○ Private

Description:

An individual's age in years.

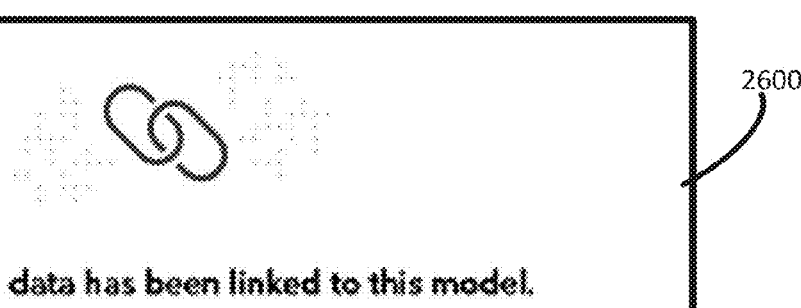

2600

No training data has been linked to this model.

Select a training table on the Properties tab of this model.

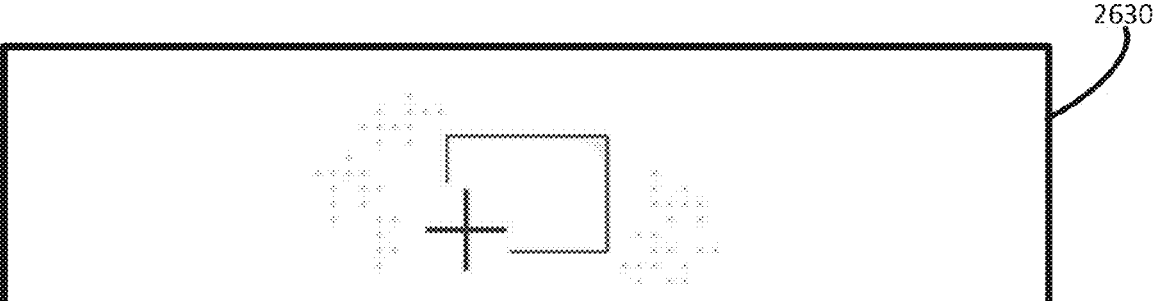

Model usage information is not available.

You can specify the model usage information on the Properties tab of this model.

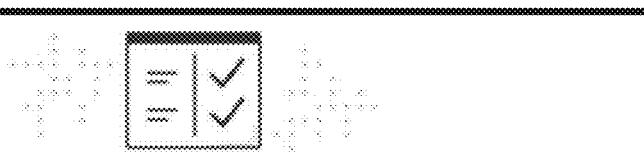

Model audit results are not available.

You must define and run the performance monitoring criteria for this model on the Performance tab of the project that contains it to view the model audit results.

FIG. 26C

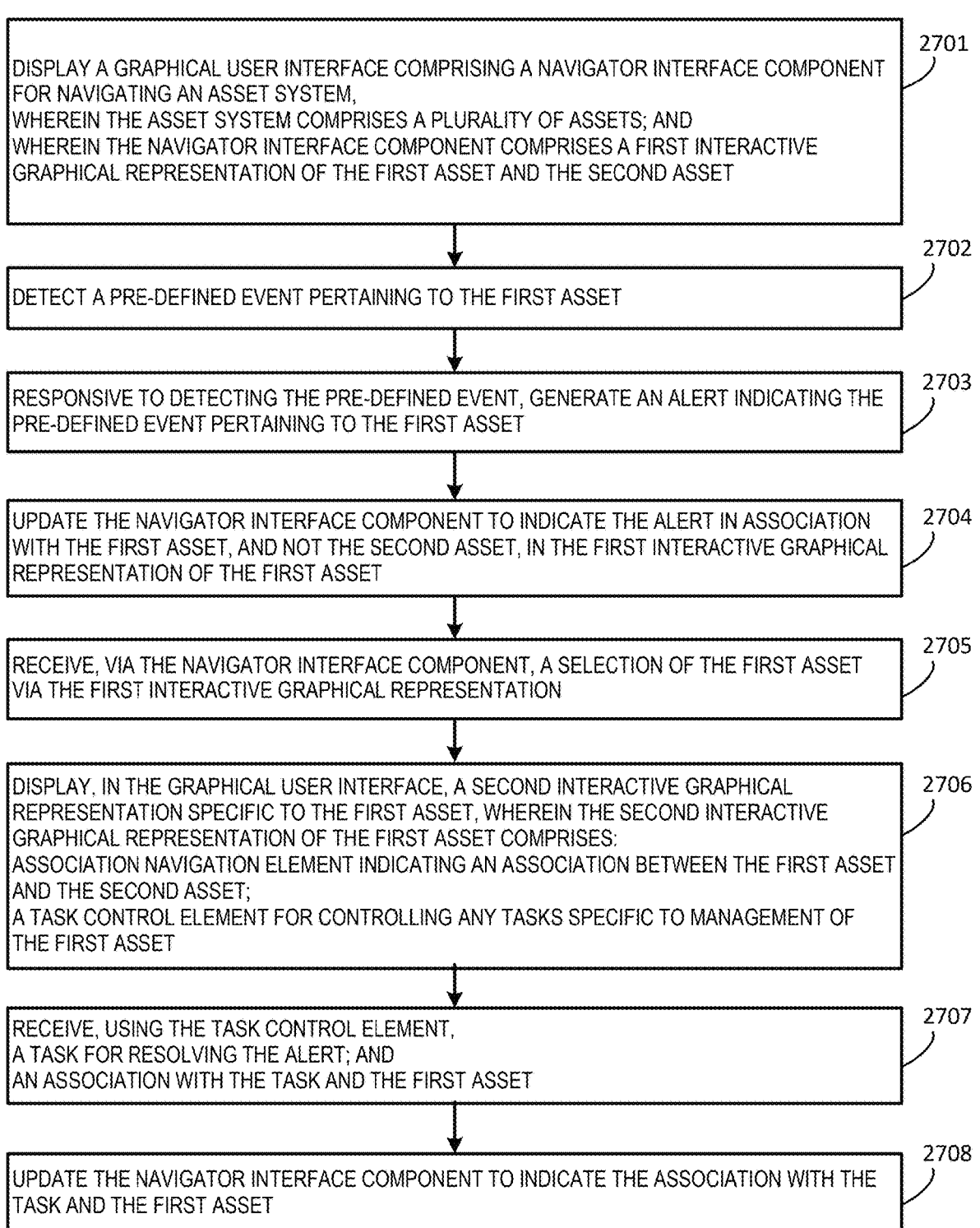

2701
DISPLAY A GRAPHICAL USER INTERFACE COMPRISING A NAVIGATOR INTERFACE COMPONENT FOR NAVIGATING AN ASSET SYSTEM,
WHEREIN THE ASSET SYSTEM COMPRISES A PLURALITY OF ASSETS; AND
WHEREIN THE NAVIGATOR INTERFACE COMPONENT COMPRISES A FIRST INTERACTIVE GRAPHICAL REPRESENTATION OF THE FIRST ASSET AND THE SECOND ASSET

2702
DETECT A PRE-DEFINED EVENT PERTAINING TO THE FIRST ASSET

2703
RESPONSIVE TO DETECTING THE PRE-DEFINED EVENT, GENERATE AN ALERT INDICATING THE PRE-DEFINED EVENT PERTAINING TO THE FIRST ASSET

2704
UPDATE THE NAVIGATOR INTERFACE COMPONENT TO INDICATE THE ALERT IN ASSOCIATION WITH THE FIRST ASSET, AND NOT THE SECOND ASSET, IN THE FIRST INTERACTIVE GRAPHICAL REPRESENTATION OF THE FIRST ASSET

2705
RECEIVE, VIA THE NAVIGATOR INTERFACE COMPONENT, A SELECTION OF THE FIRST ASSET VIA THE FIRST INTERACTIVE GRAPHICAL REPRESENTATION

2706
DISPLAY, IN THE GRAPHICAL USER INTERFACE, A SECOND INTERACTIVE GRAPHICAL REPRESENTATION SPECIFIC TO THE FIRST ASSET, WHEREIN THE SECOND INTERACTIVE GRAPHICAL REPRESENTATION OF THE FIRST ASSET COMPRISES:
ASSOCIATION NAVIGATION ELEMENT INDICATING AN ASSOCIATION BETWEEN THE FIRST ASSET AND THE SECOND ASSET;
A TASK CONTROL ELEMENT FOR CONTROLLING ANY TASKS SPECIFIC TO MANAGEMENT OF THE FIRST ASSET

2707
RECEIVE, USING THE TASK CONTROL ELEMENT,
A TASK FOR RESOLVING THE ALERT; AND
AN ASSOCIATION WITH THE TASK AND THE FIRST ASSET

2708
UPDATE THE NAVIGATOR INTERFACE COMPONENT TO INDICATE THE ASSOCIATION WITH THE TASK AND THE FIRST ASSET

*FIG. 27*

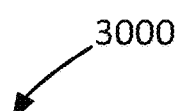

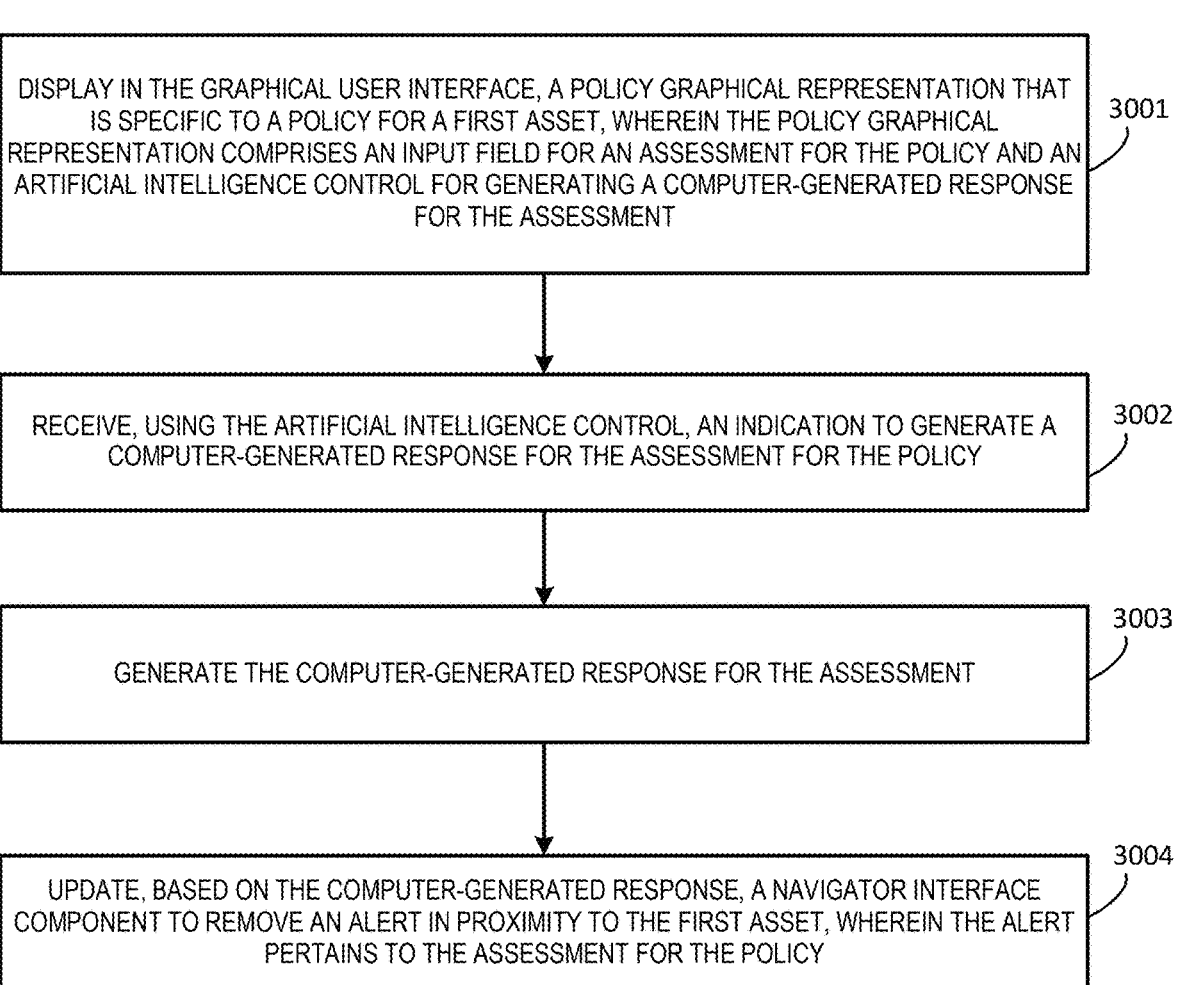

DISPLAY IN THE GRAPHICAL USER INTERFACE, A POLICY GRAPHICAL REPRESENTATION THAT IS SPECIFIC TO A POLICY FOR A FIRST ASSET, WHEREIN THE POLICY GRAPHICAL REPRESENTATION COMPRISES AN INPUT FIELD FOR AN ASSESSMENT FOR THE POLICY AND AN ARTIFICIAL INTELLIGENCE CONTROL FOR GENERATING A COMPUTER-GENERATED RESPONSE FOR THE ASSESSMENT

3001

RECEIVE, USING THE ARTIFICIAL INTELLIGENCE CONTROL, AN INDICATION TO GENERATE A COMPUTER-GENERATED RESPONSE FOR THE ASSESSMENT FOR THE POLICY

3002

GENERATE THE COMPUTER-GENERATED RESPONSE FOR THE ASSESSMENT

3003

UPDATE, BASED ON THE COMPUTER-GENERATED RESPONSE, A NAVIGATOR INTERFACE COMPONENT TO REMOVE AN ALERT IN PROXIMITY TO THE FIRST ASSET, WHEREIN THE ALERT PERTAINS TO THE ASSESSMENT FOR THE POLICY

Linked Use Cases (64)

∇ Filter

| Use case name | Number of alerts |
|---|---|
| AI-Powered Customer Service Chatbot Implementa... | ⓘ 10 |
| AI-Driven Risk Assessment and Management | ⓘ 6 |
| Automated Compliance Monitoring | ⓘ 4 |
| Automated Customer Sentiment Analysis | ⓘ 1 |
| Automated Invoice Processing | ⓘ 1 |
| Automated Code Review and Quality Assurance | 0 |
| Automated Report Generation from Raw Data | 0 |
| Automated Quality Metrics Dashboard | 0 |
| Automated Vendor Performance Assessment | 0 |
| Contract Lifecycle Management Automation | 0 |
| Dynamic Pricing Strategy Implementation | 0 |
| Automated Report Generation from Raw Data | 0 |
| Employee Onboarding Automation | 0 |
| Fraud Detection in Financial Transactions | 0 |

Policy Questions

| Question | Required | Level | Topic | Classification |
|---|---|---|---|---|
| 1. Does your technology qualify as an "AI System" under the EU AI Act? | ☒ | ✿ | Accuracy and Robustness | High-risk use cases on |
| 2. Does your technology qualify as a "General Purpose AI Model"? | ☒ | ✿ | Accuracy and Robustness | High-risk use cases on |
| 3. Does your technology qualify as a "General Purpose AI System"? | ☒ | ✿ | Accuracy and Robustness | High-risk use cases on |
| 4. Is there an exception which takes your entity outside the scope of the law? | ☒ | ✿ | Accuracy and Robustness | High-risk use cases on |
| 5. Does your AI system fall into the prohibition regarding harmful manipulation or deception? | ☒ | ✿ | Accuracy and Robustness | High-risk use cases on |
| 6. Does your AI system fall into the prohibition regarding social scoring? | ☒ | ✿ | Data Management | High-risk use cases on |
| 7. Does your AI system fall into the prohibition regarding individual criminal offence risk assessment? | ☒ | ✿ | Data Management | High-risk use cases on |
| 8. Does your AI system fall into the prohibition of biometric information? | ☒ | ✿ | Data Management | High-risk use cases on |
| 9. Does your organization take steps to mitigate risk? | ☒ | ✿ | Data Management | High-risk use cases on |
| 10. Does your technology qualify as an "AI System" under the EU AI Act? | ☒ | ✿ | Data Management | High-risk use cases on |
| 11. As part of the design specifications of the system, provide the main classification choices. | ☒ | ✿ | Data Management | High-risk use cases on |
| 12. Does your organization take steps to mitigate risk? | ☒ | ✿ | Data Management | High-risk use cases on |
| 13. Does your technology qualify as an "AI System" under the EU AI Act? | ☒ | ✿ | Data Management | High-risk use cases on |
| 14. Does your technology qualify as a "General Purpose AI Model"? | | ✿ | Data Management | High-risk use cases on |
| 15. Does your technology qualify as a "General Purpose AI System"? | | ✿ | Data Management | High-risk use cases on |
| 16. Is there an exception which takes your entity outside the scope of the law? | | ✿ | Data Management | High-risk use cases on |
| 17. Does your AI system fall into the prohibition regarding harmful manipulation or deception? | | ✿ | Model Performance | High-risk use cases on |
| 18. Does your AI system fall into the prohibition regarding social scoring? | | ✿ | Model Performance | High-risk use cases on |
| 19. Does your AI system fall into the prohibition regarding individual criminal offence risk assessme... | | 🔒 | Organization-level | High-risk use cases on |
| 20. Does your AI system fall into the prohibition of biometric information? | | 🔒 | Organization-level | High-risk use cases on |

Search 1 to 20 of 685    Page 1 of 32

ARTIFICIAL INTELLIGENCE GOVERNANCE NAVIGATOR

CROSS-REFERENCE TO RELATED APPLICATIONS

This application is a continuation-in-part of U.S. application Ser. No. 19/003,023, filed Dec. 27, 2024, which is a continuation-in-part of U.S. application Ser. No. 18/445,673, filed Aug. 7, 2024. This application claims the benefit of, and priority based on, 35 U.S.C. § 119 to U.S. Provisional Application No. 63/805,691, filed May 14, 2025, the disclosures of each of which are incorporated herein by reference in their entirety.

BACKGROUND

Computer models can be used in a variety of different ways. For example, a computer model can be used in an artificial intelligence system where context or logic is used for one or more computer models in the system. For instance, the artificial intelligence system could be a system of computer models to predict needed supplies for packaging in manufacturing, and the context could look at the type of manufactured products (e.g., if the majority of products currently manufactured at a plant are full-size refrigerators, then use a first computer model of the AI system, and if the majority currently are mini-sized refrigerators, then use a second computer model of the AI system). As another example, a computer model can be used in a use case where a computer model is applied. For instance, a computer model could apply to facial recognition, and the use case could relate to a particular application stored on a mobile device using the facial recognition computer model. As another example, a computer model can be used by a computing agent that performs an action using the computer model. For instance, the computing agent uses a computer model to predict a best location to travel and then the computing agent reserves a hotel according to the computer model prediction. Asset systems can store information pertaining to different computer models (e.g., computer model information, use cases, agents, and artificial intelligence systems).

Model cards can be tools used to provide transparency into how a model should be used such as providing intended use, or potential limitations for use, of a model. Model cards can, for example, accompany a computer model in files of the computer model (e.g., in a metadata file).

SUMMARY

In an example embodiment, a computer-program product tangibly embodied in a non-transitory machine-readable storage medium is provided. The computer-program product includes instructions operable to cause a computing system to receive a trained computer model trained on a training dataset. The training dataset indicates inputs for variables in a training system and outputs of the training system. The computer-program product includes instructions operable to cause the computing system to obtain a selection of an assessment type. The assessment type comprises more than one component for determining an overall assessment of the trained computer model according to the assessment type. The computer-program product includes instructions operable to cause the computing system to generate, responsive to receiving the trained computer model, an overall training assessment of the trained computer model according to the assessment type. For example, the computing system can generate by obtaining multiple component assessments. The multiple component assessments comprise at least one assessment for each of the more than one components for determining the overall assessment. A first assessment of the at least one assessment assesses elements of the training dataset pertaining to one or more model terms in the trained computer model or assesses a model performance for the trained computer model. The computing system can generate by generating the overall training assessment based on the multiple component assessments. The computer-program product includes instructions operable to cause the computing system to generate a first graphical representation comprising visual representation of both the overall training assessment and the multiple component assessments. The computer-program product includes instructions operable to cause the computing system to display the first graphical representation in a model card visualization. The model card visualization can include textual and graphical representations of the trained computer model, and textual and graphical representations of the training dataset.

In another example embodiment, a computing device is provided. The computing device includes, but is not limited to, a processor and memory. The memory contains instructions that when executed by the processor control the computing device to generate and display a graphical representation in a model card.

In another example embodiment, a method of generating and displaying a graphical representation in a model card is provided.

In another example embodiment, a computer-program product tangibly embodied in a non-transitory machine-readable storage medium is provided. The computer-program product includes instructions to cause a computing system to display a graphical user interface comprising a navigator interface component for navigating an asset system. The asset system comprises a plurality of assets. The plurality of assets includes a first asset and a second asset. The navigator interface component comprises a first interactive graphical representation of the first asset and the second asset. The computer-program product includes instructions to cause a computing system to detect a predefined event pertaining to the first asset. The computer-program product includes instructions to, responsive to detecting the predefined event, generate an alert indicating the predefined event pertaining to the first asset. The computer-program product includes instructions to update the navigator interface component to indicate the alert in association with the first asset, and not the second asset, in the first interactive graphical representation. The computer-program product includes instructions to receive, via the navigator interface component, a selection of the first asset via the first interactive graphical representation. The computer-program product includes instructions to display, in the graphical user interface, a second interactive graphical representation specific to the first asset. The second interactive graphical representation of the first asset comprises: association navigation element indicating an association between the first asset and the second asset; and a task control element for controlling any tasks specific to management of the first asset. The computer-program product includes instructions to receive, using the task control element: a task for resolving the alert; and an association with the task and the first asset. The computer-program product includes instructions to update the navigator interface component to indicate the association with the task and the first asset.

In another example embodiment, a computing system is provided. The computing system includes, but is not limited to, a processor and memory. The memory contains instructions that when executed by the processor control the computing system to update the navigator interface component.

In another example embodiment, a method of updating the navigator interface component is provided.

Other features and aspects of example embodiments are presented below in the Detailed Description when read in connection with the drawings presented with this application.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 5 illustrates a flow chart showing an example process for adjusting a communications grid or a work project in a communications grid after a failure of a node, according to some embodiments of the present technology.

FIG. 15 illustrates a flow diagram for displaying a model card visualization according to at least one embodiment of the present technology.

FIGS. 16A-16D illustrate graphical user interface(s) for generating a model card according to at least one embodiment of the present technology.

FIG. 21 illustrates graphical user interface model usage element(s) of a model card according to at least one embodiment of the present technology.

FIGS. 22A-22E illustrate graphical user interface(s) pertaining to a data summary element of a model card according to at least one embodiment of the present technology.

FIGS. 24A-24F illustrate graphical user interface model audit element(s) of a model card according to at least one embodiment of the present technology.

FIGS. 26A-26C illustrate graphical user interface element(s) for messages in a model card according to at least one embodiment of the present technology.

FIG. 27 illustrates a flow diagram for controlling a navigator interface component according to at least one embodiment of the present technology.

FIG. 30 illustrates a flow diagram for artificial interface control according to at least one embodiment of the present technology.

FIGS. 31A-31C illustrate portions of a graphical user interface pertaining to a policy applied to a use case of an asset system according to at least one embodiment of the present technology.

DETAILED DESCRIPTION

In the following description, for the purposes of explanation, specific details are set forth in order to provide a thorough understanding of embodiments of the technology. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the example embodiments will provide those skilled in the art with an enabling description for implementing an example embodiment. It should be understood that various changes may be made in the function and arrangement of elements without departing from the spirit and scope of the technology as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional operations not included in a figure. A process may correspond to a method, a function, a procedure, a subroutine, a subprogram, etc. When a process corresponds to a function, its termination can correspond to a return of the function to the calling function or the main function.

Systems depicted in some of the figures may be provided in various configurations. In some embodiments, the systems may be configured as a distributed system where one or more components of the system are distributed across one or more networks in a cloud computing system.

Figure 1:
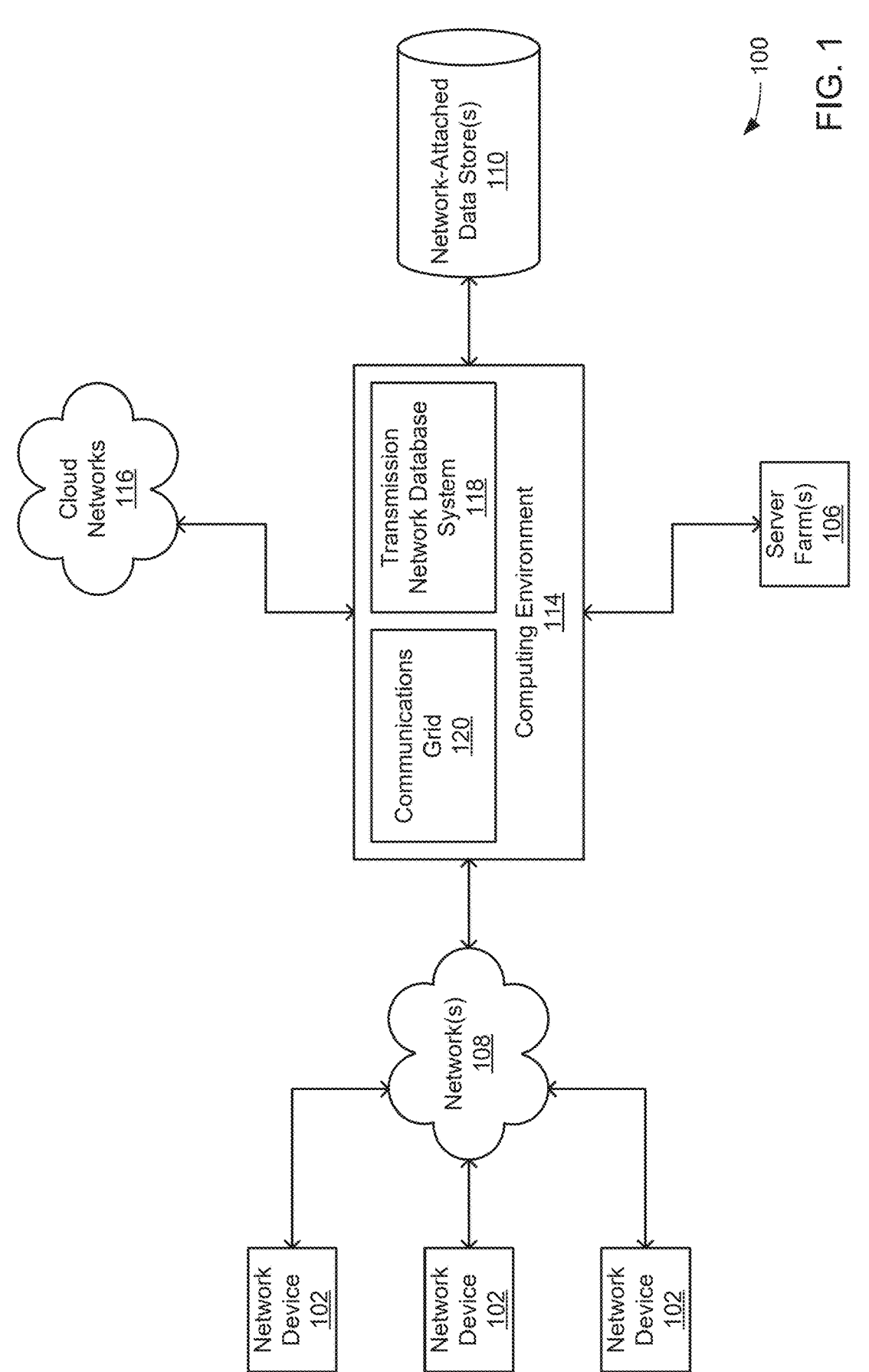
FIG. 1 illustrates a block diagram that provides an illustration of the hardware components of a computing system, according to some embodiments of the present technology.

FIG. 1 is a block diagram that provides an illustration of the hardware components of a data transmission network 100, according to embodiments of the present technology. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. Data transmission network 100 also includes one or more network devices 102. Network devices 102 may include client devices that attempt to communicate with computing environment 114. For example, network devices 102 may send data to the computing environment 114 to be processed, may send signals to the computing environment 114 to control different aspects of the computing environment or the data it is processing, among other reasons. Network devices 102 may interact with the computing environment 114 through a number of ways, such as, for example, over one or more networks 108. As shown in FIG. 1, computing environment 114 may include one or more other systems. For example, computing environment 114 may include a database system 118 and/or a communications grid 120.

Figure 8:
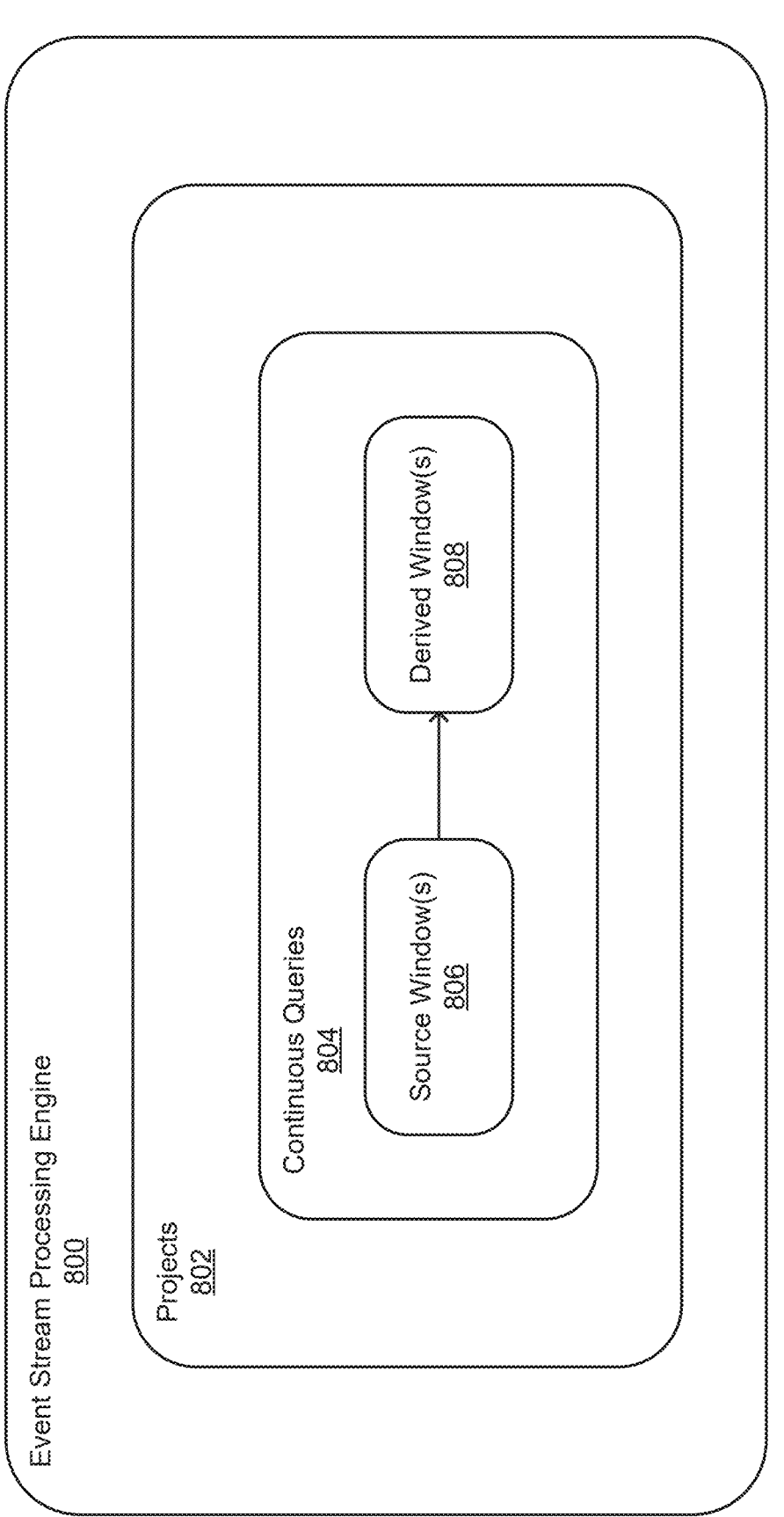
FIG. 8 illustrates a block diagram including components of an Event Stream Processing Engine (ESPE), according to embodiments of the present technology.
Figure 9:
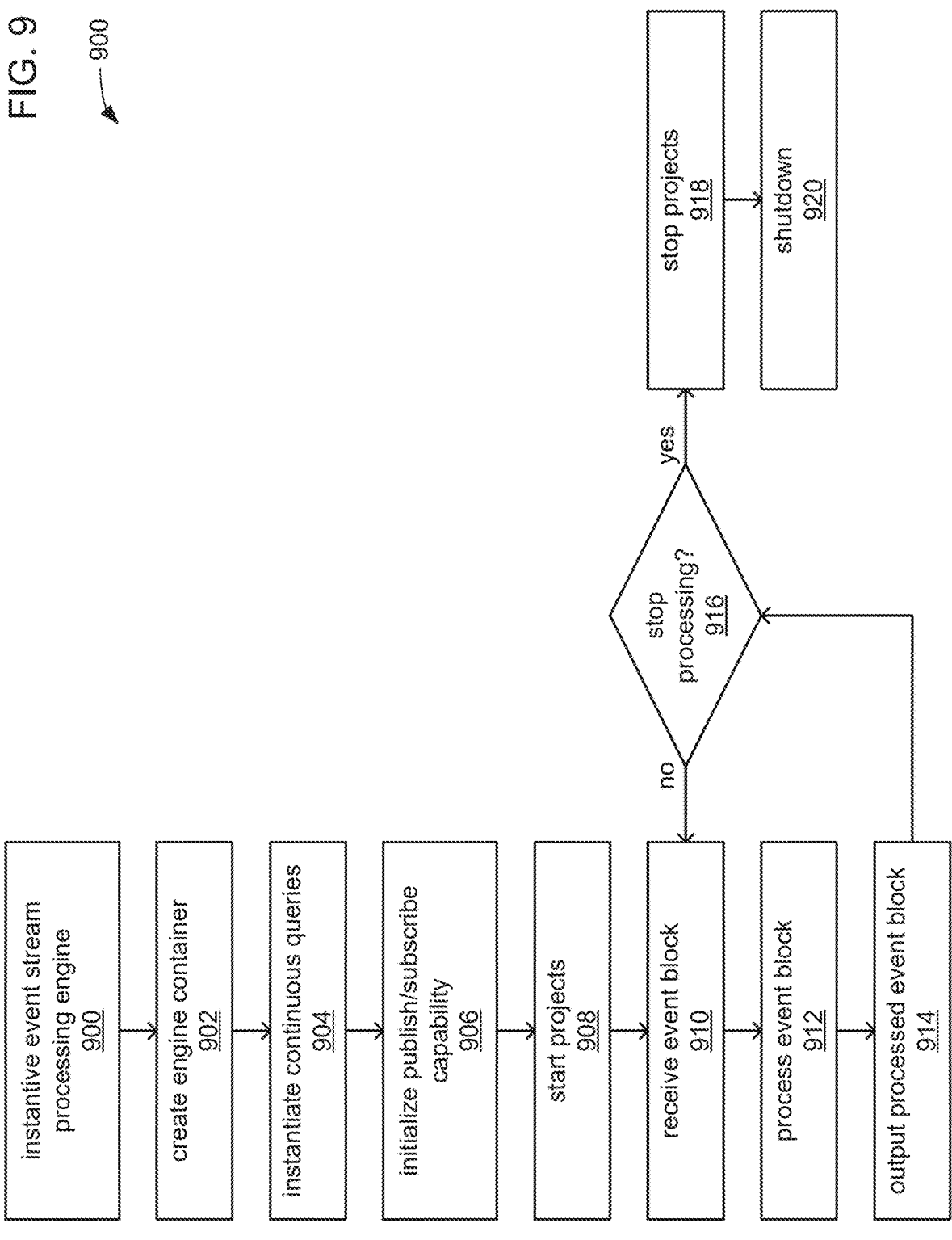
FIG. 9 illustrates a flow chart showing an example process including operations performed by an event stream processing engine, according to some embodiments of the present technology.
Figure 10:
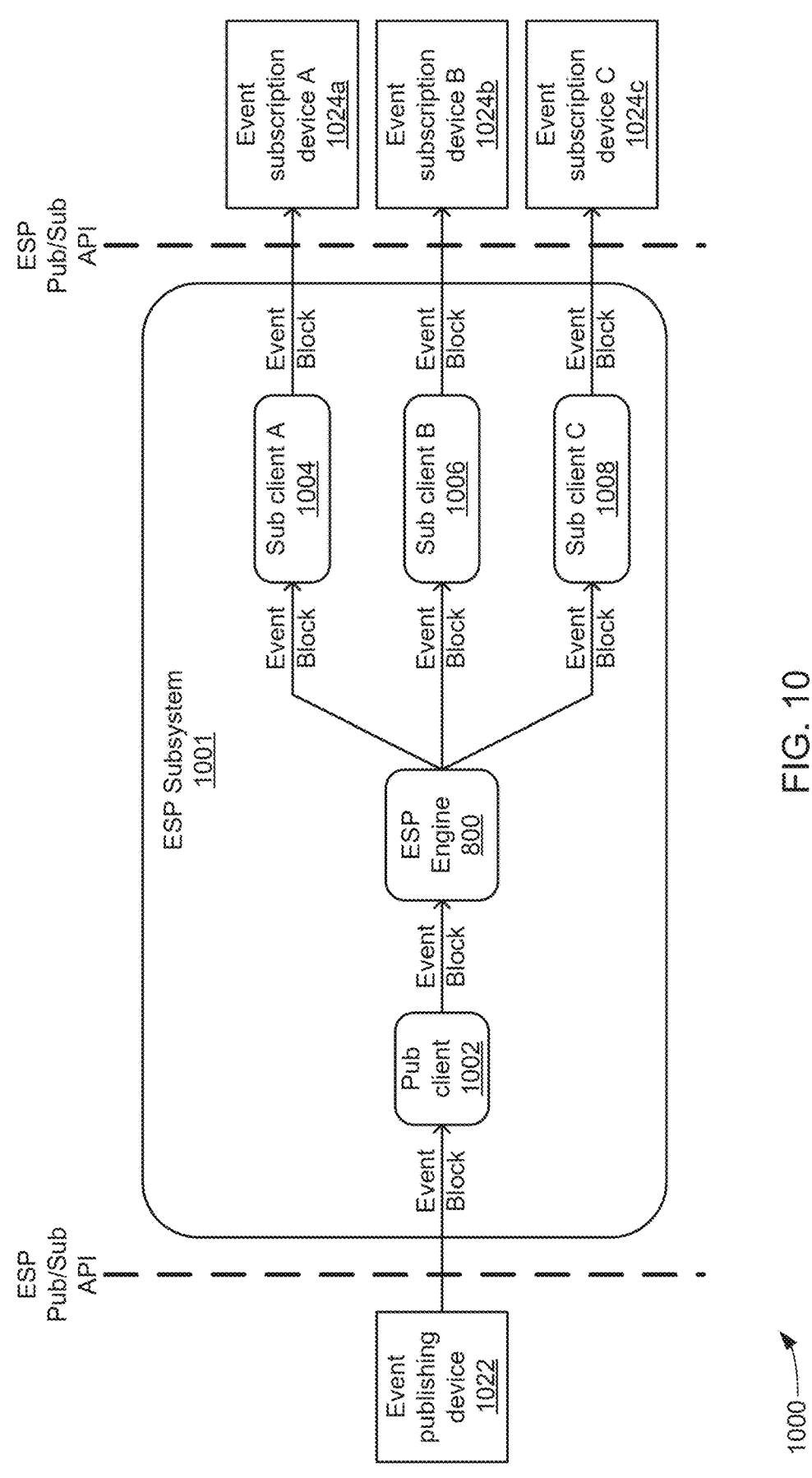
FIG. 10 illustrates an ESP system interfacing between a publishing device and multiple event subscribing devices, according to embodiments of the present technology.

In other embodiments, network devices may provide a large amount of data, either all at once or streaming over a period of time (e.g., using event stream processing (ESP), described further with respect to FIGS. 8-10), to the computing environment 114 via networks 108. For example, network devices 102 may include network computers, sensors, databases, or other devices that may transmit or otherwise provide data to computing environment 114. For example, network devices may include local area network devices, such as routers, hubs, switches, or other computer networking devices. These devices may provide a variety of stored or generated data, such as network data or data specific to the network devices themselves. Network devices may also include sensors that monitor their environment or other devices to collect data regarding that environment or those devices, and such network devices may provide data they collect over time. Network devices may also include devices within the internet of things, such as devices within a home automation network. Some of these devices may be referred to as edge devices and may involve edge computing circuitry. Data may be transmitted by network devices directly to computing environment 114 or to network-attached data stores, such as network-attached data stores 110 for storage so that the data may be retrieved later by the computing environment 114 or other portions of data transmission network 100.

Data transmission network 100 may also include one or more network-attached data stores 110. Network-attached data stores 110 are used to store data to be processed by the computing environment 114 as well as any intermediate or final data generated by the computing system in non-volatile memory. However, in certain embodiments, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated on-the-fly. In this non-limiting situation, the computing environment 114 may be configured to retain the processed information within memory so that responses can be generated for the user at different levels of detail as well as allow a user to interactively query against this information.

Network-attached data stores may store a variety of different types of data organized in a variety of different ways and from a variety of different sources. For example, network-attached data storage may include storage other than primary storage located within computing environment 114 that is directly accessible by processors located therein. Network-attached data storage may include secondary, tertiary or auxiliary storage, such as large hard drives, servers, virtual memory, among other types. Storage devices may include portable or non-portable storage devices, optical storage devices, and various other mediums capable of storing, or containing data. A machine-readable storage medium or computer-readable storage medium may include a non-transitory medium in which data can be stored and that does not include carrier waves and/or transitory electronic signals. Examples of a non-transitory medium may include, for example, a magnetic disk or tape, optical storage media such as compact disk or digital versatile disk, flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data, such as manufacturing data (e.g., a database containing records identifying products being manufactured with parameter data for each product, such as colors and models) or product sales databases (e.g., a database containing individual data records identifying details of individual product sales).

The unstructured data may be presented to the computing environment 114 in different forms such as a flat file or a conglomerate of data records and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time stamped data may be aggregated by time (e.g., into daily time period units) to generate time series data and/or structured hierarchically according to one or more dimensions (e.g., parameters, attributes, and/or variables). For example, data may be stored in a hierarchical data structure, such as a ROLAP or MOLAP database, or may be stored in another tabular form, such as in a flat-hierarchy form.

Data transmission network 100 may also include one or more server farms 106. Computing environment 114 may route select communications or data to the one or more sever farms 106 or one or more servers within the server farms. Server farms 106 can be configured to provide information in a predetermined manner. For example, server farms 106 may access data to transmit in response to a communication. Server farms 106 may be separately housed from each other device within data transmission network 100, such as computing environment 114, and/or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain embodiments, services provided by the cloud network 116 may include a host of services that are made available to users of the cloud infrastructure system on demand. Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network can dynamically scale to meet the needs of its users. The cloud network 116 may include one or more computers, servers, and/or systems. In some embodiments, the computers, servers, and/or systems that make up the cloud network 116 are different from the user's own on-premises computers, servers, and/or systems. For example, the cloud network 116 may host an application, and a user may, via a communication network such as the Internet, on demand, order and use the application.

While each device, server and system in FIG. 1 is shown as a single device, it will be appreciated that multiple devices may instead be used. For example, a set of network devices can be used to transmit various communications from a single user, or a remote server may include a server stack. As another example, data may be processed as part of computing environment 114.

Each communication within data transmission network 100 (e.g., between client devices, between servers 106 and computing environment 114 or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a BLUETOOTH® communication channel or a BLUETOOTH® Low Energy communication channel. A wired network may include a wired interface. The wired and/or wireless networks may be implemented using routers, access points, bridges, gateways, or the like, to connect devices in the network 108, as will be further described with respect to FIG. 2. The one or more networks 108 can be incorporated entirely within or can include an intranet, an extranet, or a combination thereof. In one embodiment, communications between two or more systems and/or devices can be achieved by a secure communications protocol, such as secure sockets layer (SSL) or transport layer security (TLS). In addition, data and/or transactional details may be encrypted.

Some aspects may utilize the Internet of Things (IoT), where things (e.g., machines, devices, phones, sensors) can be connected to networks and the data from these things can be collected and processed within the things and/or external to the things. For example, the IoT can include sensors in many different devices, and high value analytics can be applied to identify hidden relationships and drive increased efficiencies. This can apply to both big data analytics and real-time (e.g., ESP) analytics. This will be described further below with respect to FIG. 2.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The compute nodes in the grid-based computing system 120 and the transmission network database system 118 may share the same processor hardware, such as processors that are located within computing environment 114.

Figure 2:
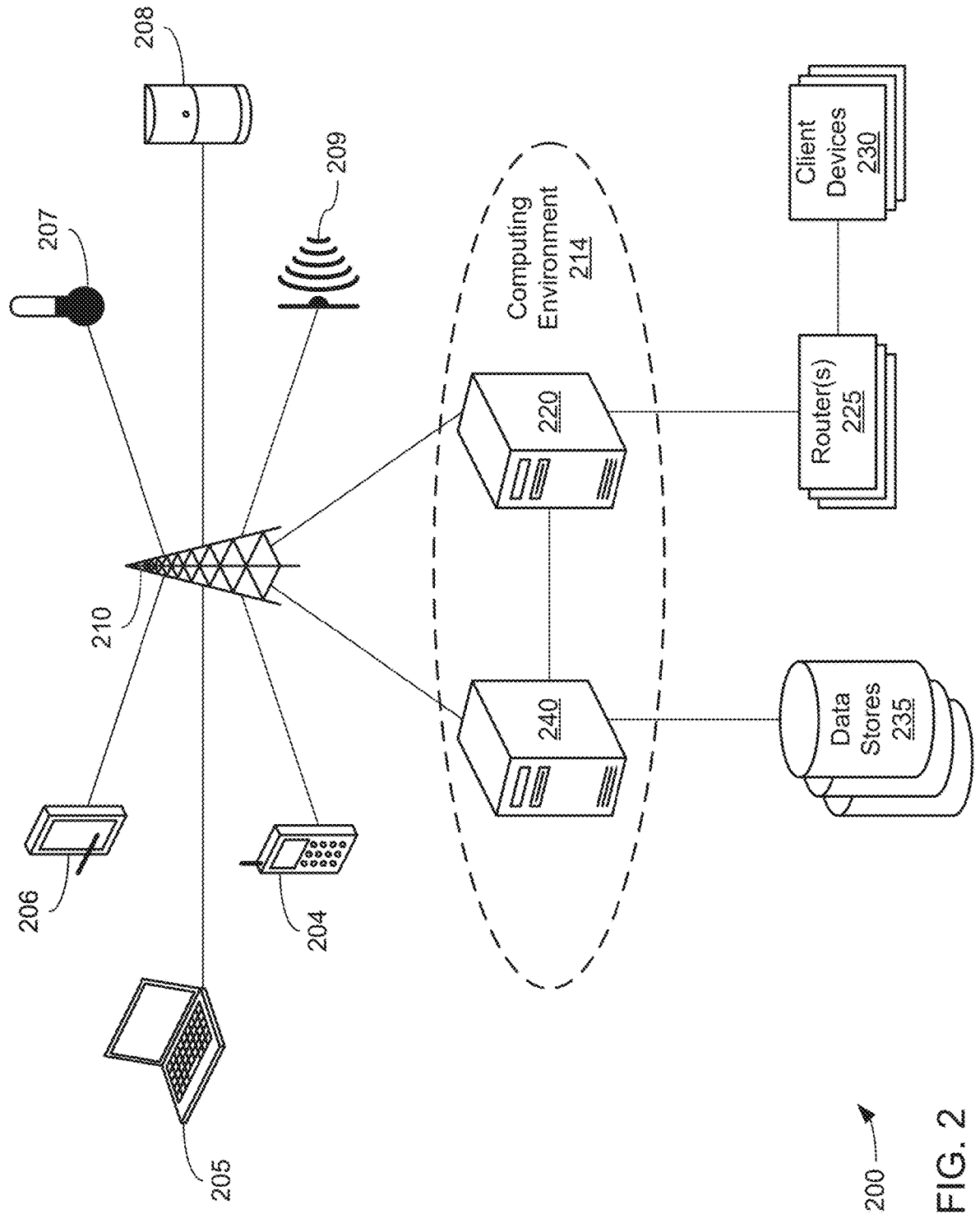
FIG. 2 illustrates an example network including an example set of devices communicating with each other over an exchange system and via a network, according to some embodiments of the present technology.

FIG. 2 illustrates an example network including an example set of devices communicating with each other over an exchange system and via a network, according to embodiments of the present technology. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). The communication can be routed to another network device, such as network devices 205-209, via base station 210. The communication can also be routed to computing environment 214 via base station 210. For example, network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, and electrical current, among others. The sensors may be mounted to various components used as part of a variety of different types of systems (e.g., an oil drilling operation). The network devices may detect and record data related to the environment that it monitors, and transmit that data to computing environment 214.

As noted, one type of system that may include various sensors that collect data to be processed and/or transmitted to a computing environment according to certain embodiments includes an oil drilling system. For example, the one or more drilling operation sensors may include surface sensors that measure a hook load, a fluid rate, a temperature and a density in and out of the wellbore, a standpipe pressure, a surface torque, a rotation speed of a drill pipe, a rate of penetration, a mechanical specific energy, etc. and downhole sensors that measure a rotation speed of a bit, fluid densities, downhole torque, downhole vibration (axial, tangential, lateral), a weight applied at a drill bit, an annular pressure, a differential pressure, an azimuth, an inclination, a dog leg severity, a measured depth, a vertical depth, a downhole temperature, etc. Besides the raw data collected directly by the sensors, other data may include parameters either developed by the sensors or assigned to the system by a client or other controlling device. For example, one or more drilling operation control parameters may control settings such as a mud motor speed to flow ratio, a bit diameter, a predicted formation top, seismic data, weather data, etc. Other data may be generated using physical models such as an earth model, a weather model, a seismic model, a bottom hole assembly model, a well plan model, an annular friction model, etc. In addition to sensor and control settings, predicted outputs, of for example, the rate of penetration, mechanical specific energy, hook load, flow in fluid rate, flow out fluid rate, pump pressure, surface torque, rotation speed of the drill pipe, annular pressure, annular friction pressure, annular temperature, equivalent circulating density, etc. may also be stored in the data warehouse.

In another example, another type of system that may include various sensors that collect data to be processed and/or transmitted to a computing environment according to certain embodiments includes a home automation or similar automated network in a different environment, such as an office space, school, public space, sports venue, or a variety of other locations. Network devices in such an automated network may include network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In another embodiment, a network device can allow a user to access, control, and/or configure devices, such as office-related devices (e.g., copy machine, printer, or fax machine), audio and/or video related devices (e.g., a receiver, a speaker, a projector, a DVD player, or a television), media-playback devices (e.g., a compact disc player, a CD player, or the like), computing devices (e.g., a home computer, a laptop computer, a tablet, a personal digital assistant (PDA), a computing device, or a wearable device), lighting devices (e.g., a lamp or recessed lighting), devices associated with a security system, devices associated with an alarm system, devices that can be operated in an automobile (e.g., radio devices, navigation devices), and/or the like. Data may be collected from such various sensors in raw form, or data may be processed by the sensors to create parameters or other data either developed by the sensors based on the raw data or assigned to the system by a client or other controlling device.

In another example, another type of system that may include various sensors that collect data to be processed and/or transmitted to a computing environment according to certain embodiments includes a power or energy grid. A variety of different network devices may be included in an energy grid, such as various devices within one or more power plants, energy farms (e.g., wind farm, solar farm, among others) energy storage facilities, factories, homes and businesses of consumers, among others. One or more of such devices may include one or more sensors that detect energy gain or loss, electrical input or output or loss, and a variety of other efficiencies. These sensors may collect data to inform users of how the energy grid, and individual devices within the grid, may be functioning and how they may be made more efficient.

Network device sensors may also perform processing on data it collects before transmitting the data to the computing environment 114, or before deciding whether to transmit data to the computing environment 114. For example, network devices may determine whether data collected meets certain rules, for example by comparing data or values calculated from the data and comparing that data to one or more thresholds. The network device may use this data and/or comparisons to determine if the data should be transmitted to the computing environment 214 for further use or processing.

Computing environment 214 may include machines 220 and 240. Although computing environment 214 is shown in FIG. 2 as having two machines, 220 and 240, computing environment 214 may have only one machine or may have more than two machines. The machines that make up computing environment 214 may include specialized computers, servers, or other machines that are configured to individually and/or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other inter-network or intra-network connection components. For example, computing environment 214 may communicate with devices 230 via one or more routers 225. Computing environment 214 may collect, analyze and/or store data from or pertaining to communications, client device operations, client rules, and/or user-associated actions stored at one or more data stores 235. Such data may influence communication routing to the devices within computing environment 214, how data is stored or processed within computing environment 214, among other actions.

Notably, various other devices can further be used to influence communication routing and/or processing between devices within computing environment 214 and with devices outside of computing environment 214. For example, as shown in FIG. 2, computing environment 214 may include a web server 240. Thus, computing environment 214 can retrieve data of interest, such as client information (e.g., product information, client rules, etc.), technical product details, news, current or predicted weather, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices may receive data periodically from network device sensors as the sensors continuously sense, monitor and track changes in their environments. Devices within computing environment 214 may also perform pre-analysis on data it receives to determine if the data received should be processed as part of an ongoing project. The data received and collected by computing environment 214, no matter what the source or method or timing of receipt, may be processed over a period of time for a client to determine results data based on the client's needs and rules.

Figure 3:
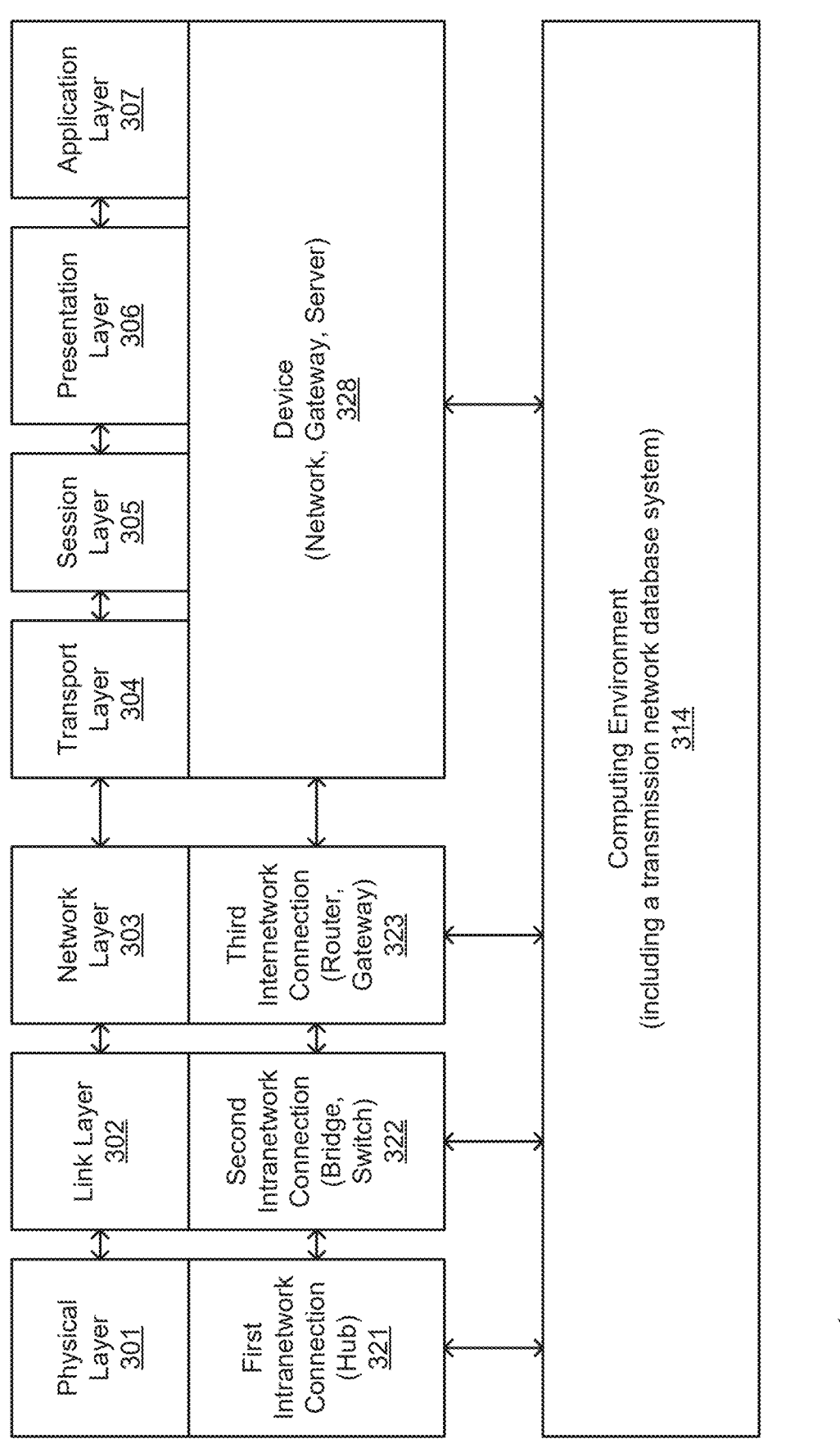
FIG. 3 illustrates a representation of a conceptual model of a communications protocol system, according to some embodiments of the present technology.

FIG. 3 illustrates a representation of a conceptual model of a communications protocol system, according to embodiments of the present technology. More specifically, FIG. 3 identifies operation of a computing environment in an Open Systems Interaction model that corresponds to various connection components. The model 300 shows, for example, how a computing environment, such as computing environment 314 (or computing environment 214 in FIG. 2) may communicate with other devices in its network, and control how communications between the computing environment and other devices are executed and under what conditions.

The model can include layers 301-307. The layers are arranged in a stack. Each layer in the stack serves the layer one level higher than it (except for the application layer, which is the highest layer), and is served by the layer one level below it (except for the physical layer, which is the lowest layer). The physical layer is the lowest layer because it receives and transmits raw bytes of data, and the physical layer is the farthest layer from the user in a communications system. On the other hand, the application layer is the highest layer because it interacts directly with a software application.

As noted, the model includes a physical layer 301. Physical layer 301 represents physical communication and can define parameters of that physical communication. For example, such physical communication may come in the form of electrical, optical, or electromagnetic signals. Physical layer 301 also defines protocols that may control communications within a data transmission network.

Link layer 302 defines links and mechanisms used to transmit (i.e., move) data across a network. The link layer 302 manages node-to-node communications, such as within a grid computing environment. Link layer 302 can detect and correct errors (e.g., transmission errors in the physical layer 301). Link layer 302 can also include a media access control (MAC) layer and logical link control (LLC) layer.

Network layer 303 defines the protocol for routing within a network. In other words, the network layer coordinates transferring data across nodes in a same network (e.g., such as a grid computing environment). Network layer 303 can also define the processes used to structure local addressing within the network.

Transport layer 304 can manage the transmission of data and the quality of the transmission and/or receipt of that data. Transport layer 304 can provide a protocol for transferring data, such as, for example, a Transmission Control Protocol (TCP). Transport layer 304 can assemble and disassemble data frames for transmission. The transport layer can also detect transmission errors occurring in the layers below it.

Session layer 305 can establish, maintain, and manage communication connections between devices on a network. In other words, the session layer controls the dialogues or nature of communications between network devices on the network. The session layer may also establish checkpointing, adjournment, termination, and restart procedures.

Presentation layer 306 can provide translation for communications between the application and network layers. In other words, this layer may encrypt, decrypt and/or format data based on data types and/or encodings known to be accepted by an application or network layer.

Application layer 307 interacts directly with software applications and end users and manages communications between them. Application layer 307 can identify destinations, local resource states or availability and/or communication content or formatting using the applications.

Intra-network connection components 321 and 322 are shown to operate in lower levels, such as physical layer 301 and link layer 302, respectively. For example, a hub can operate in the physical layer, a switch can operate in the link layer, and a router can operate in the network layer. Internetwork connection components 323 and 328 are shown to operate on higher levels, such as layers 303-307. For example, routers can operate in the network layer and network devices can operate in the transport, session, presentation, and application layers.

As noted, a computing environment 314 can interact with and/or operate on, in various embodiments, one, more, all or any of the various layers. For example, computing environment 314 can interact with a hub (e.g., via the link layer) so as to adjust which devices the hub communicates with. The physical layer may be served by the link layer, so it may implement such data from the link layer. For example, the computing environment 314 may control which devices it will receive data from. For example, if the computing environment 314 knows that a certain network device has turned off, broken, or otherwise become unavailable or unreliable, the computing environment 314 may instruct the hub to prevent any data from being transmitted to the computing environment 314 from that network device. Such a process may be beneficial to avoid receiving data that is inaccurate or that has been influenced by an uncontrolled environment. As another example, computing environment 314 can communicate with a bridge, switch, router or gateway and influence which device within the system (e.g., system 200) the component selects as a destination. In some embodiments, computing environment 314 can interact with various layers by exchanging communications with equipment operating on a particular layer by routing or modifying existing communications. In another embodiment, such as in a grid computing environment, a node may determine how data within the environment should be routed (e.g., which node should receive certain data) based on certain parameters or information provided by other layers within the model.

As noted, the computing environment 314 may be a part of a communications grid environment, the communications of which may be implemented as shown in the protocol of FIG. 3. For example, referring back to FIG. 2, one or more of machines 220 and 240 may be part of a communications grid computing environment. A gridded computing environment may be employed in a distributed system with non-interactive workloads where data resides in memory on the machines, or compute nodes. In such an environment, analytic code, instead of a database management system, controls the processing performed by the nodes. Data is co-located by pre-distributing it to the grid nodes, and the analytic code on each node loads the local data into memory. Each node may be assigned a particular task such as a portion of a processing project, or to organize or control other nodes within the grid.

Figure 4:
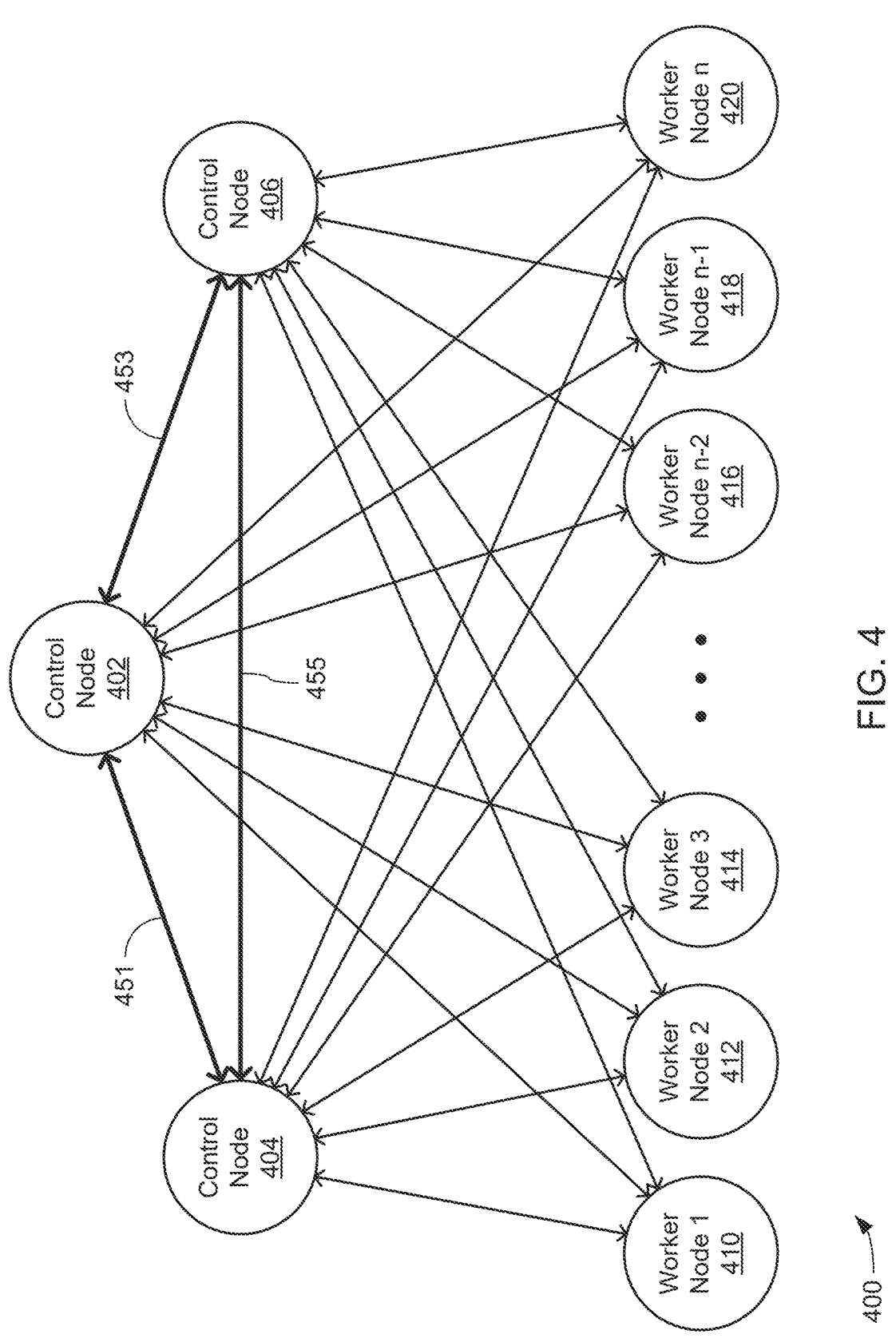
FIG. 4 illustrates a communications grid computing system including a variety of control and worker nodes, according to some embodiments of the present technology.

FIG. 4 illustrates a communications grid computing system 400 including a variety of control and worker nodes, according to embodiments of the present technology. Communications grid computing system 400 includes three control nodes and one or more worker nodes. Communications grid computing system 400 includes control nodes 402, 404, and 406. The control nodes are communicatively connected via communication paths 451, 453, and 455. Therefore, the control nodes may transmit information (e.g., related to the communications grid or notifications), to and receive information from each other. Although communications grid computing system 400 is shown in FIG. 4 as including three control nodes, the communications grid may include more or less than three control nodes.

Communications grid computing system (or just "communications grid") 400 also includes one or more worker nodes. Shown in FIG. 4 are six worker nodes 410-420. Although FIG. 4 shows six worker nodes, a communications grid according to embodiments of the present technology may include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid 400 may be connected (wired or wirelessly, and directly or indirectly) to control nodes 402-406. Therefore, each worker node may receive information from the control nodes (e.g., an instruction to perform work on a project) and may transmit information to the control nodes (e.g., a result from work performed on a project). Furthermore, worker nodes may communicate with each other (either directly or indirectly). For example, worker nodes may transmit data between each other related to a job being performed or an individual task within a job being performed by that worker node. However, in certain embodiments, worker nodes may not, for example, be connected (communicatively or otherwise) to certain other worker nodes. In an embodiment, worker nodes may only be able to communicate with the control node that controls it, and may not be able to communicate with other worker nodes in the communications grid, whether they are other worker nodes controlled by the control node that controls the worker node, or worker nodes that are controlled by other control nodes in the communications grid.

A control node may connect with an external device with which the control node may communicate (e.g., a grid user, such as a server or computer, may connect to a controller of the grid). For example, a server or computer may connect to control nodes and may transmit a project or job to the node. The project may include a data set. The data set may be of any size. Once the control node receives such a project including a large data set, the control node may distribute the data set or projects related to the data set to be performed by worker nodes. Alternatively, for a project including a large data set, the data set may be received or stored by a machine other than a control node (e.g., a HADOOP® standard-compliant data node employing the HADOOP® Distributed File System, or HDFS).

Control nodes may maintain knowledge of the status of the nodes in the grid (i.e., grid status information), accept work requests from clients, subdivide the work across worker nodes, and coordinate the worker nodes, among other responsibilities. Worker nodes may accept work requests from a control node and provide the control node with results of the work performed by the worker node. A grid may be started from a single node (e.g., a machine, computer, server, etc.). This first node may be assigned or may start as the primary control node that will control any additional nodes that enter the grid.

When a project is submitted for execution (e.g., by a client or a controller of the grid) it may be assigned to a set of nodes. After the nodes are assigned to a project, a data structure (i.e., a communicator) may be created. The communicator may be used by the project for information to be shared between the project codes running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node receives a project, the primary control node may distribute portions of the project to its worker nodes for execution. For example, when a project is initiated on communications grid 400, primary control node 402 controls the work to be performed for the project in order to complete the project as requested or instructed. The primary control node may distribute work to the worker nodes based on various factors, such as which subsets or portions of projects may be completed most efficiently and in the correct amount of time. For example, a worker node may perform analysis on a portion of data that is already local (e.g., stored on) the worker node. The primary control node also coordinates and processes the results of the work performed by each worker node after each worker node executes and completes its job. For example, the primary control node may receive a result from one or more worker nodes, and the control node may organize (e.g., collect and assemble) the results received and compile them to produce a complete result for the project received from the end user.

Any remaining control nodes, such as control nodes 404 and 406, may be assigned as backup control nodes for the project. In an embodiment, backup control nodes may not control any portion of the project. Instead, backup control nodes may serve as a backup for the primary control node and take over as primary control node if the primary control node were to fail. If a communications grid were to include only a single control node, and the control node were to fail (e.g., the control node is shut off or breaks) then the communications grid as a whole may fail, and any project or job being run on the communications grid may fail and may not complete. While the project may be run again, such a failure may cause a delay (severe delay in some cases, such as overnight delay) in completion of the project. Therefore, a grid with multiple control nodes, including a backup control node, may be beneficial.

To add another node or machine to the grid, the primary control node may open a pair of listening sockets, for example. A socket may be used to accept work requests from clients, and the second socket may be used to accept connections from other grid nodes. The primary control node may be provided with a list of other nodes (e.g., other machines, computers, servers) that will participate in the grid, and the role that each node will fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it will check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. However, a hierarchy of nodes may also be determined using methods other than using the unique identifiers of the nodes. For example, the hierarchy may be predetermined or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404 and 406 (and, for example, to other control or worker nodes within the communications grid). Such communications may be sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes in the grid, unique identifiers of the nodes, or their relationships with the primary control node) and the status of a project (including, for example, the status of each worker node's portion of the project). The snapshot may also include analysis or results received from worker nodes in the communications grid. The backup control nodes may receive and store the backup data received from the primary control node. The backup control nodes may transmit a request for such a snapshot (or other information) from the primary control node, or the primary control node may send such information periodically to the backup control nodes.

As noted, the backup data may allow the backup control node to take over as primary control node if the primary control node fails without requiring the grid to start the project over from scratch. If the primary control node fails, the backup control node that will take over as primary control node may retrieve the most recent version of the snapshot received from the primary control node and use the snapshot to continue the project from the stage of the project indicated by the backup data. This may prevent failure of the project as a whole.

A backup control node may use various methods to determine that the primary control node has failed. In one example of such a method, the primary control node may transmit (e.g., periodically) a communication to the backup control node that indicates that the primary control node is working and has not failed, such as a heartbeat communication. The backup control node may determine that the primary control node has failed if the backup control node has not received a heartbeat communication for a certain predetermined period of time. Alternatively, a backup control node may also receive a communication from the primary control node itself (before it failed) or from a worker node that the primary control node has failed, for example because the primary control node has failed to communicate with the worker node.

Different methods may be performed to determine which backup control node of a set of backup control nodes (e.g., backup control nodes 404 and 406) will take over for failed primary control node 402 and become the new primary control node. For example, the new primary control node may be chosen based on a ranking or "hierarchy" of backup control nodes based on their unique identifiers. In an alternative embodiment, a backup control node may be assigned to be the new primary control node by another device in the communications grid or from an external device (e.g., a system infrastructure or an end user, such as a server or computer, controlling the communications grid). In another alternative embodiment, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative embodiment, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed.

FIG. 5 illustrates a flow chart showing an example process 500 for adjusting a communications grid or a work project in a communications grid after a failure of a node, according to embodiments of the present technology. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
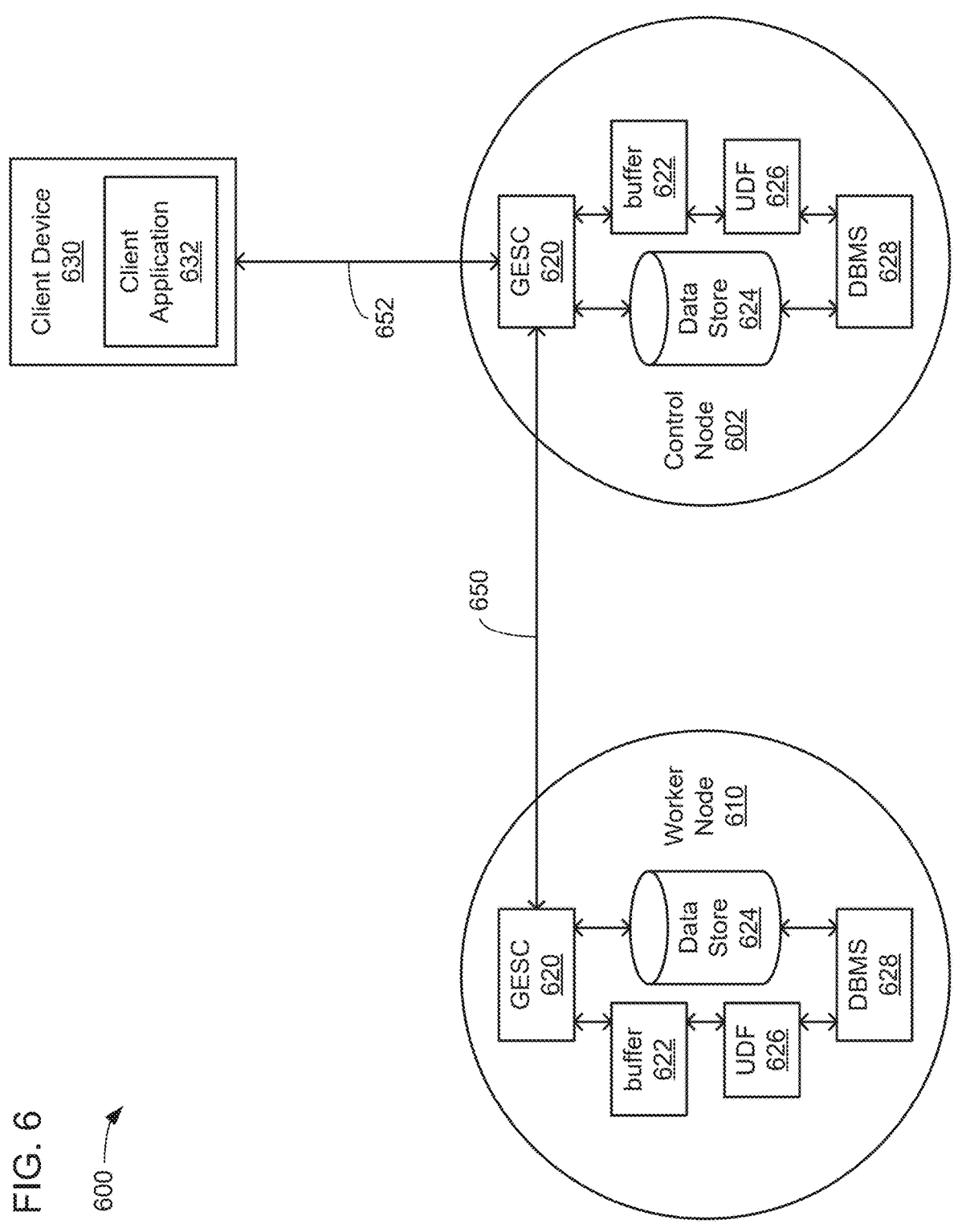
FIG. 6 illustrates an element of a communications grid computing system including a control node and a worker node, according to some embodiments of the present technology.

FIG. 6 illustrates a portion of a communications grid computing system 600 including a control node and a worker node, according to embodiments of the present technology. Communications grid 600 computing system includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 610 via path 650.

Similar to in FIG. 4, communications grid computing system (or just "communications grid") 600 includes data processing nodes (control node 602 and worker node 610). Nodes 602 and 610 include multi-core data processors. Each node 602 and 610 includes a grid-enabled software component (GESC) 620 that executes on the data processor associated with that node and interfaces with buffer memory 622 also associated with that node. Each node 602 and 610 includes database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However, in certain embodiments, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DBMS 628 to transfer data to or receive data from the database stored in the data stores 624 that are managed by the DBMS. For example, UDF 626 can be invoked by the DBMS to provide data to the GESC for processing. The UDF 626 may establish a socket connection (not shown) with the GESC to transfer the data. Alternatively, the UDF 626 can transfer data to the GESC by writing data to shared memory accessible by both the UDF and the GESC.

The GESC 620 at the nodes 602 and 610 may be connected via a network, such as network 108 shown in FIG. 1. Therefore, nodes 602 and 610 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client device 630. More specifically, control node 602 may communicate with client application 632 hosted by the client device 630 to receive queries and to respond to those queries after processing large amounts of data.

DBMS 628 may control the creation, maintenance, and use of database or data structure (not shown) within a nodes 602 or 610. The database may organize data stored in data stores 624. The DBMS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
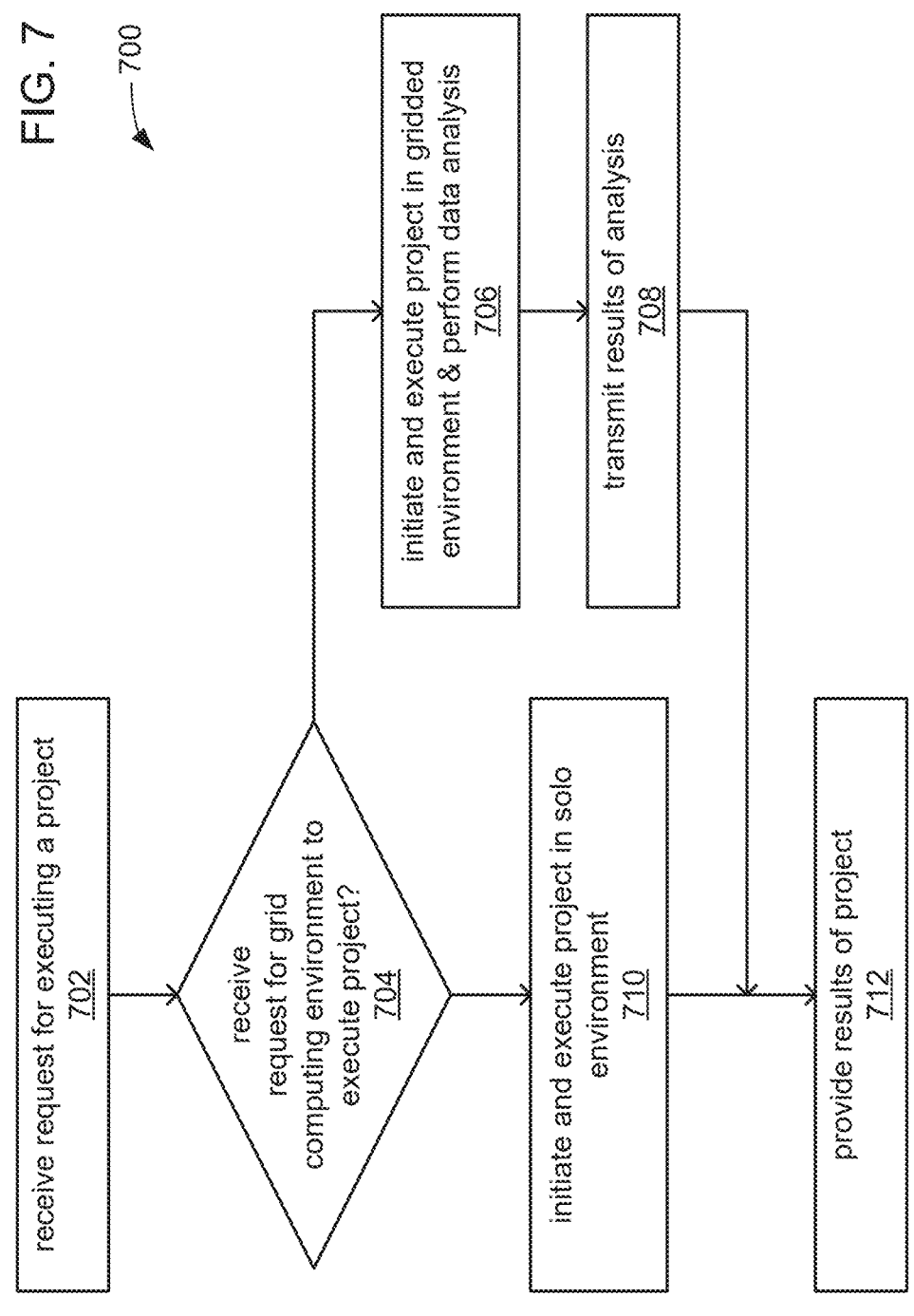
FIG. 7 illustrates a flow chart showing an example process for executing a data analysis or processing project, according to some embodiments of the present technology.

FIG. 7 illustrates a flow chart showing an example method 700 for executing a project within a grid computing system, according to embodiments of the present technology. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project, as described in operation 712.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 1024*a-c*, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

FIG. 8 illustrates a block diagram including components of an Event Stream Processing Engine (ESPE), according to embodiments of the present technology. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative embodiment, for example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

FIG. 9 illustrates a flow chart showing an example process including operations performed by an event stream processing engine, according to some embodiments of the present technology. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop-down menus, buttons, text boxes, hyperlinks, etc. associated with the ESP application as understood by a person of skill in the art. As further understood by a person of skill in the art, various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

FIG. 10 illustrates an ESP system 1000 interfacing between publishing device 1022 and event subscribing devices 1024*a-c*, according to embodiments of the present technology. ESP system 1000 may include ESP device or subsystem 851, event publishing device 1022, an event subscribing device A 1024*a*, an event subscribing device B 1024*b*, and an event subscribing device C 1024*c*. Input event streams are output to ESP device 851 by publishing device 1022. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscribing device A 1024*a*, event subscribing device B 1024*b*, and event subscribing device C 1024*c*. ESP system 1000 may include a greater or a fewer number of event subscribing devices of event subscribing devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 1022, to publish event streams into ESPE 800 or an event subscriber, such as event subscribing device A 1024*a*, event subscribing device B 1024*b*, and event subscribing device C 1024*c*, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 1022, and event subscription applications instantiated at one or more of event subscribing device A 1024*a*, event subscribing device B 1024*b*, and event subscribing device C 1024*c*.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the event publishing device 1022.

ESP subsystem 800 may include a publishing client 1002, ESPE 800, a subscribing client A 1004, a subscribing client B 1006, and a subscribing client C 1008. Publishing client 1002 may be started by an event publishing application executing at publishing device 1022 using the publish/subscribe API. Subscribing client A 1004 may be started by an event subscription application A, executing at event subscribing device A 1024*a* using the publish/subscribe API. Subscribing client B 1006 may be started by an event subscription application B executing at event subscribing device B 1024*b* using the publish/subscribe API. Subscribing client C 1008 may be started by an event subscription application C executing at event subscribing device C 1024*c* using the publish/subscribe API.

An event block object containing one or more event objects is injected into a source window of the one or more source windows 806 from an instance of an event publishing application on event publishing device 1022. The event block object may be generated, for example, by the event publishing application and may be received by publishing client 1002. A unique ID may be maintained as the event block object is passed between the one or more source windows 806 and/or the one or more derived windows 808 of ESPE 800, and to subscribing client A 1004, subscribing client B 1006, and subscribing client C 1008 and to event subscription device A 1024*a*, event subscription device B 1024*b*, and event subscription device C 1024*c*. Publishing client 1002 may further generate and include a unique embedded transaction ID in the event block object as the event block object is processed by a continuous query, as well as the unique ID that publishing device 1022 assigned to the event block object.

In an operation 912, the event block object is processed through the one or more continuous queries 804. In an operation 914, the processed event block object is output to one or more computing devices of the event subscribing devices 1024*a-c*. For example, subscribing client A 1004, subscribing client B 1006, and subscribing client C 1008 may send the received event block object to event subscription device A 1024*a*, event subscription device B 1024*b*, and event subscription device C 1024*c*, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 1022, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some embodiments, big data is processed for an analytics project after the data is received and stored. In other embodiments, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the current disclosure provide technical solutions to technical problems, such as computing problems that arise when an ESP device fails which results in a complete service interruption and potentially significant data loss. The data loss can be catastrophic when the streamed data is supporting mission critical operations such as those in support of an ongoing manufacturing or drilling operation. An embodiment of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, a processor and a computer-readable medium operably coupled to the processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

Figure 11:
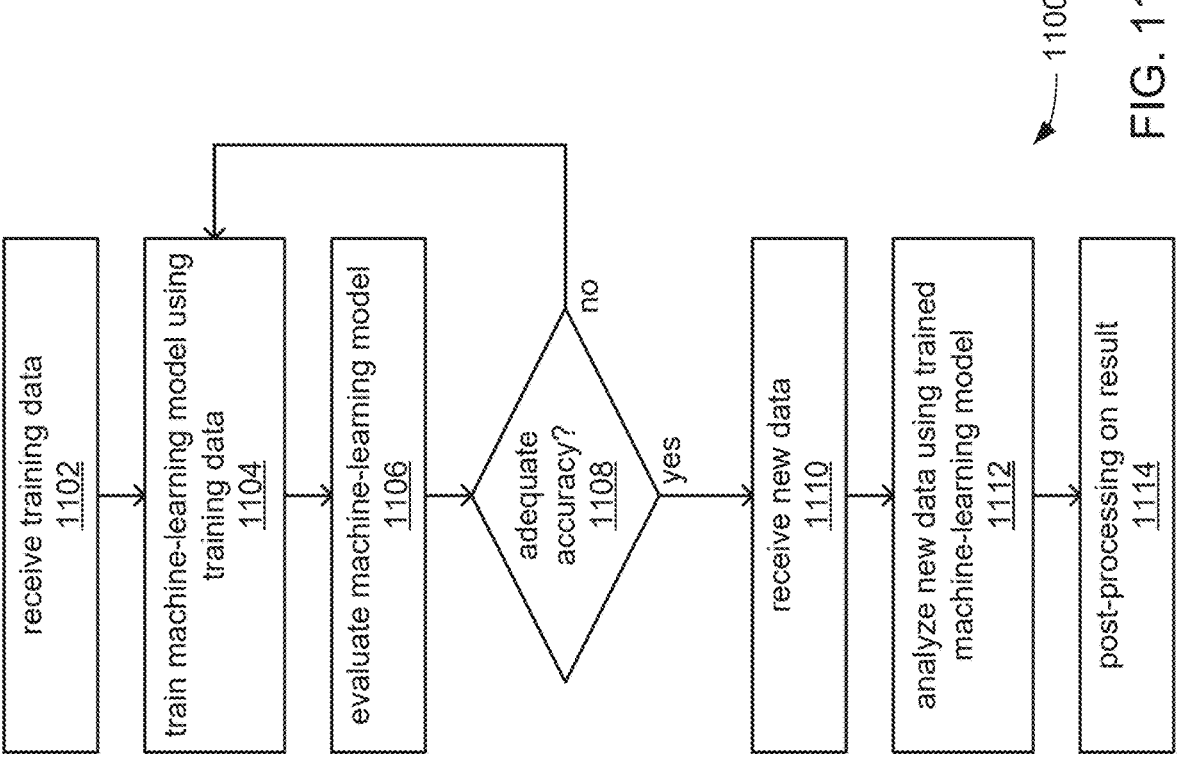
FIG. 11 illustrates a flow chart of an example of a process for generating and using a machine-learning model according to some aspects, according to embodiments of the present technology.

FIG. 11 is a flow chart of an example of a process for generating and using a machine-learning model according to some aspects. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, transformer networks, large language models (LLMs), agents of LLMs, multi-modal models, or any combination of these.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Any number and combination of tools can be used to create machine-learning models. Examples of tools for creating and managing machine-learning models can include SAS® Enterprise Miner, SAS® Rapid Predictive Modeler, and SAS® Model Manager, SAS Cloud Analytic Services (CAS)®, SAS Viya® of all which are by SAS Institute Inc. of Cary, North Carolina.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart of FIG. 11.

In block 1102, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model.

In block 1104, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model has to find structure in the inputs on its own. In semi-supervised training, only some of the inputs in the training data are correlated to desired outputs.

In block 1106, the machine-learning model is evaluated. For example, an evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data.

In some examples, if, at 1108, the machine-learning model has an inadequate degree of accuracy for a particular task, the process can return to block 1104, where the machine-learning model can be further trained using additional training data or otherwise modified to improve accuracy. However, if, at 1108. the machine-learning model has an adequate degree of accuracy for the particular task, the process can continue to block 1110.

In block 1110, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 1112, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 1114, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

Figure 12:
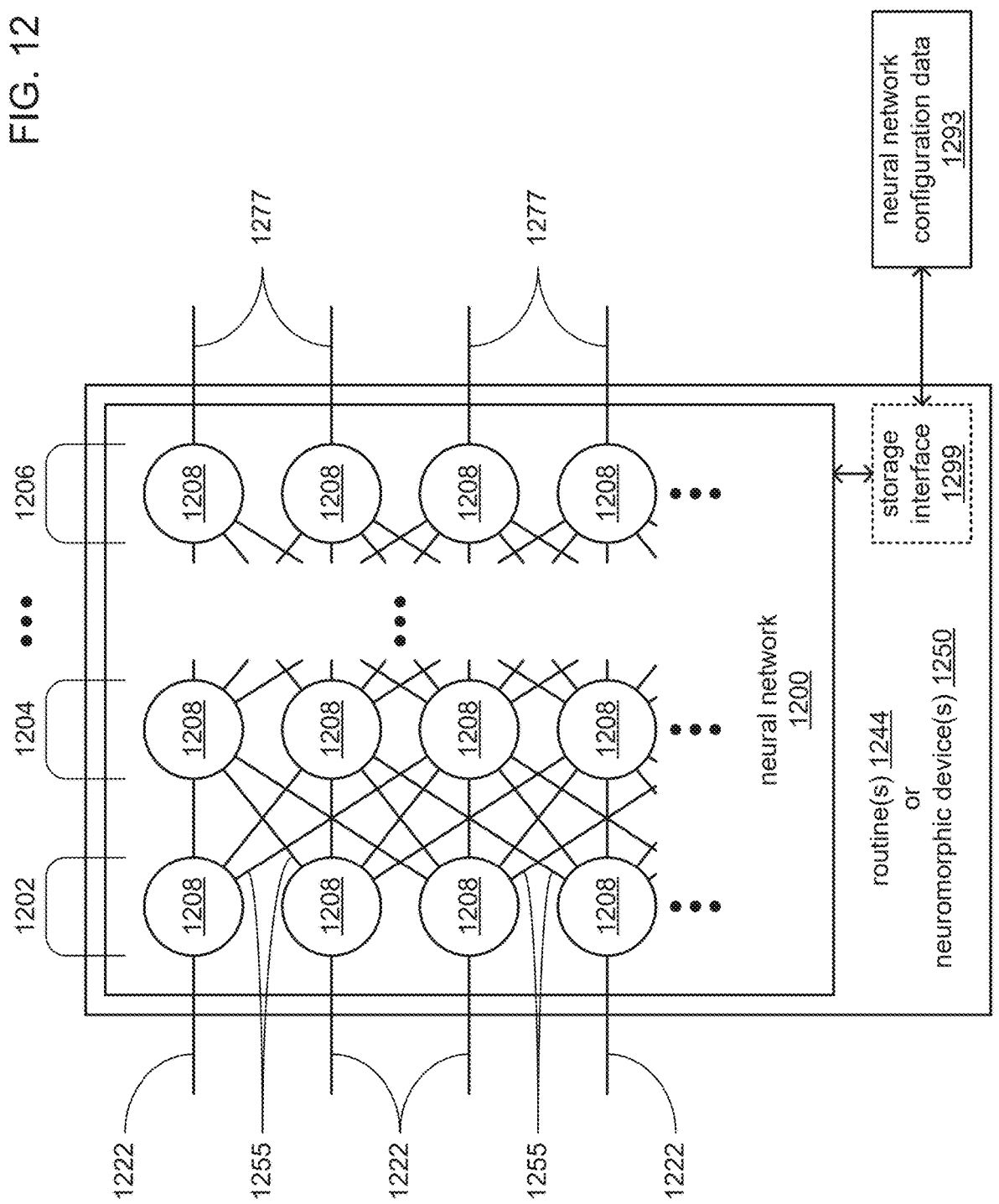
FIG. 12 illustrates an example of a machine-learning model as a neural network, according to embodiments of the present technology.

A more specific example of a machine-learning model is the neural network 1200 shown in FIG. 12. The neural network 1200 is represented as multiple layers of neurons 1208 that can exchange data between one another via connections 1255 that may be selectively instantiated thereamong. The layers include an input layer 1202 for receiving input data provided at inputs 1222, one or more hidden layers 1204, and an output layer 1206 for providing a result at outputs 1277. The hidden layer(s) 1204 are referred to as hidden because they may not be directly observable or have their inputs or outputs directly accessible during the normal functioning of the neural network 1200. Although the neural network 1200 is shown as having a specific number of layers and neurons for exemplary purposes, the neural network 1200 can have any number and combination of layers, and each layer can have any number and combination of neurons.

The neurons 1208 and connections 1255 thereamong may have numeric weights, which can be tuned during training of the neural network 1200. For example, training data can be provided to at least the inputs 1222 to the input layer 1202 of the neural network 1200, and the neural network 1200 can use the training data to tune one or more numeric weights of the neural network 1200. In some examples, the neural network 1200 can be trained using backpropagation. Backpropagation can include determining a gradient of a particular numeric weight based on a difference between an actual output of the neural network 1200 at the outputs 1277 and a desired output of the neural network 1200. Based on the gradient, one or more numeric weights of the neural network 1200 can be updated to reduce the difference therebetween, thereby increasing the accuracy of the neural network 1200. This process can be repeated multiple times to train the neural network 1200. For example, this process can be repeated hundreds or thousands of times to train the neural network 1200.

In some examples, the neural network 1200 is a feed-forward neural network. In a feed-forward neural network, the connections 1255 are instantiated and/or weighted so that every neuron 1208 only propagates an output value to a subsequent layer of the neural network 1200. For example, data may only move one direction (forward) from one neuron 1208 to the next neuron 1208 in a feed-forward neural network. Such a "forward" direction may be defined as proceeding from the input layer 1202 through the one or more hidden layers 1204, and toward the output layer 1206.

In other examples, the neural network 1200 may be a recurrent neural network. A recurrent neural network can include one or more feedback loops among the connections 1255, thereby allowing data to propagate in both forward and backward through the neural network 1200. Such a "backward" direction may be defined as proceeding in the opposite direction of forward, such as from the output layer 1206 through the one or more hidden layers 1204, and toward the input layer 1202. This can allow for information to persist within the recurrent neural network. For example, a recurrent neural network can determine an output based at least partially on information that the recurrent neural network has seen before, giving the recurrent neural network the ability to use previous input to inform the output.

In some examples, the neural network 1200 operates by receiving a vector of numbers from one layer; transforming the vector of numbers into a new vector of numbers using a matrix of numeric weights, a nonlinearity, or both; and providing the new vector of numbers to a subsequent layer ("subsequent" in the sense of moving "forward") of the neural network 1200. Each subsequent layer of the neural network 1200 can repeat this process until the neural network 1200 outputs a final result at the outputs 1277 of the output layer 1206. For example, the neural network 1200 can receive a vector of numbers at the inputs 1222 of the input layer 1202. The neural network 1200 can multiply the vector of numbers by a matrix of numeric weights to determine a weighted vector. The matrix of numeric weights can be tuned during the training of the neural network 1200. The neural network 1200 can transform the weighted vector using a nonlinearity, such as a sigmoid tangent or the hyperbolic tangent. In some examples, the nonlinearity can include a rectified linear unit, which can be expressed using the equation y=max (x, 0) where y is the output and x is an input value from the weighted vector. The transformed output can be supplied to a subsequent layer (e.g., a hidden layer 1204) of the neural network 1200. The subsequent layer of the neural network 1200 can receive the transformed output, multiply the transformed output by a matrix of numeric weights and a nonlinearity, and provide the result to yet another layer of the neural network 1200 (e.g., another, subsequent, hidden layer 1204). This process continues until the neural network 1200 outputs a final result at the outputs 1277 of the output layer 1206.

As also depicted in FIG. 12, the neural network 1200 may be implemented either through the execution of the instructions of one or more routines 1244 by central processing units (CPUs), or through the use of one or more neuromorphic devices 1250 that incorporate a set of memristors (or other similar components) that each function to implement one of the neurons 1208 in hardware. Where multiple neuromorphic devices 1250 are used, they may be interconnected in a depth-wise manner to enable implementing neural networks with greater quantities of layers, and/or in a width-wise manner to enable implementing neural networks having greater quantities of neurons 1208 per layer.

The neuromorphic device 1250 may incorporate a storage interface 1299 by which neural network configuration data 1293 that is descriptive of various parameters and hyper parameters of the neural network 1200 may be stored and/or retrieved. More specifically, the neural network configuration data 1293 may include such parameters as weighting and/or biasing values derived through the training of the neural network 1200, as has been described. Alternatively, or additionally, the neural network configuration data 1293 may include such hyperparameters as the manner in which the neurons 1208 are to be interconnected (e.g., feed-forward or recurrent), the trigger function to be implemented within the neurons 1208, the quantity of layers and/or the overall quantity of the neurons 1208. The neural network configuration data 1293 may provide such information for more than one neuromorphic device 1250 where multiple ones have been interconnected to support larger neural networks.

Other examples of the present disclosure may include any number and combination of machine-learning models having any number and combination of characteristics. The machine-learning model(s) can be trained in a supervised, semi-supervised, or unsupervised manner, or any combination of these. The machine-learning model(s) can be implemented using a single computing device or multiple computing devices, such as the communications grid computing system 400 discussed above.

Implementing some examples of the present disclosure at least in part by using machine-learning models can reduce the total number of processing iterations, time, memory, electrical power, or any combination of these consumed by a computing device when analyzing data. For example, a neural network may more readily identify patterns in data than other approaches. This may enable the neural network and/or a transformer model to analyze the data using fewer processing cycles and less memory than other approaches, while obtaining a similar or greater level of accuracy.

Some machine-learning approaches may be more efficiently and speedily executed and processed with machine-learning specific processors (e.g., not a generic CPU). Such processors may also provide an energy savings when compared to generic CPUs. For example, some of these processors can include a graphical processing unit (GPU), an application-specific integrated circuit (ASIC), a field-programmable gate array (FPGA), an artificial intelligence (AI) accelerator, a neural computing core, a neural computing engine, a neural processing unit, a purpose-built chip architecture for deep learning, and/or some other machine-learning specific processor that implements a machine learning approach or one or more neural networks using semiconductor (e.g., silicon (Si), gallium arsenide (GaAs)) devices. These processors may also be employed in heterogeneous computing architectures with a number of and/or a variety of different types of cores, engines, nodes, and/or layers to achieve various energy efficiencies, processing speed improvements, data communication speed improvements, and/or data efficiency targets and improvements throughout various parts of the system when compared to a homogeneous computing architecture that employs CPUs for general purpose computing.

Figure 13:
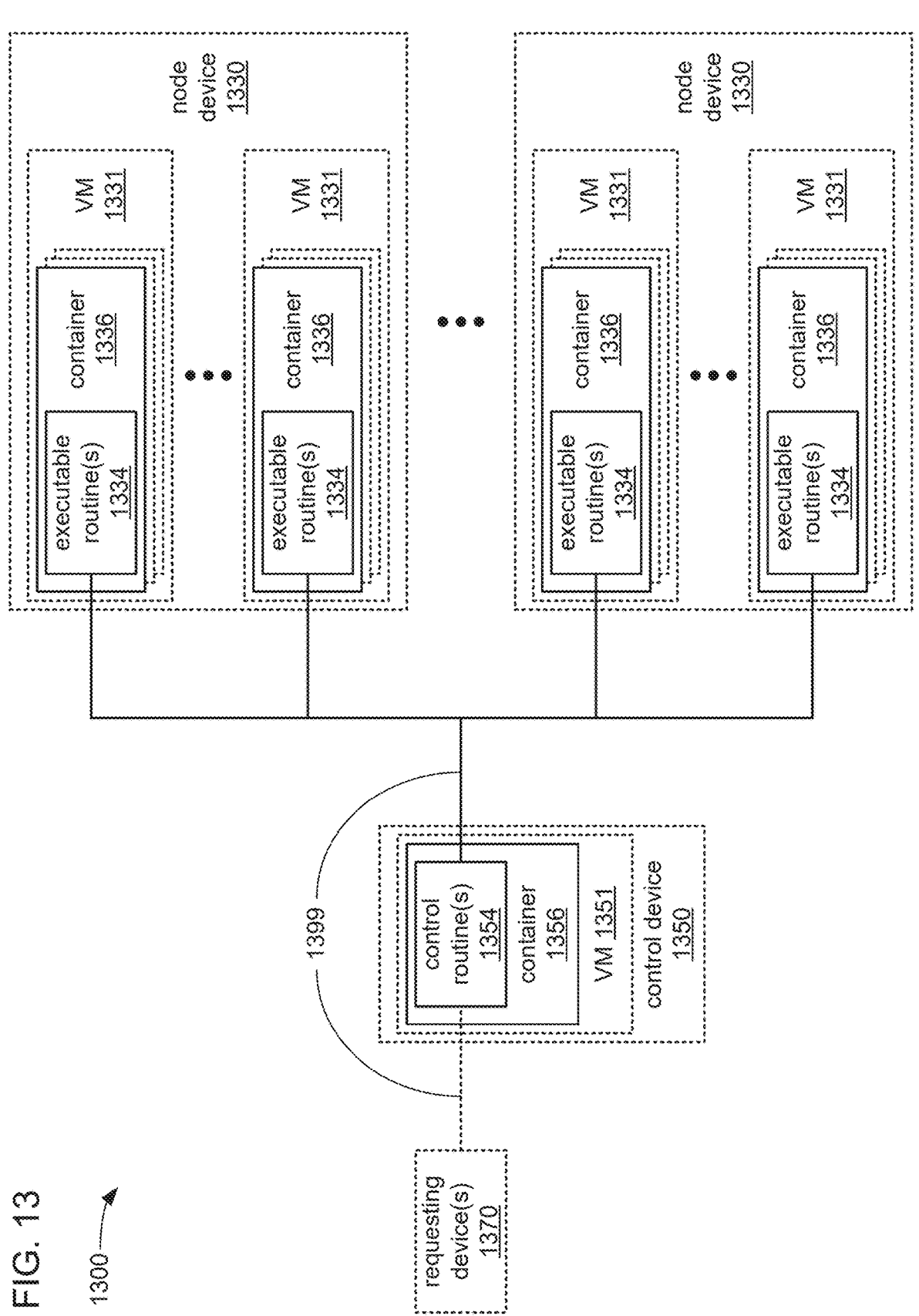
FIG. 13 illustrates various aspects of the use of containers as a mechanism to allocate processing, storage and/or other resources of a processing system to the performance of various analyses, according to embodiments of the present technology.

FIG. 13 illustrates various aspects of the use of containers 1336 as a mechanism to allocate processing, storage and/or other resources of a processing system 1300 to the performance of various analyses. More specifically, in a processing system 1300 that includes one or more node devices 1330 (e.g., the aforedescribed grid system 400), the processing, storage and/or other resources of each node device 1330 may be allocated through the instantiation and/or maintenance of multiple containers 1336 within the node devices 1330 to support the performance(s) of one or more analyses. As each container 1336 is instantiated, predetermined amounts of processing, storage and/or other resources may be allocated thereto as part of creating an execution environment therein in which one or more executable routines 1334 may be executed to cause the performance of part or all of each analysis that is requested to be performed.

It may be that at least a subset of the containers 1336 are each allocated a similar combination and amounts of resources so that each is of a similar configuration with a similar range of capabilities, and therefore, are interchangeable. This may be done in embodiments in which it is desired to have at least such a subset of the containers 1336 already instantiated prior to the receipt of requests to perform analyses, and thus, prior to the specific resource requirements of each of those analyses being known.

Alternatively, or additionally, it may be that at least a subset of the containers 1336 are not instantiated until after the processing system 1300 receives requests to perform analyses where each request may include indications of the resources required for one of those analyses. Such information concerning resource requirements may then be used to guide the selection of resources and/or the amount of each resource allocated to each such container 1336. As a result, it may be that one or more of the containers 1336 are caused to have somewhat specialized configurations such that there may be differing types of containers to support the performance of different analyses and/or different portions of analyses.

It may be that the entirety of the logic of a requested analysis is implemented within a single executable routine 1334. In such embodiments, it may be that the entirety of that analysis is performed within a single container 1336 as that single executable routine 1334 is executed therein. However, it may be that such a single executable routine 1334, when executed, is at least intended to cause the instantiation of multiple instances of itself that are intended to be executed at least partially in parallel. This may result in the execution of multiple instances of such an executable routine 1334 within a single container 1336 and/or across multiple containers 1336.

Alternatively, or additionally, it may be that the logic of a requested analysis is implemented with multiple differing executable routines 1334. In such embodiments, it may be that at least a subset of such differing executable routines 1334 are executed within a single container 1336. However, it may be that the execution of at least a subset of such differing executable routines 1334 is distributed across multiple containers 1336.

Where an executable routine 1334 of an analysis is under development, and/or is under scrutiny to confirm its functionality, it may be that the container 1336 within which that executable routine 1334 is to be executed is additionally configured assist in limiting and/or monitoring aspects of the functionality of that executable routine 1334. More specifically, the execution environment provided by such a container 1336 may be configured to enforce limitations on accesses that are allowed to be made to memory and/or I/O addresses to control what storage locations and/or I/O devices may be accessible to that executable routine 1334. Such limitations may be derived based on comments within the programming code of the executable routine 1334 and/or other information that describes what functionality the executable routine 1334 is expected to have, including what memory and/or I/O accesses are expected to be made when the executable routine 1334 is executed. Then, when the executable routine 1334 is executed within such a container 1336, the accesses that are attempted to be made by the executable routine 1334 may be monitored to identify any behavior that deviates from what is expected.

Where the possibility exists that different executable routines 1334 may be written in different programming languages, it may be that different subsets of containers 1336 are configured to support different programming languages. In such embodiments, it may be that each executable routine 1334 is analyzed to identify what programming language it is written in, and then what container 1336 is assigned to support the execution of that executable routine 1334 may be at least partially based on the identified programming language. Where the possibility exists that a single requested analysis may be based on the execution of multiple executable routines 1334 that may each be written in a different programming language, it may be that at least a subset of the containers 1336 are configured to support the performance of various data structure and/or data format conversion operations to enable a data object output by one executable routine 1334 written in one programming language to be accepted as an input to another executable routine 1334 written in another programming language.

As depicted, at least a subset of the containers 1336 may be instantiated within one or more VMs 1331 that may be instantiated within one or more node devices 1330. Thus, in some embodiments, it may be that the processing, storage and/or other resources of at least one node device 1330 may be partially allocated through the instantiation of one or more VMs 1331, and then in turn, may be further allocated within at least one VM 1331 through the instantiation of one or more containers 1336.

In some embodiments, it may be that such a nested allocation of resources may be carried out to affect an allocation of resources based on two differing criteria. By way of example, it may be that the instantiation of VMs 1331 is used to allocate the resources of a node device 1330 to multiple users or groups of users in accordance with any of a variety of service agreements by which amounts of processing, storage and/or other resources are paid for each such user or group of users. Then, within each VM 1331 or set of VMs 1331 that is allocated to a particular user or group of users, containers 1336 may be allocated to distribute the resources allocated to each VM 1331 among various analyses that are requested to be performed by that particular user or group of users.

As depicted, where the processing system 1300 includes more than one node device 1330, the processing system 1300 may also include at least one control device 1350 within which one or more control routines 1354 may be executed to control various aspects of the use of the node device(s) 1330 to perform requested analyses. By way of example, it may be that at least one control routine 1354 implements logic to control the allocation of the processing, storage and/or other resources of each node device 1300 to each VM 1331 and/or container 1336 that is instantiated therein. Thus, it may be the control device(s) 1350 that effects a nested allocation of resources, such as the aforedescribed example allocation of resources based on two differing criteria.

As also depicted, the processing system 1300 may also include one or more distinct requesting devices 1370 from which requests to perform analyses may be received by the control device(s) 1350. Thus, and by way of example, it may be that at least one control routine 1354 implements logic to monitor for the receipt of requests from authorized users and/or groups of users for various analyses to be performed using the processing, storage and/or other resources of the node device(s) 1330 of the processing system 1300. The control device(s) 1350 may receive indications of the availability of resources, the status of the performances of analyses that are already underway, and/or still other status information from the node device(s) 1330 in response to polling, at a recurring interval of time, and/or in response to the occurrence of various preselected events. More specifically, the control device(s) 1350 may receive indications of status for each container 1336, each VM 1331 and/or each node device 1330. At least one control routine 1354 may implement logic that may use such information to select container(s) 1336, VM(s) 1331 and/or node device(s) 1330 that are to be used in the execution of the executable routine(s) 1334 associated with each requested analysis.

As further depicted, in some embodiments, the one or more control routines 1354 may be executed within one or more containers 1356 and/or within one or more VMs 1351 that may be instantiated within the one or more control devices 1350. It may be that multiple instances of one or more varieties of control routine 1354 may be executed within separate containers 1356, within separate VMs 1351 and/or within separate control devices 1350 to better enable parallelized control over parallel performances of requested analyses, to provide improved redundancy against failures for such control functions, and/or to separate differing ones of the control routines 1354 that perform different functions. By way of example, it may be that multiple instances of a first variety of control routine 1354 that communicate with the requesting device(s) 1370 are executed in a first set of containers 1356 instantiated within a first VM 1351, while multiple instances of a second variety of control routine 1354 that control the allocation of resources of the node device(s) 1330 are executed in a second set of containers 1356 instantiated within a second VM 1351. It may be that the control of the allocation of resources for performing requested analyses may include deriving an order of performance of portions of each requested analysis based on such factors as data dependencies thereamong, as well as allocating the use of containers 1336 in a manner that effectuates such a derived order of performance.

Where multiple instances of control routine 1354 are used to control the allocation of resources for performing requested analyses, such as the assignment of individual ones of the containers 1336 to be used in executing executable routines 1334 of each of multiple requested analyses, it may be that each requested analysis is assigned to be controlled by just one of the instances of control routine 1354. This may be done as part of treating each requested analysis as one or more "ACID transactions" that each have the four properties of atomicity, consistency, isolation and durability such that a single instance of control routine 1354 is given full control over the entirety of each such transaction to better ensure that either all of each such transaction is either entirely performed or is entirely not performed. As will be familiar to those skilled in the art, allowing partial performances to occur may cause cache incoherencies and/or data corruption issues.

As additionally depicted, the control device(s) 1350 may communicate with the requesting device(s) 1370 and with the node device(s) 1330 through portions of a network 1399 extending thereamong. Again, such a network as the depicted network 1399 may be based on any of a variety of wired and/or wireless technologies and may employ any of a variety of protocols by which commands, status, data and/or still other varieties of information may be exchanged. It may be that one or more instances of a control routine 1354 cause the instantiation and maintenance of a web portal or other variety of portal that is based on any of a variety of communication protocols, etc. (e.g., a restful API). Through such a portal, requests for the performance of various analyses may be received from requesting device(s) 1370, and/or the results of such requested analyses may be provided thereto. Alternatively, or additionally, it may be that one or more instances of a control routine 1354 cause the instantiation of and maintenance of a message passing interface and/or message queues. Through such an interface and/or queues, individual containers 1336 may each be assigned to execute at least one executable routine 1334 associated with a requested analysis to cause the performance of at least a portion of that analysis.

Although not specifically depicted, it may be that at least one control routine 1354 may include logic to implement a form of management of the containers 1336 based on the Kubernetes container management platform promulgated by Cloud Native Computing Foundation of San Francisco, CA, USA. In such embodiments, containers 1336 in which executable routines 1334 of requested analyses may be instantiated within "pods" (not specifically shown) in which other containers may also be instantiated for the execution of other supporting routines. Such supporting routines may cooperate with control routine(s) 1354 to implement a communications protocol with the control device(s) 1350 via the network 1399 (e.g., a message passing interface, one or more message queues, etc.). Alternatively, or additionally, such supporting routines may serve to provide access to one or more storage repositories (not specifically shown) in which at least data objects may be stored for use in performing the requested analyses.

One or more embodiments relate to governance of assets (e.g., ones pertaining to computer models). For instance, one or more embodiments relate to model cards. Model cards are used in a variety of scenarios involving computer models including artificial intelligence systems, simulators, forecasting, structural maintenance, medical and science uses. Model cards can provide information as to intended use, or potential limitations for use, of a model to an industry. Traditional model cards are complex, difficult to create and require users to supply the information for the technical requirements of the model card. Accordingly, model cards had limited utility providing static, textual information that did not update for time-varying information. Model cards also are often designed for technologists and difficult to understand by those using the model for making critical decisions.

Embodiments provide improved model cards such as ones that include model card visualizations. Model card visualizations can provide graphical information to better present technical information to users of a trained computer model. Embodiments provide systems for generating information for populating the model card visualization as well as updating the model card for time-varying information such as performance monitoring. Embodiments provide model cards with additional features such as accessing generalizability of a computer model to additional data beyond training or validation data.

Figure 14:
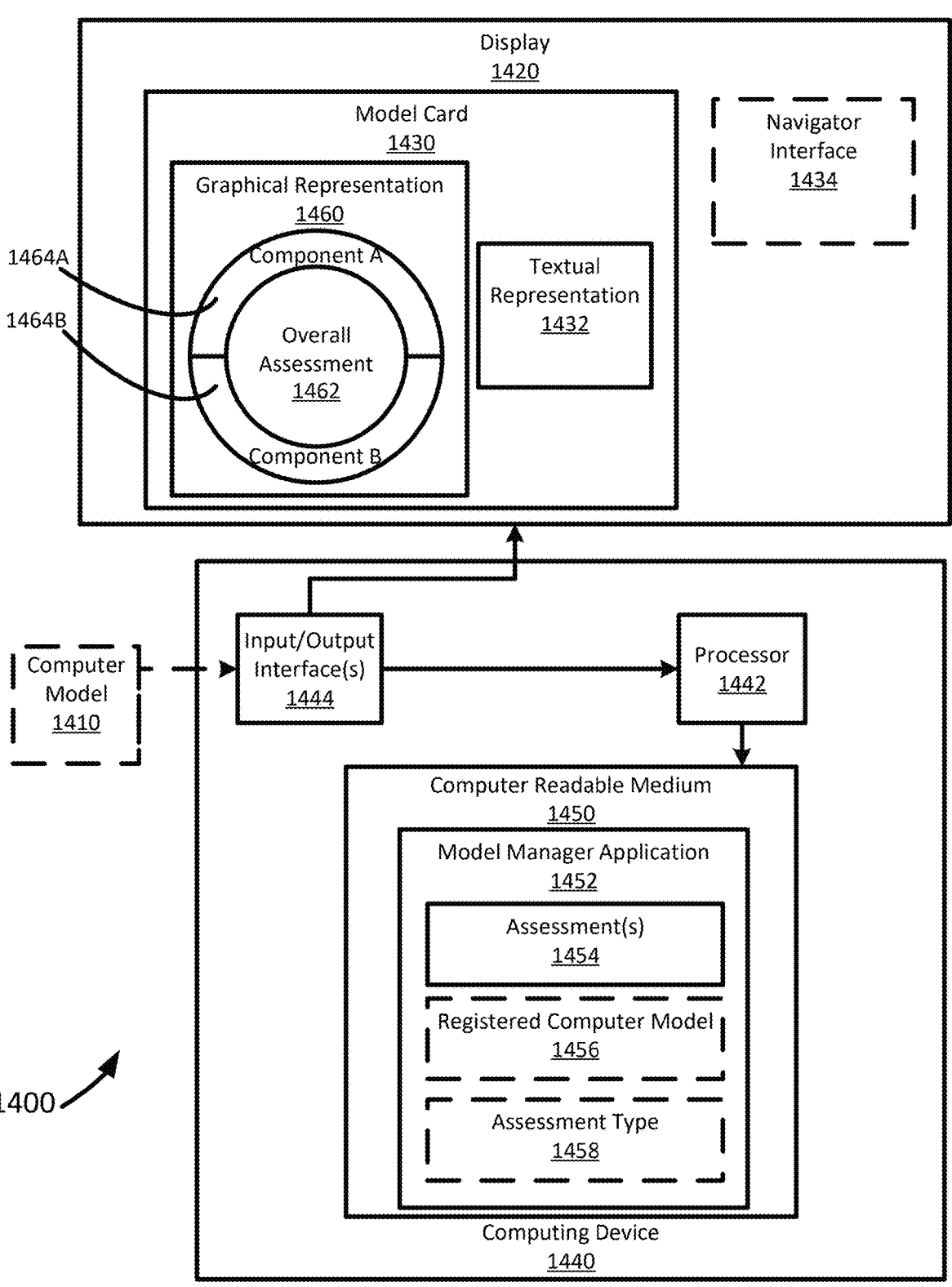
FIG. 14 illustrates a block diagram of a system for displaying a model card visualization according to at least one embodiment of the present technology.

FIG. 14 illustrates a block diagram of a system 1400 for displaying a model card visualization. System 1400 includes a computing device 1440. The system 1400 is configured to exchange information between components in the system (e.g., via wired and/or wireless transmission). For example, a network (not shown) can connect one or more devices of system 1400 to one or more other devices of system 1400. Alternatively, or additionally, the system is integrated into one device (e.g., a touch screen for entry of information and display of a model card 1430).

In one or more embodiments, the computing device 1440 includes one or more interface(s) 1444 to exchange information including input and/or output in the system 1400. Interfaces 1444 can be internal or external. For instance, system 1400 includes a display 1420 for displaying a model card 1430. The model card 1430 can be an element of a graphical user interface. Alternatively, or additionally, the model card 1430 includes elements of a graphical user interface such as windows, menus, controls, tabs, and interaction elements. Alternatively, or additionally, display 1420 is used to display a navigator interface component 1434 for navigating an asset system (e.g., one pertaining to models). For instance, the navigator interface component 1434 could be used to navigate to an asset specific graphical representation that displays model card 1430 or navigates to model card 1430. In some embodiments, the display 1420 is a component of the computing device 1440 (e.g., a laptop), and in some embodiments the display 1420 is a separate device (e.g., a monitor).

As an example, interface 1444 can receive a computer model 1410 using an input interface of interface(s) 1444 for generation of a model card to associate with the computer model 1410. The computer model 1410 can be generated by an external system (not shown) external to the computing device 1440. Alternatively, or additionally, the computer model 1410 is generated by the computing device 1440. The computing device 1440 can receive a model by registering the computer model 1410 or receiving components for generating a computer model (e.g., a training data set). A registered computer model 1456 can be stored in computer-readable medium 1450.

A computer model (e.g., a computer model 1410 and/or registered computer model 1456) can be a trained computer model trained by a training system (e.g., computing device 1440 or an external device not shown). A training system can train the model on a training dataset. The training dataset indicates inputs for variables in a training system and outputs of the training system (not shown).

A training system (e.g., computing device 1440 or an external device) can be a synthetic system (e.g., one generated by ChatGPT with synthetic inputs and outputs). For instance, the synthetic system could be a planned building with synthesized inputs related to options for the building such as the number of fire exits, and seats. A computing system could then synthesize outcomes for events such as number of people that exited the building in a fire in one hour. Alternatively, or additionally, the training system can include a real-world system with inputs and outputs recorded in the real-world system. For example, the model could relate to weather forecasting in a geographic area, and the inputs could relate to sensor readings of temperature, and moisture content, and the outputs could be related to sensor readings of rainfall or visibility. Alternatively, or additionally, the training system can include a simulation system such as one approximating a real-world system. For example, the simulation system could be a flight simulator with inputs and outputs approximating conditions in a real-world environment for a flying aircraft.

In one or more embodiments, interface(s) 1444 can exchange information with display 1420. For instance, interface(s) 1444 can exchange information to display a model card 1430. The display 1420 can display one or more graphical representation(s) 1460 in the model card 1430. Alternatively, or additionally, interface(s) 1444 can exchange information to display one or more textual representations 1432. For example, the graphical representation(s) 1460 and textual representation(s) 1432 can represent information pertaining to a trained computer model. For example, the model card 1430 can have graphical user interface elements representing the trained computer model, a training dataset used in training the computer model, performance of the trained computer model, and/or model usage parameters. This model card visualization can guide systems using a model. For instance, it can control whether a model is used or how much oversight to employ when using the model.

Figure 17A:
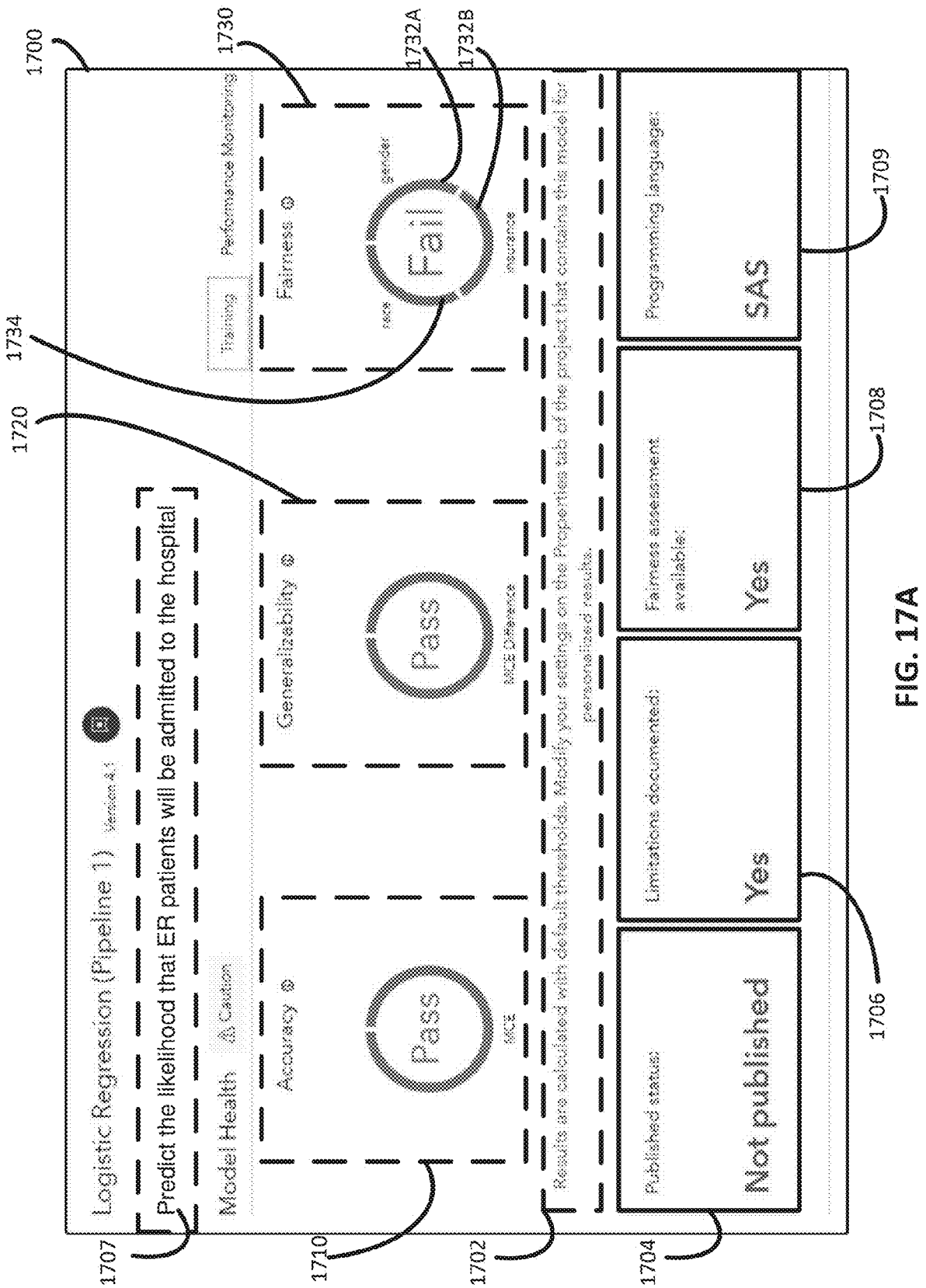
FIGS. 17A-C illustrate graphical user interface overview element(s) of a model card pertaining to training assessments according to at least one embodiment of the present technology.

The graphical representations(s) 1460 can optionally include textual representations. For instance, the graphical representation can have an overall assessment 1462 that is a color or pattern indicating an assessment score or value and/or includes textual information such as "pass" or "fail" message. The graphical representation(s) 1460 in embodiments provides a singular or unified perspective on information. For instance, the graphical representation can have one or more component assessment(s) 1464. The component assessment(s) 1464 include at least one assessment for determining the overall assessment 1462. For instance, an assessment could assess elements of the training dataset pertaining to one or more model terms in the trained computer model (e.g., a fairness assessment), or assesses a model performance for the trained computer model (e.g., an accuracy of the model, or generalizability of the model to other data). In some examples an assessment could assess datasets to which the trained computer model is applied for performance monitoring such as assessing model drift, fairness, or accuracy. The component assessment(s) 1464 are shown in the graphical representation(s) 1460 in a notched donut shape merely as an example. The component assessment(s) 1464 could begin and end at different points on the donut shape. More or less component(s) could be included. The shape could be a shape dependent on the number of components, such as a donut for one or two components, a triangle for three components, a square for four components. One of ordinary skill in the art will appreciate that the graphical representation(s) 1460 could have other shapes, forms, and orientations than those explicitly described. For instance, FIG. 17A shows icons with a different orientation of components and separation between components. Additionally, one of ordinary skill in the art will appreciate multiple overall assessments can be used as shown in examples described herein (e.g., for performance monitoring and training assessment).

The computing device 1440 has a computer-readable medium 1450 and a processor 1442 for generating a model card (e.g., the model card 1430). Computer-readable medium 1450 is an electronic holding place or storage for information so the information can be accessed by processor 1442. Computer-readable medium 1450 can include, but is not limited to, any type of random-access memory (RAM), any type of read only memory (ROM), any type of flash memory, etc. such as magnetic storage devices (e.g., hard disk, floppy disk, magnetic strips), optical disks (e.g., compact disc (CD), digital versatile disc (DVD)), smart cards, flash memory devices, etc.

Processor 1442 executes instructions (e.g., stored at the computer-readable medium 1450). The instructions can be carried out by a special purpose computer, logic circuits, or hardware circuits. In one or more embodiments, processor 1442 is implemented in hardware and/or firmware. Processor 1442 is implemented in hardware and/or firmware. Processor 1442 executes an instruction, meaning it performs or controls the operations called for by that instruction. The term "execution" is the process of running an application or the carrying out of the operation called for by an instruction. The instructions can be written using one or more programming language, scripting language, assembly language, etc. Processor 1442 in one or more embodiments can retrieve a set of instructions from a permanent memory device and copy the instructions in an executable form to a temporary memory device that is generally some form of RAM, for example. Processor 1442 operably couples with components of computing device 1440 (e.g., interface(s) 1444, and computer-readable medium 1450) to receive, to send, and to process information.

In one or more embodiments, computer-readable medium 1450 stores instructions for execution by processor 1442. For instance, one or more applications stored on computer-readable medium 1450 are implemented in software (e.g., computer-readable and/or computer-executable instructions) stored in computer-readable medium 1450 and accessible by processor 1442 for execution of the instructions.

For example, in one or more embodiments, the computer-readable medium 1450 comprises instructions for model manager application 1452. In some embodiments the model manager application 1452 is used to generate a model card (e.g., model card 1430). In this context, the model manager application 1452 could be used to obtain a selection of one or more assessment type(s) 1458. The assessment type(s) 1458 indicate the overall assessments and/or components for an overall assessment of the trained computer model. For example, the assessment type(s) 1458 could be predefined (e.g., for generating aspects of a model card automatically). The assessment type(s) 1458 could be received via interface(s) 1444 to change predefined assessments or add additional assessments (e.g., input received to indicate a user selection). The model manager application 1452 can be used to generate assessment(s) 1454. For example, the model manager application 1452 could generate an overall assessment 1462 of the trained computer model according to the assessment type(s) 1458 by generating an overall assessment 1462 based on component assessment(s) 1464. The model manager application 1452 could generate graphical representation(s) 1460 including visual representation of both the overall assessment 1462 and one or more component assessment(s) 1464 for display (e.g., in display 1420).

In one or more embodiments, generation of a model card (e.g., model card 1430) or aspects of the model card (e.g., graphical representation(s) 1460 or textual representation(s) 1432) are responsive to obtaining a trained computer model. For instance, a trained computer model, whether trained by the computing device 1440 or received from an external system (e.g., computer model 1410), can be registered with the model manager application 1452 such that the generation is responsive to a registered computer model (e.g., registered computer model 1456). Alternatively, or additionally, model card 1430 can provide an interactive model card visualization such that display 1420 can receive input indicating changes to the model card 1430 and the model card 1430 will be updated in the display 1420. For instance, the model manager application 1452 can update assessment(s) 1454 and a model card or aspects of a model card can update in a display responsive to assessment updates. For instance, the interface(s) 1444 can receive inputs indicating to change how assessments are conducted or to provide updated data, and model card 1430 can be updated responsively. Accordingly, model cards in embodiments can advantageously accommodate time-varying information or other changing information while a model card is in use.

In some contexts, the model manager application 1452 is used to update the navigator interface component 1434. For instance, the model manager application 1452 can be used to generate assessment(s) 1454 for predefined events for updating alerts using navigator interface component 1452. Alternatively, or additionally, the model manger application 1452 can be used for forming associations with one or more assets pertaining to computer models (e.g., a registered computer model 1456) in an asset system navigated using navigator interface component 1434.

In one or more embodiments, fewer, different, and additional components can be incorporated into computing device 1440. For instance, in one or more embodiments, there are one or more input devices or computing systems (e.g., for controlling assessment(s) 1454, assessment type(s) 1458, or registering a registered computer model 1456). In the same or different embodiments, there are one or more output devices or computing systems (e.g., one to display the model card 1430 and one to display received input for controlling the model card 1430). As another example, interface(s) 1444 could have more than one input interface that uses the same or different interface technology. Alternatively, or additionally, the interface(s) 1444 could have more than one output interface that uses the same or different interface technology. In embodiments, display 1420 displays both a navigator interface component 1434 and a model card 1430 (e.g., by displaying a model card in association with an asset reachable using the navigator interface component 1434). Alternatively, or additionally, the display 1420 displays only a navigator interface component 1434 without also showing model card 1430. Alternatively, or additionally, the display 1420 displays only a model card 1430 without a navigator interface component 1434.

The one or more applications in computer-readable medium 1450 can be integrated with other analytic tools. As an example, model manager application 1452 can be integrated with data analytics software application and/or software architecture such as that offered by SAS Institute Inc. of Cary, N.C., USA or other companies. Merely for illustration, the applications are implemented using or integrated with one or more software tools such as JMP®, Base SAS, SAS® Enterprise Miner™, SAS/STAT®, SAS® High Performance Analytics Server, SAS® Visual Data Mining and Machine Learning, SAS® LASR™ SAS® In-Database Products, SAS® Scalable Performance Data Engine, SAS® Cloud Analytic Services, SAS/OR®, SAS/ETS®, SAS® Inventory Optimization, SAS® Inventory Optimization Workbench, SAS® Visual Analytics, SAS® Viya™, SAS In-Memory Statistics for Hadoop®, SAS® Forecast Server, and SAS/IML®.

One or more applications stored on computer-readable medium 1450 can be implemented as a Web application. For example, an application can be configured to receive hypertext transport protocol (HTTP) responses and to send HTTP requests. The HTTP responses may include web pages such as hypertext markup language (HTML) documents and linked objects generated in response to the HTTP requests. Each web page may be identified by a uniform resource locator (URL) that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java applet, an extensible markup language (XML) file, or any other type of file supported by HTTP.

FIG. 15 illustrates a flow diagram for displaying a model card visualization. Embodiments described herein, including the method depicted in FIG. 15, FIG. 27, and FIG. 30, can be implemented by a computing system (e.g., system 1400). The computing system can be multiple or a single device (e.g., computing device 1440).

The method 1500 includes an operation 1501 for receiving a trained computer model trained on a training dataset. The training dataset indicates inputs for variables in a training system and outputs of the training system. For example, a computing system can generate the trained computer model from the training dataset and a computing system can receive a trained computer model when the computer model is registered for generation of a model card. Alternatively, or additionally, the computing system can receive the trained computer model or the training dataset from an external system.

The method 1500 includes an operation 1502 for obtaining a selection of an assessment type. The assessment type includes more than one component for determining an overall assessment of the trained computer model according to the assessment type. The assessment type can be obtained from predefined settings or computer-generated based on the received trained computer model. For example, the computing system can determine if the trained computer model is of a predefined type (e.g., a predictive model, classification model, or analytical model). The computing system can obtain the selection of the assessment type by generating a computer-generated selection based on the predefined type (e.g., generating accuracy assessment for a predictive model or generating a fairness assessment for a classification model).

The method 1500 includes an operation 1503 for generating, responsive to obtaining the trained computer model, an overall training assessment of the trained computer model according to the assessment type. The generating the overall training assessment can be done by obtaining multiple component assessments. The multiple component assessments include at least one assessment for each of the more than one components for determining the overall assessment. In some examples, a first assessment of the at least one assessment assesses elements of the training dataset pertaining to one or more model terms in the trained computer model. In other examples, the first assessment assesses a model performance for the trained computer model. The overall training assessment is then generated based on the multiple component assessments.

The method 1500 includes an operation 1504 for generating a first graphical representation comprising visual representation of both the overall training assessment and the multiple component assessments. FIG. 17A shows example graphical representations pertaining to accuracy, generalizability and fairness assessments of a trained computer model.

The method 1500 includes an operation 1505 for displaying the first graphical representation in a model card visualization. A model card visualization can include textual and graphical representations of the trained computer model. Alternatively, or additionally, a model card visualization can include textual and graphical representations of the training dataset. A model card visualization can include other assessments and overall assessments (e.g., ones pertaining to performance monitoring). One of ordinary skill in the art will appreciate that other example methods could include more, or fewer operations as shown in examples described herein.

Figure 16A:
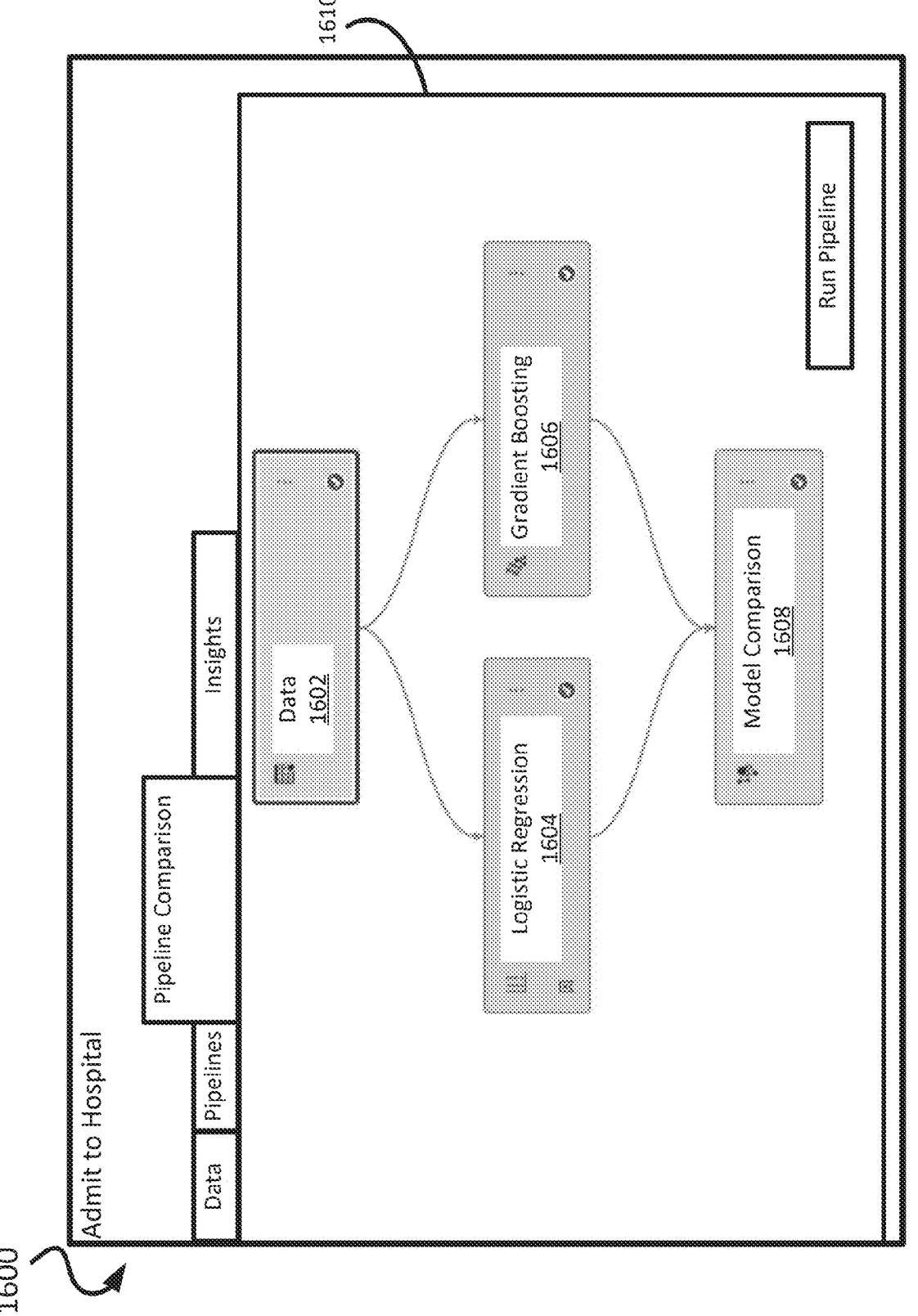

FIGS. 16A-16D illustrate graphical user interface(s) for generating a model card. FIG. 16A shows an example graphical user interface 1600 for training a model. In this example multiple models are created and trained in a pipeline on a training dataset. The models are generated using SAS® Model Studio, but other systems can be used to generate a model (e.g., systems for generating SAS®, R, and Python® models). A pipeline comparison element 1610 of a graphical user interface 1600 allows performance comparison of models. Data is gathered in a data stage 1602 of a pipeline. A logistic regression model stage 1604 applies a logistic regression model to the data and a gradient boosting model stage 1606 applies a gradient boosting model to the data. Different or additional model techniques could have been used. A model comparison stage 1608 of the pipeline is used to compare the model performances. A computing system (e.g., system 1400 or computing device 1440 of FIG. 14) can receive a trained computer model from an internal program or from an external system external to the computing system.

Figure 16B:
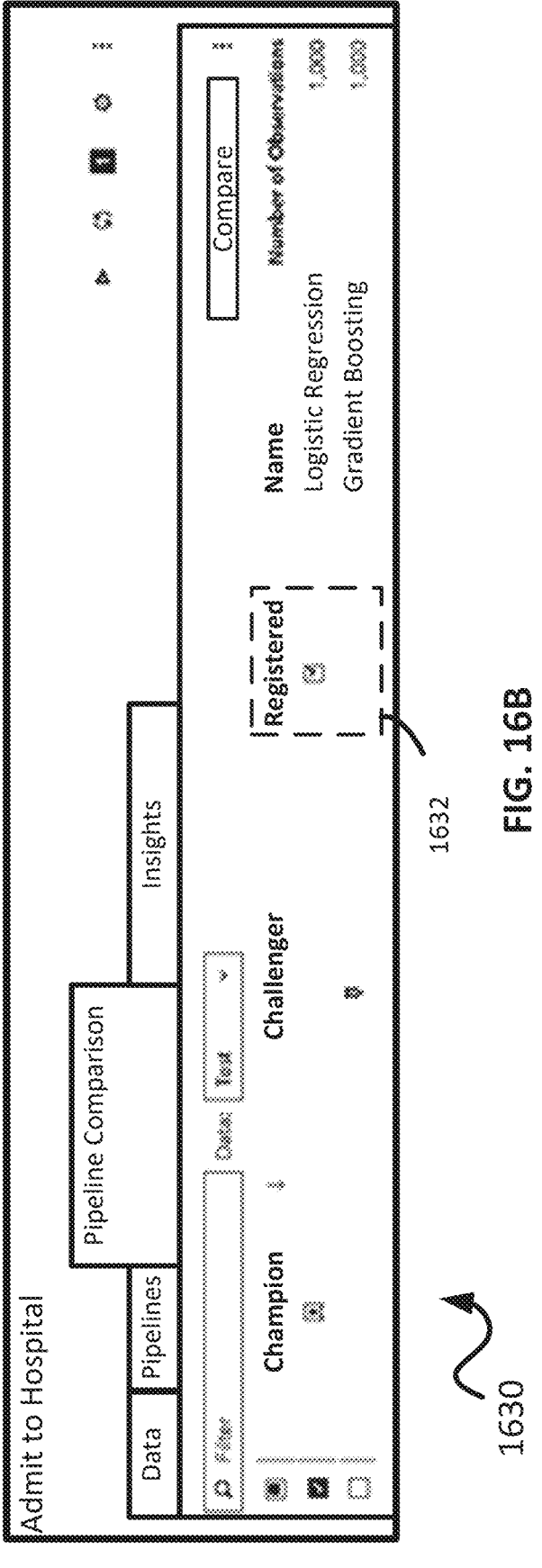

The computing system can register the trained computer model with a model manager software program (e.g., model manager application 1452 of FIG. 14) executed by the computing system to generate the model card visualization. FIG. 16B shows an example graphical user interface 1630 showing a model selection for generation of a model card. In this example, a computing system determines the logistic regression model is the champion model. The computing system can select this model for registration as the default using registration selection 1632. Alternatively, or additionally, a user could use registration selection 1632 to select a model (e.g., the model determined to be a challenger model). The model card visualization can be opened within SAS® Model Manager but other tools can be used.

In one or more embodiments, a computing system can store information for generating and displaying textual information or graphical representation pertaining to a registered model in files accessible by a model manger software program. Stored content can come from user-supplied content, but it can also or alternatively come from a computing system generating a model or analyzing a model (e.g., analysis report content, JSON files, and/or information catalogs accessible via an application programing interface, API). For example, a computing system can import one or more files for the registered model (e.g., JSON files). The files can indicate the information of a model location. For example, in case of an SAS ASTORE model an a AstoreMetadata.json file can keep the information of the model location. The files can indicate various metrics pertaining to a computer model. The metrics could include, for example, standard key performance indicators (KPIs) specific to a model function (e.g., a dmcas_fitstat.json file can have AUC or ASE indicators, separated by partition), lift chart values (e.g., dmcas_lift.json), and misclassification values (e.g., dmcas_lift.json). The files can include information pertaining to a computer model. For example, the information could include model type information (e.g., dmcas_modelInfo.json), hyperparameter settings of the algorithm (e.g., dmcas_properties.json), input variables that are expected by the model (e.g., dmcas_scoreinputs.json), relative variable importance for each input variable (e.g., dmcas_relativeimportance.json) and output variables that are generated by the model (e.g., dmcas_scoreoutputs.json). The files can include model performance information. For example, the files can include a receiver operating characteristic (ROC) chart (e.g., a dmcas_roc.json), model performance KPIs for different levels of a sensitive variable (e.g., groupMetrics.json), and maximum differences between levels (e.g., maxDifferences.json). Metrics or values can be separated by partition or in a different format (e.g. in a dmcas_misc.json).

The computing system can also import information pertaining to training data. The training data can be attached to the model at the time of model registration, and/or users can attach the data to the model and a rest API can run the analysis report (via information catalog) and subsequently pull that information about the dataset into the model card.

Figure 16C:
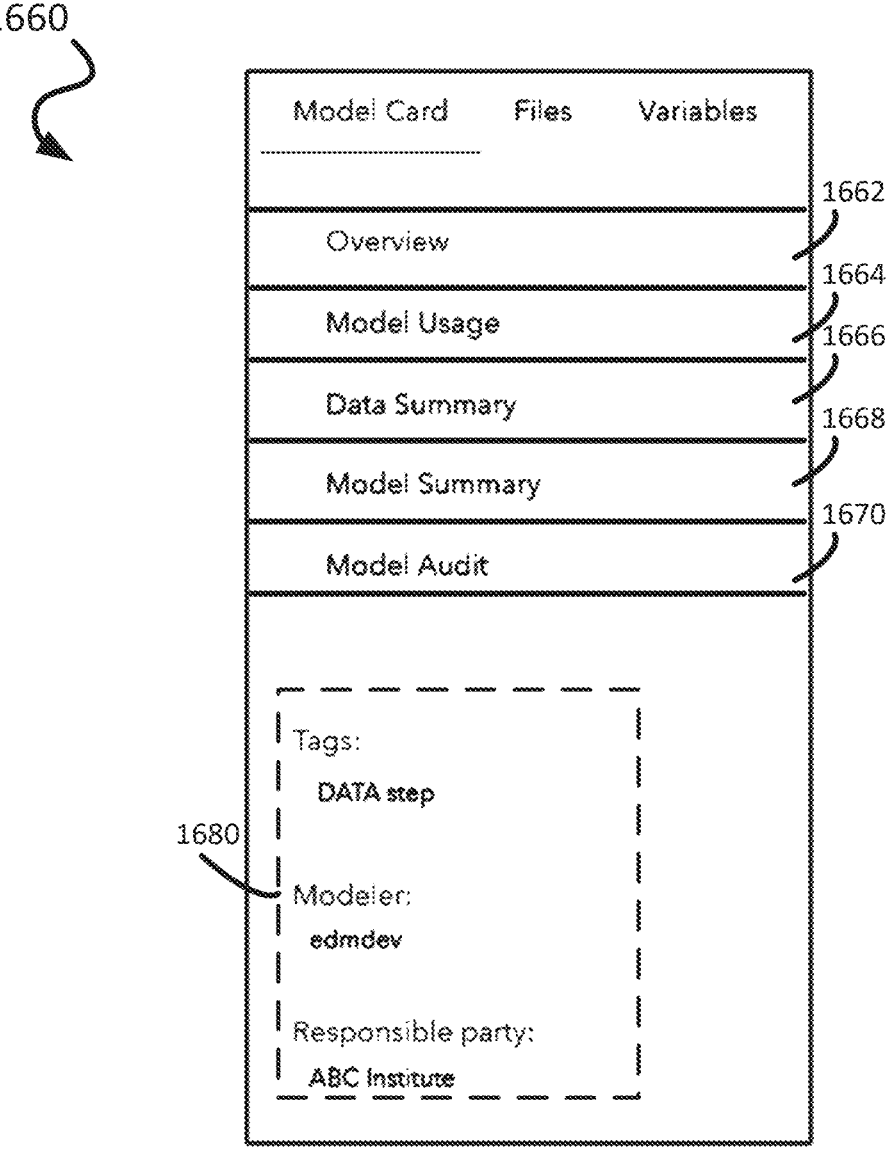

FIG. 16C shows a navigation pane 1660 of a generated model card visualization. Aspects of the model card can be automatically generated (e.g., pre-populated from imported or generated files without user input). The model card visualization can display a navigation pane 1660 for navigating through different elements of the model card. Navigation tools within the interactive model card allow users to progressively display additional information such as metrics, help text, and graph options. Progressive display allows a user to easily process smaller subsets of information rather than being bombarded with technical detail all at once.

For instance, an overview selection 1662 can display an overview section of the model card. The overview section can provide, for example, curated information explaining how well a model is performing for ensuring a trained computer model is reliable, trustworthy, and adequate for decision-making. The overview can provide, for example, information pertaining to model health, variables creating the most impact on model results, and fairness indicators for sensitive or private data used in a model. FIGS. 17A-17C and FIGS. 18A-18B show example elements of an overview section of a graphical user interface.

FIG. 16C shows a generated model card. The model card visualization can display a navigation pane 1660 for navigating through different elements of the model card. For instance, an overview selection 1662 can display an overview section of the model card. The overview section can provide, for example, curated information explaining how well a model is performing for ensuring a trained computer model is reliable, trustworthy, and adequate for decision-making. The overview can provide, for example, information pertaining to model health, variables creating the most impact on model results, and fairness indicators for sensitive or private data used in a model.

A model usage selection 1664 of the navigation pane 1660 can display information relevant to a person using a model associated with the model card such as how the model should be used and how it should not be used. It can provide ethical considerations and limitations for a model associated with a model card. FIG. 21 shows an example of a model usage element of a graphical user interface.

Figure 22A:
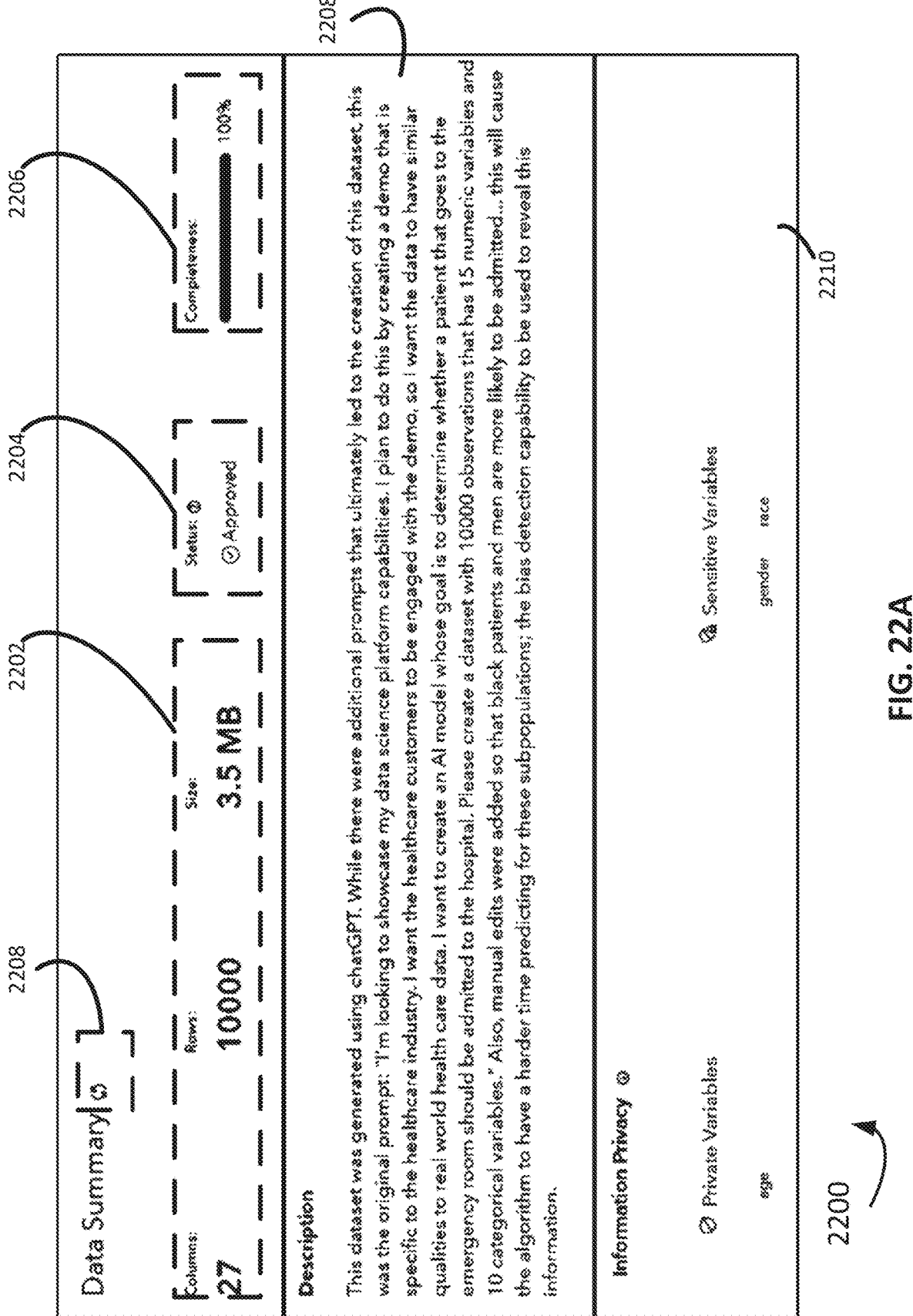

A data summary selection 1666 of the navigation pane 1660 can provide information pertaining to data used to train a model. For example, it can be useful for business analysts and data engineers by providing wholistic information pertaining to the data such as a roll-up look at data size, completeness and source. It can also provide specific information pertaining to a training dataset such as privacy classification assigned to variables within the data, and information on outliers and variables. FIGS. 22A-22B show an example data summary element of a graphical user interface.

Figure 23A:
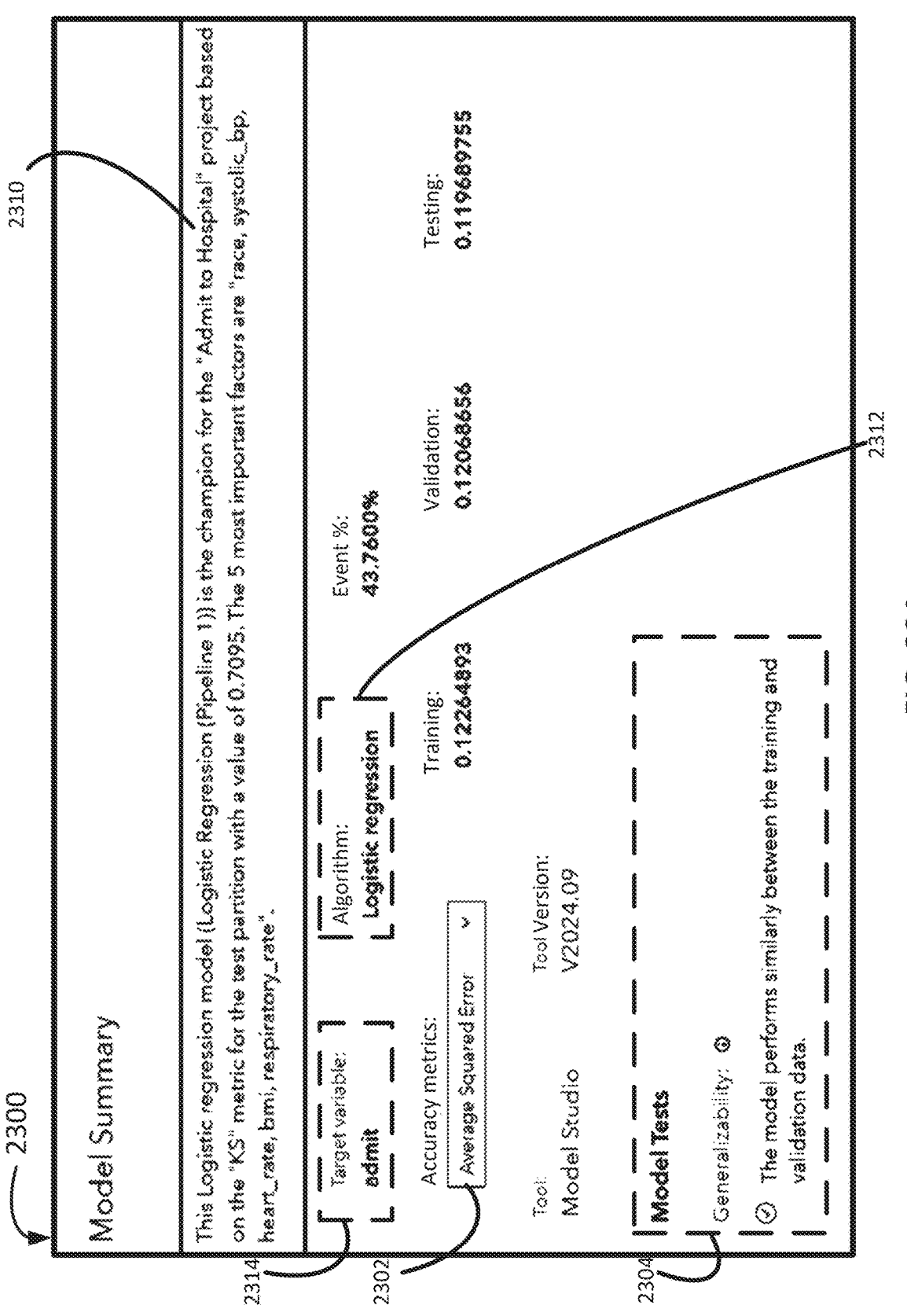
FIGS. 23A-23D illustrate graphical user interface model summary element(s) of a model card according to at least one embodiment of the present technology.

A model summary selection 1668 of the navigation pane 1660 shows detailed information pertaining to a model associated with the model card such as model type, outcome/target variable, user-selected values to evaluate the model's performance, and fairness assessments. This information can be helpful for data scientists. FIGS. 23A and 23D show an example model summary element of a graphical user interface.

Figure 24A:
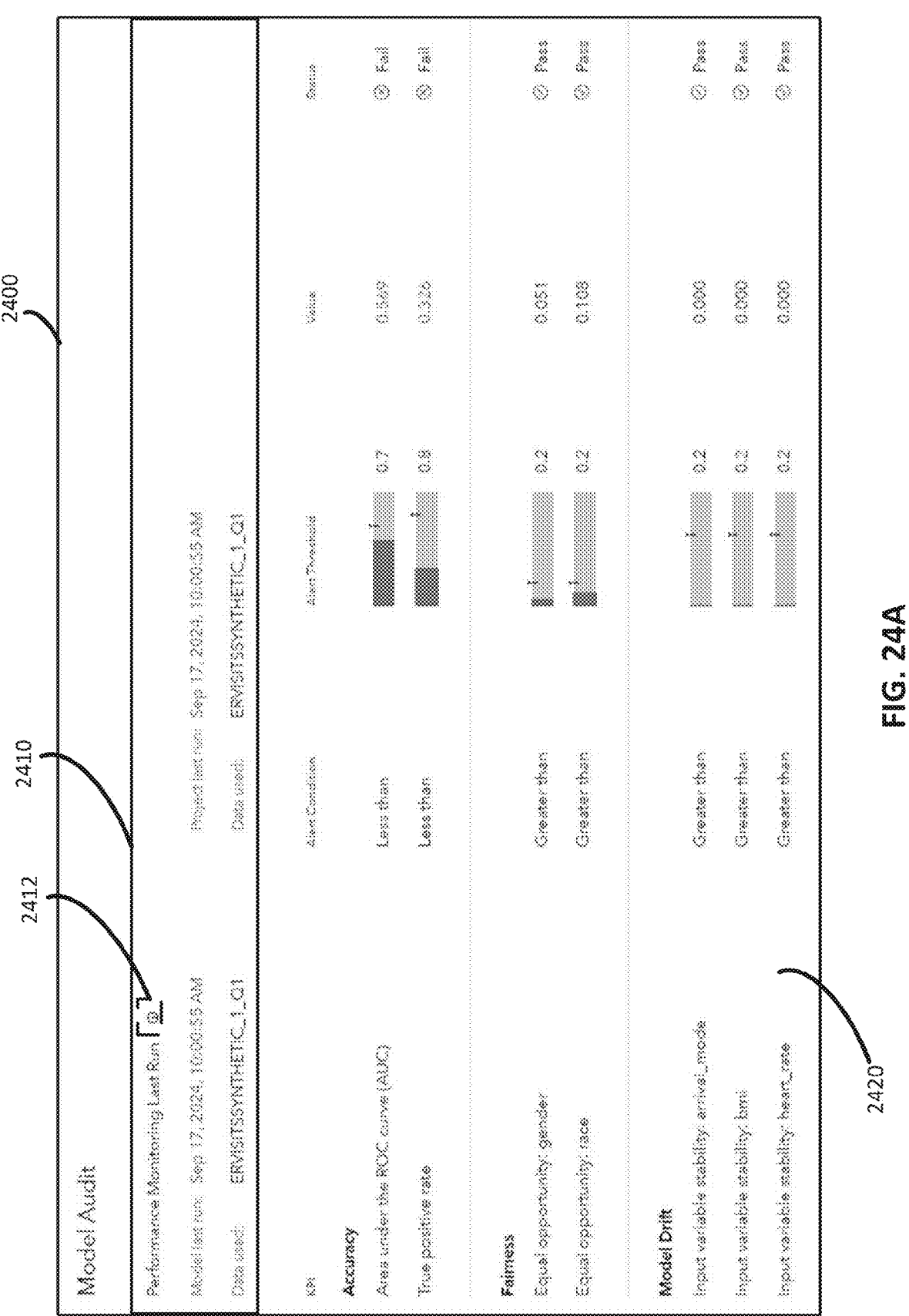

A model audit selection 1670 of the navigation pane 1660 can show interactive metrics and rules applicable to model evaluation over time such as alert thresholds and whether the model has met or surpassed these thresholds. This information and interactivity can be useful for data scientists and model engineers. FIG. 24A shows an example model audit element of a graphical user interface.

The navigation pane 1660 can also display additional information itself. For example, portion 1680 displays information pertaining to data tags, the identity of the modeler that generated a trained computer model associated with a model card, and the identity of the party responsible for the computer model. One of ordinary skill in the art will appreciate different or additional interactive elements could be a part of a navigation pane for navigating through a model card. Alternatively, or additionally, a model card could not have a navigation pane.

Model cards according to embodiments can be domain-agnostic but need not have a single template. Templates can be developed specific to the needs of a particular domain or industry (e.g., fraud detection and healthcare services). Alternatively, or additionally, they can be altered by the user for a specific industry. Further, the model card template selected by the computing system can be based on the model type, and the computing system can automatically determine and generate the appropriate model card template to use providing the information that's most applicable for that particular model type. The example model cards shown in Figures are merely an example for the healthcare industry but can be applied to other industries or model types and with different or additional features.

In one or more embodiments, generation of the model may have generated additional assessments which can be used in generating the model cards. For example, FIG. 16D shows a data tab element 1690 of a graphical user interface used to generate a computer model in SAS® Model Studio. The data tab element 1690 shows a listing of variables used in generating the computer model as well as information pertaining to those variables such as their types, roles, levels, or orders. In one or more embodiments, a computing system can receive an indication to access variables for bias. For example, as shown in section 1692, the user has selected gender and race as variables for computer assessment of bias. Since the user has checked at least one variable to be assessed for bias at the time the model was trained, fairness information (e.g., an equal opportunity metric) can be automatically generated and displayed on the model card for the selected variables. For example, an equal opportunity metric measures the largest true positive rate (TPR) difference among variable levels where the variable was marked to be assessed for bias. FIGS. 16A-16D show one example of creation and registration of a model for a model card. However, models can be created and accessed in other systems than those specifically shown here. Embodiments related to generating a model card can be agnostic to the system that created a model. One or more embodiments can generate aspects of a model card without user input into the model card (e.g., model card aspects related to training assessments).

FIG. 17A illustrates a graphical user interface with an overview element 1700 of a model card pertaining to training assessments. By providing pass and fail icons indicating overall training assessments, users can more easily understand whether a model is accurate and trustworthy.

FIG. 17A shows an example overall training assessment for an accuracy assessment 1710 where the overall training assessment assesses an accuracy of the trained computer model (e.g., using a pass/fail message or icon). One or more component assessments of the accuracy assessment 1710 relate to different accuracy metrics. Accuracy metrics are used to evaluate the accuracy of the model using the training data. Metrics can be user selected and/or predefined (e.g., related to a misclassification metric or predictability in variation of outcome). For instance, in this example there is only one component assessment related to a misclassification error rate (MCE). In some examples, a computing system can display default metrics responsive to the model type. For instance, an MCE metric can be used by default to evaluate a classification model, and an R-squared metric can be used to evaluate a prediction model. In the accuracy assessment 1710, there is only a component related to MCE that appears as a donut around the pass message. The green color indicates this component metric has passed.

A computing system can display in graphical user interface an Overview Element 1700 with multiple graphical representation that indicates an additional or alternative overall training assessments (e.g., generalizability assessment 1720 and fairness assessment 1730). For instance, generalizability assessment 1720 measures performance of a trained computer model between the training dataset and validation dataset. In this case the generalizability assessment 1720 indicates a pass to indicate a trained computer model has passed this overall training assessment. It could have indicated a failure message. One or more component assessment metrics measure whether the model performs similarly between the training and validation data. They indicate whether the model can generalize well to data with similar characteristics.

In the example of the generalizability assessment 1720 there is only one component shown, and the computing system determines this component by obtaining a first assessment of the performance of a trained computer model on a training dataset and obtaining a second assessment of the performance of the trained computer model on validation dataset, and generating a third assessment indicating a generalizability of the trained computer model based on a difference between the first assessment and the second assessment. The model card visualization shows this difference in a graphical representation of the generalizability assessment 1720 by indicating the third assessment passed in a green notched donut shape. These assessments can be user selected or predefined. For example, a computing system can use a misclassification metric (e.g., MCE) by default for a classification model to compare the training and validation data, and an R-squared metric for a prediction model.

Fairness assessment 1730 is another example of an overall training assessment. In this example though there are multiple component assessments. The icon shows a "Fail" message to indicate the overall training assessment has failed, even though some component assessment metrics passed (indicated by the color green in slices 1732), because one assessment failed (indicated by the color red in slice 1734). Fairness metrics are used to measure bias for a model using training data and relate to respective variables of multiple variables used in the trained computer model. Fairness metrics aim to quantify fairness, ensuring that models do not unintentionally harm individuals based on underlining characteristics such as age, gender, race, or socioeconomic status. Fairness metrics could include variables found to be private such as information that might identify an individual. Fairness metrics could include variables found to be sensitive such as sensitive social characteristics information about an individual. Fairness metrics could include variables found to be candidates for sensitive or private information such as information that might identify an individual when combined with other information.

In this example in FIG. 17A, the model card visualization had at least three graphical representations indicating an overview of training assessments for the trained computer model including accuracy assessment 1710, generalizability assessment 1720, and fairness assessment 1730. One of ordinary skill in the art will appreciate that a model card visualization could include more or less overall training assessments.

Icons for training assessments in this example are different from typical donut charts, which include slices that vary in size to visually represent the data in that particular slice. In contrast donut icons in the model card visualization allow slices to be the same size while conveying different information. Further, they have notches separating the components rather than displaying as a continuous donut ring. The donut icons or status donut chart need not communicate an actual value itself, but rather, can communicate other information such as whether the value met a threshold that was configured for that particular value. For instance, they can display important information such as whether the slices in the status donut chart show a "Pass" or a "Fail". Alternatively, or additionally, this status can be communicated by color such as denoted using red vs green coloring. In this example, if all slices have passed and are therefore green, then the message in the middle of the chart will read "Pass". If at least one slice is set to "Fail", then while the rest of the slices might technically be "Pass", the message in the middle of the chart will still show "Fail". Other configurations could be set up such as showing a "Pass" if a certain percentage of components are "Pass". In this example, each slice has an associated label to communicate what that particular slice is measuring. One of ordinary skill in the art will appreciate other graphical representation types for these icons such as polygon shapes or different colors or word labels such as "success" and "failure".

A computing system in embodiments can display other information pertaining to the computer model or the model card. For instance, textual information 1704 indicates that the model card has not yet been published. Textual information 1706 indicates that limitations or usage parameters of the model card are documented (e.g., using imported information or manually entered by a user). Textual information 1708 indicates fairness assessment are available. This can be used for generating the graphical representation of the fairness assessment 1730. Textual information 1709 indicates that the programing language for the model is SAS®. One of ordinary skill in the art will appreciate other textual or graphical representations that could be displayed in overview element 1700. For instance, the overview element 1700 displays textual information 1707 describing a model purpose generated from documented model parameters. In this example, the model purpose is to predict the likelihood that ER patients will be admitted to the hospital.

In one or more embodiments, the model card visualization is an interactive model card visualization with changing textual or graphical representations. For instance, as limitations are updated or changed, these textual information on a model card can change. For example, textual information 1706 may initially show "No" that limitations are not documented until the user changes those limitations. As another example, the assessment types shown in FIG. 17A (e.g., accuracy, generalizability and fairness types) could be obtained by the computing system accessing a predefined configuration responsive to receiving the trained computer model and could display the model card visualization responsive to generating the overall training assessment. However, the computing system can receive (e.g., via a graphical user interface) a change in the selection of the assessment type, or a change to a component type for the assessment type, and update the model card visualization responsive to the change. Overview element 1700 can also be displayed in proximity to other information in the model card which can be dynamically updated (e.g., navigation pane 1660 of FIG. 16C). For instance, information in navigation pane 1660 can change over the lifecycle of the model such as the responsible party in portion 1680 of navigation pane 1660.

The message 1702 shown in FIG. 17A indicates default thresholds are used to determine the assessments. In one or more embodiments, a computing system generates the multiple component assessments by obtaining a selection of a threshold requirement for each of the more than one components (e.g., a default selection or a user-specified selection). The computing system determines whether a given threshold requirement is met by the trained computer model for each of the one or more components and the overall training assessment indicates whether each of the threshold requirements are met.

Tools that require a user to configure dozens of settings before allowing a user to see the tool have a low likelihood of being used. Embodiments can include default settings for what constitutes a "Pass" or "Fail" for each metric. While a computing system can provide default thresholds for users upon the initial view of the model card, a blue warning text in message 1702 encourage users to set their thresholds based on their use case, so users can apply their own relevant thresholds to specific use cases. Other techniques could be used to draw attention to these messages (e.g., different colors, added boarders, pop-up messages). These defaults can be adjusted by the user. Users can set these thresholds at the model level or a project level applying to models in a project.

Figure 17B:
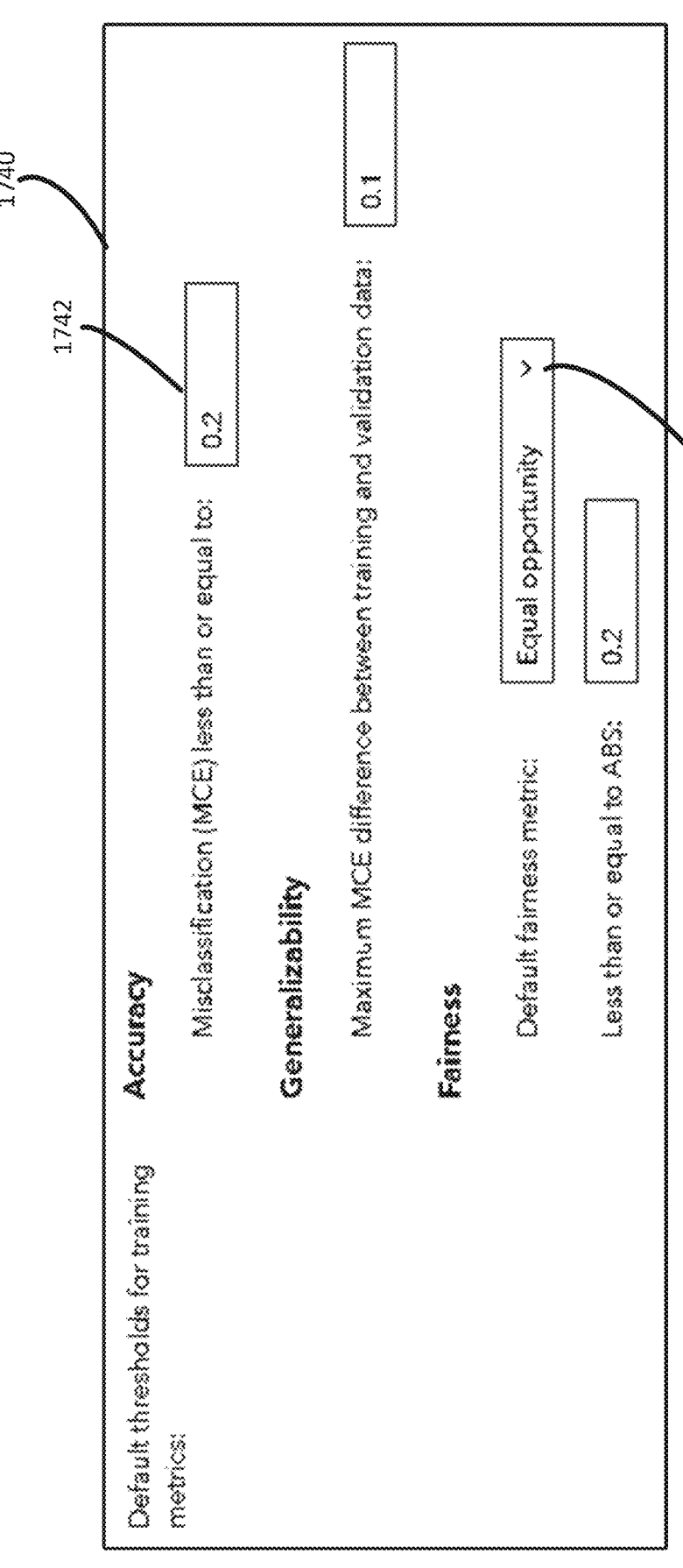

For instance, FIG. 17B shows a graphical user interface element 1740 for changing a component type for an assessment type. In this example, the user can change a component type by adjusting default thresholds for training metrics for individual component types. For instance, the threshold could be increased for an accuracy assessment (e.g., accuracy assessment 1710 in FIG. 17A) by changing the text value in text box 1742. As another example, the component type can be changed by adjusting the metric type. In this example, selection tool 1744 shows the equal opportunity metric is used by default to measure the fairness of a model for a fairness assessment (e.g., fairness assessment 1730 in FIG. 17A). The equal opportunity metric measures the largest true positive rate (TPR) difference among variable levels where the variable are marked to be assessed for bias (e.g., as shown in FIG. 16D). A user can then use the selection tool 1744 to select other metrics types for fairness (e.g., demographic parity, predictive parity, equal accuracy, and equalized odds).

Figure 17C:
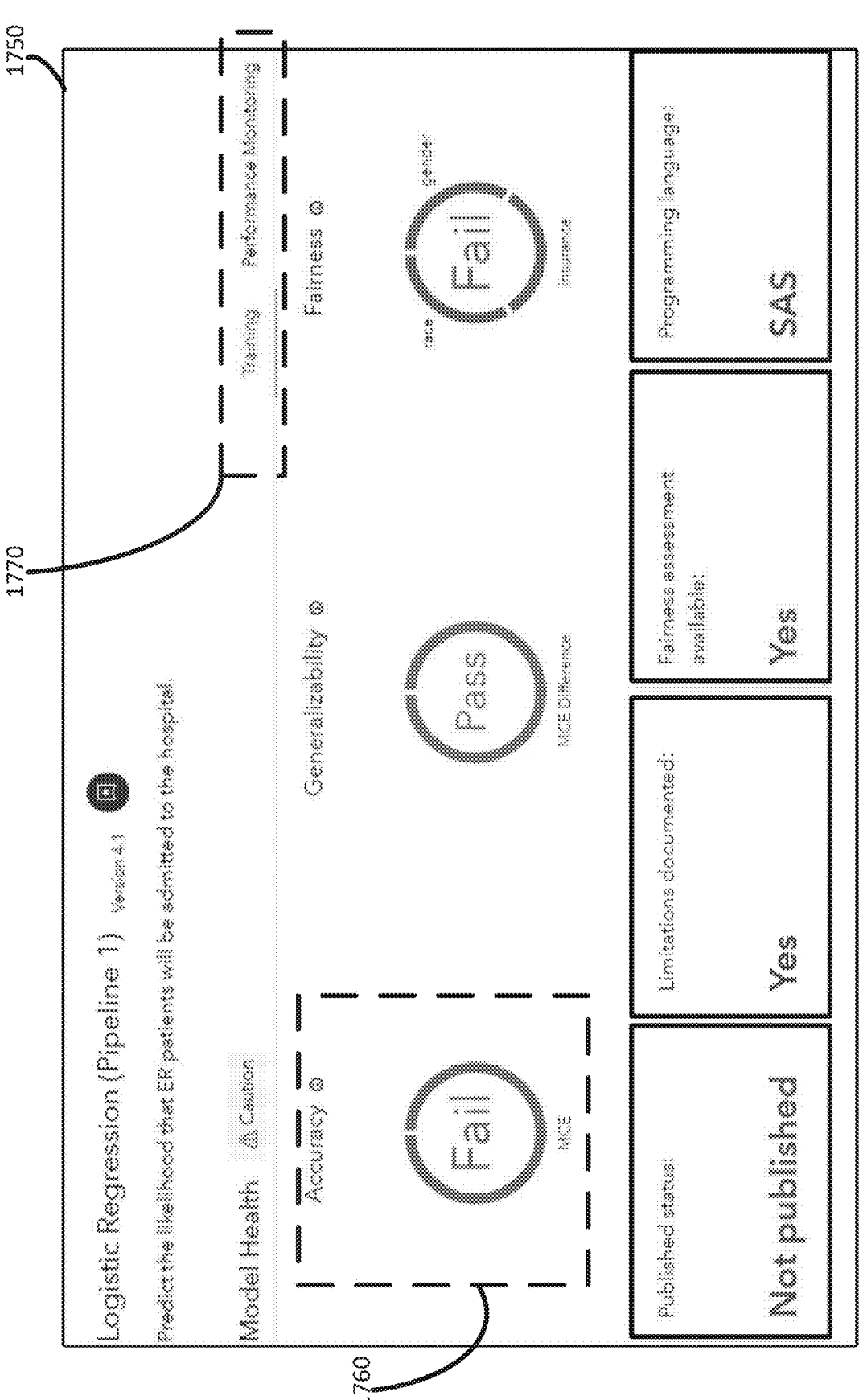

FIG. 17C illustrates a graphical user interface overview element 1750 of a model card updated in view of changes made in FIG. 17B. For instance, the accuracy assessment

1760 now shows a fail state icon in view of the threshold change. The message 1702 shown in FIG. 17A regarding default thresholds is no longer present in this view because the computing system has received updates to the thresholds.

In one or more embodiments, the interactive model card visualization allows the model card to display additional information pertaining to performance monitoring criteria. For instance, navigation options 1770 allow a user to navigate to information in a model card pertaining to performance monitoring assessments. A graphical user interface can display in the model card visualization additional graphical representation(s) responsive to performance monitoring (e.g., in response to one or more key performance rules). For example, a computing system can receive (e.g., via a graphical user interface displaying the model card visualization) a selection of a performance monitoring criteria for the trained computer model applied to data other than the training dataset.

Figure 18A:
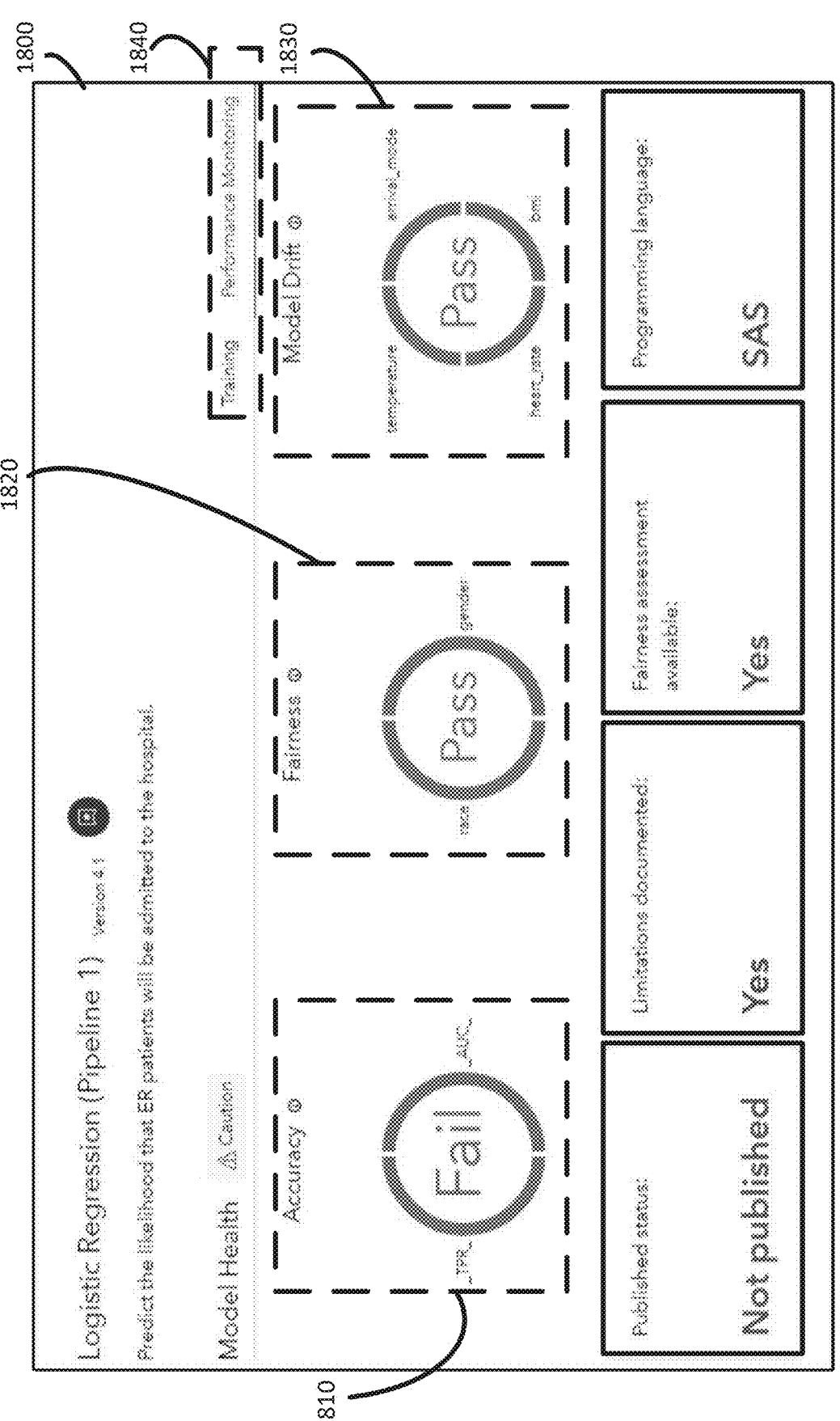
FIGS. 18A-18B illustrate graphical user interface overview element(s) of a model card pertaining to performance monitoring assessments according to at least one embodiment of the present technology.
Figure 18B:
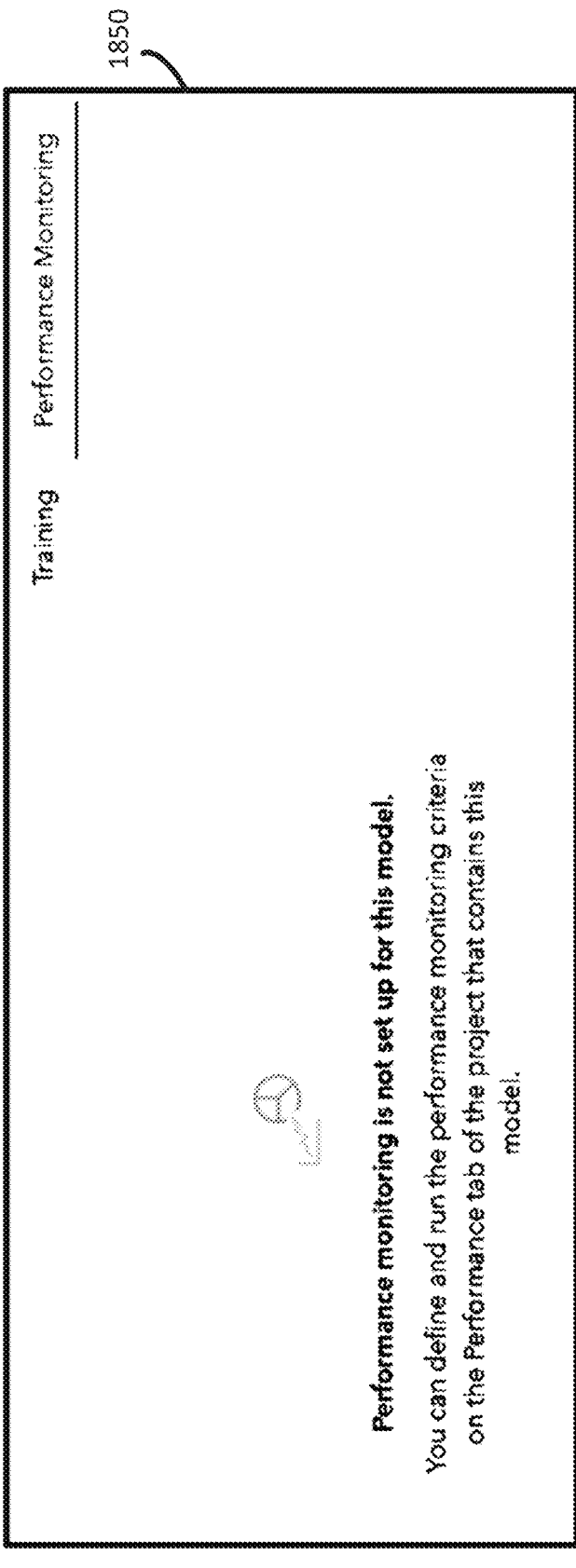

FIG. 18A illustrates a graphical user interface with an overview element 1800 of a model card pertaining to performance monitoring assessments. This example shows graphical representations each represents an overall monitoring assessment specific to performance monitoring criteria. For example, graphical representation 1810 displays an overall monitoring assessment pertaining to accuracy of the trained computer model in use. Accuracy metrics are used to evaluate the accuracy of the model. In this example, the trained computer data is applied to additional data not used in training the computer model. For instance, in this case even though on the training tab the accuracy assessment showed a pass icon, here it shows a fail icon when applied to the new data. In one or more embodiments, these performance criteria are determined based on a computing system computing metrics related to key performance indicator (KPI) alert rules and other model evaluation properties. These rules and properties can be specified for a specific model or can be defined at the project level such as at the time a computing system monitors one or more models in a project for performance. KPI alert rules are shown in more detail with respect to FIGS. 24A-24D.

The performance monitoring criteria can have one or multiple component criteria. For example, the graphical user interface in FIG. 18A shows a graphical representation 1810 that depicts an accuracy assessment with component criteria related to True Positive Rate (TPR) and Area under the ROC curve (AUC). The computing system can generate an overall monitoring assessment specific to the performance monitoring criteria by generating a respective assessment for each of the multiple component criteria and generating the overall monitoring assessment based on the respective assessment for each of the multiple component criteria. For example, the computing system has determined that each of the component metrics failed criteria, and the overall accuracy assessment is one of failure. Graphical representation 1810 depicts this overall monitoring assessment and the multiple component criteria. The computing device can display one or more graphical representations related to training and one or more graphical representations related to performance monitoring in the model card visualization (e.g., using navigation tabs 1840). For example, FIG. 17A shows an example training tab display, and FIG. 18A shows an example performance tab display.

In one or more embodiments, multiple graphical representations can be displayed indicating an overall monitoring assessment specific to performance monitoring criteria. For instance, FIG. 18A additionally shows a graphical representationtation 1820 indicating a fairness assessment. Fairness metrics are used to measure bias for a model. They aim to quantify fairness, ensuring that models do not unintentionally harm individuals based on underlining characteristics such as age, gender, race, or socioeconomic status. In this example, the graphical representation 1820 has two components for two monitored variables related to race and gender. Fairness metrics can be computed based on the KPI alert rules and other model evaluation properties and can be defined for a specific model or defined at the project level at the time that the model is monitored for performance. KPI rules can be generated by a computing system (e.g., responsive to information or user input). KPI rules are discussed in more detail with respect to FIGS. 24A-24D. KPI rules can also be used to monitor other metrics (e.g., model drift).

FIG. 18A additionally shows a graphical representation 1830 indicating a model drift graphical representation. Model drift can occur when there is a shift in the distribution of an input or output variable over time. Model drift can negatively impact model performance, resulting in inaccurate predictions. Performance monitoring criteria can indicate stability for one or more variables of the trained computer model. In this example, model drift metrics measure the population stability index (PSI) for each selected variable (e.g., temperature, arrival mode, heart rate, and body mass index, bmi). A computing system computes these metrics, shown as components of graphical representation 1830, based on KPI alert rules and other model evaluation properties that are defined for a specific model or at the project level at the time that the model is monitored for performance.

Features like this can allow the model card to be interactive and account for time-varying information. When a performance monitoring definition runs, results can automatically populate on an associated model card. For instance, a computing system can receive updated information for one or more components of the performance monitoring criteria and update a graphical representation in the model card visualization. For example, the computing system can receive additional dataset information as the trained computer model is applied to additional or different data.

In one or more embodiments, not all information is available to fully populate the model card at a given time. In these cases, the model card can conditionally and dynamically show different areas of the model card depending on what is available and excluding what is not available. Alternatively, or additionally, zero stage images or messages can be used to communicate to the user what input is needed to populate that area of the model card. A computing system can also conditionally show different areas of the model card depending on what is available. For instance, the model card visualization can initially have no performance monitoring as shown in graphical user interface element 1850 of FIG. 18B. Users can choose to set up performance monitoring for their model. For example, key performance indicator (KPI) rules set up by the user in various sections of an interactive model card (e.g., in overview and model audit sections).

Figure 20A:
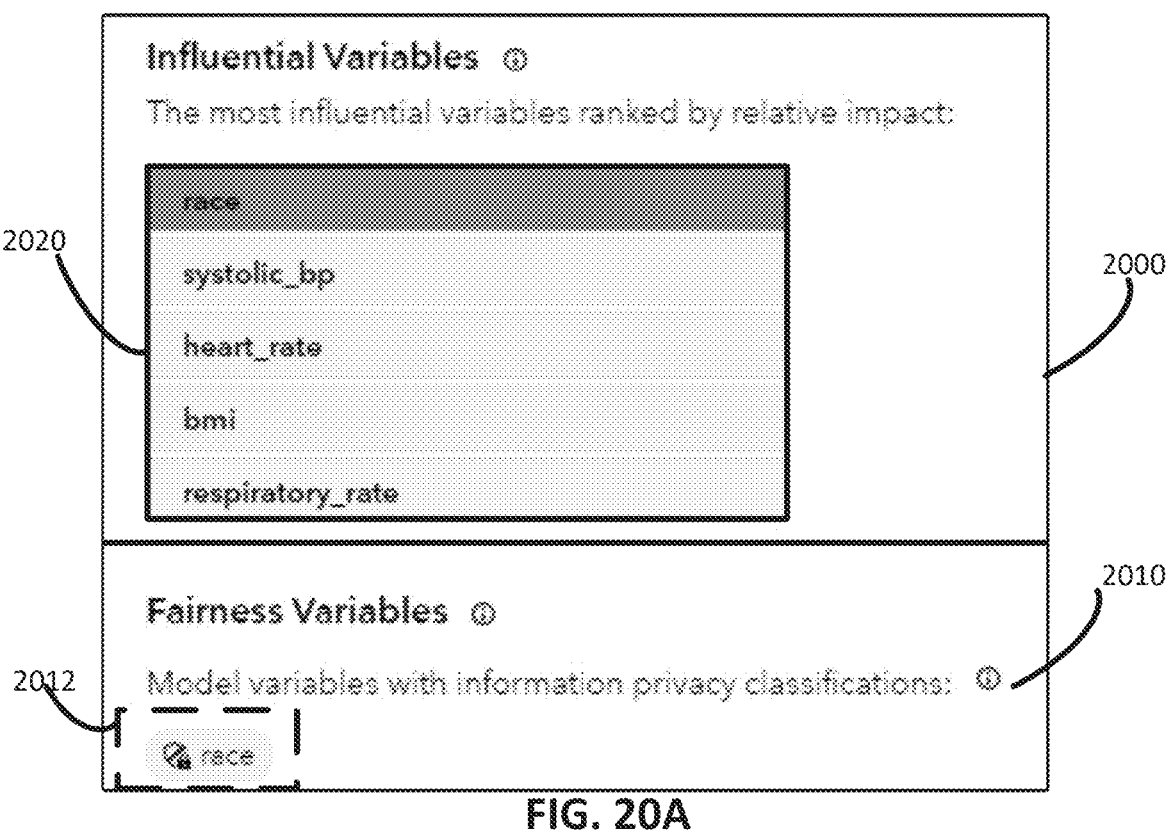
FIGS. 20A-20B illustrate graphical user interface overview element(s) of a model card pertaining to variable information according to at least one embodiment of the present technology.
Figure 20B:
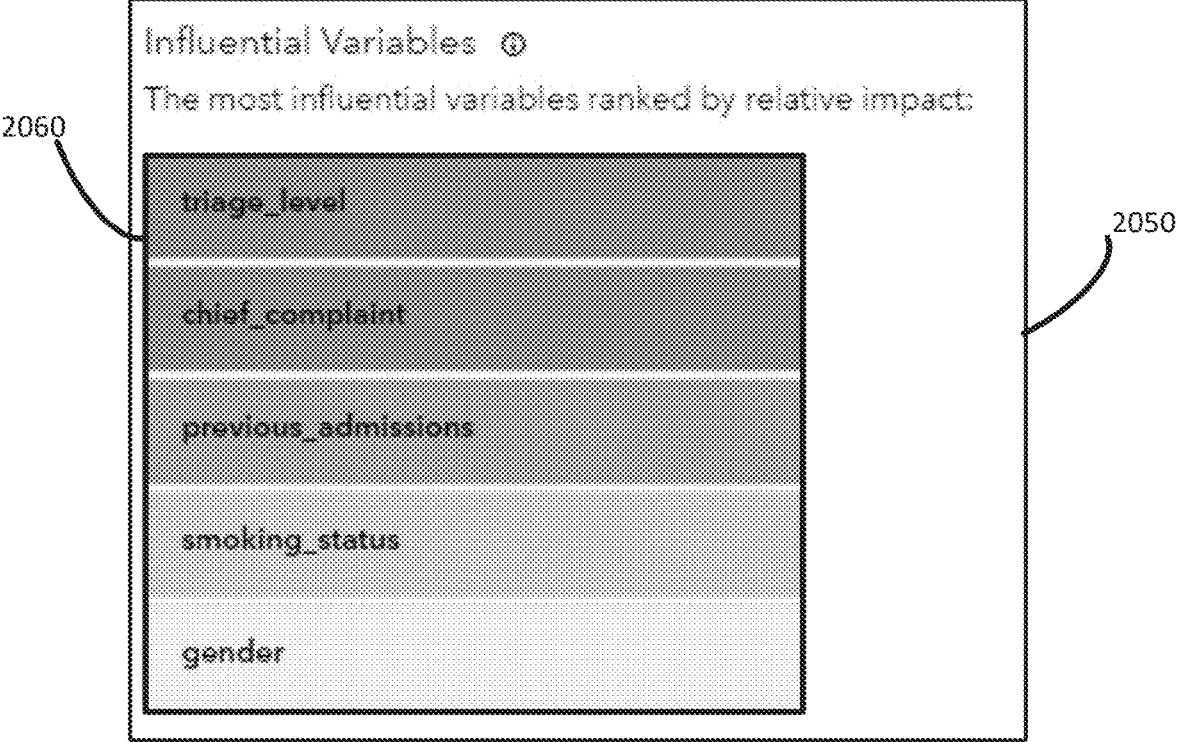

Model cards (e.g., an overview element) can display additional information that can be useful to a user of a model. For instance, FIGS. 20A-20B illustrate graphical user interface overview elements of model cards pertaining to variable information. In some embodiments a model card visualization can include a graphical representation indicating a measure of importance of individual model terms in a subset of model terms in the trained computer model. For instance, in FIG. 20A an element 2000 of a graphical user interface shows an influential variables graph 2020 indicating the variable importance of predictor variables most useful for predicting a response variable of a trained computer model. The influential variables graph 2020 communicates the variables with the five highest importance values although more or less could be displayed in other examples. This can be displayed in proximity to other model card visualizations described herein (e.g., in FIGS. 17A-17C and FIGS. 18A-18B). Additionally, the graph's color coding can conditionally change to reflect the intensity of each variable's relative importance for the given model like a heat map. In this case, the "race" variable is much darker than the others indicating a greater importance to this variable. This allows users to visually understand the importance of variables without needing to interpret the values themselves. It provides a brief, helpful glimpse into model explainability. FIG. 20B shows a different element 2050 of a graphical user interface pertaining to a different model card. This influential variables graph 2060 shows a more graduated coloring indicating many of these variables are extremely influential.

As shown in FIG. 20A other information can be displayed to focus a user of the model card on particular variables. For instance, in section 2010 of FIG. 20A, fairness variables that impact the fairness of a model are shown (e.g., variable 2012). These variables can have information privacy classifications. For instance, variable 2012 is depicted with a graphical representation indicating a privacy classification of "sensitive". This graphical representation Indicates whether the model variables could contain private information that is linked to an individual. Variables in this example can fall within one of these information privacy categories: Candidate, Private, and Sensitive.

Alternatively, or additionally, other information could be displayed such as most important model variables indicating which predictor variables are most useful for predicting the response variable for the model.

FIG. 21 illustrates a graphical user interface model usage element 2100 of a model card. In one or more embodiments, the model card visualization further defines model usage parameters. For example, as shown in FIG. 21 this model card shows intended use of the model in section 2102, benefits of the model in section 2104, out-of-scope use cases in section 2106, and limitations of the model in section 2108. It is possible for the model card to be generated without these fields. If none of the Model Usage fields are populated, a zero-state message can be displayed such as "model usage information is not available" or "no information has been documented" or other graphical or textual information. Alternatively, or additionally, computing system can display instructions or guided prompts for directing the user to other areas of a model manager for manually entering this information. The user could also be informed in other areas of the model card to enter this information. For example, the textual information 1706 on Overview Element 1700 of FIG. 17A could have the "Limitations documented" originally set to "No". This is set to "No" when the limitations field in the Model Usage section is missing. The computing system can receive user input to populate this information at a project level, which will cause all included models to inherit that important qualitative information, or users can populate this information at the model level. For instance, in some embodiments, the sections 2102, 2104, 2106, and 2108 can be interactive (e.g., text boxes) allowing a user to input textual information.

FIGS. 22A-22E illustrate a graphical user interface pertaining to a data summary element of a model card. FIG. 22A shows a data summary element 2200 providing a high-level look into the dataset that was used to train a model (e.g., dataset size, completeness, outliers, and data privacy). For instance, columns, rows, and size information in element 2202 indicate data size information. Status information 2204 indicates a review process for a data asset. In this example, the review process indicates the data has been "approved" for use. FIG. 22B indicates an informational element indicating different status options (e.g., when used with a SAS® Information Catalog for informational purposes in SAS® Model Manager). For example, a default status, a status for when the asset is still under review, needs attention, or should not be used.

Portion 2210 of the data summary element 2200 in FIG. 22A shows an information privacy section indicating whether a variable could contain private information that is linked to an individual. In this example, variables can fall within different information privacy categories such as Candidate, Private, and Sensitive. For instance, the variables shown include all the information privacy variables that have been identified in the training data, not just model input variables. In contrast, an overview section can more specifically focus on variables used in the model. For example, the portion 2210 shows a variable of age that is classified as private, and the variable of gender and race that is classified as sensitive.

In this example, a computing system surfaced variables for the portion 2210 displaying the information privacy section using a Quality Knowledge Base in Information Catalog identified as being Sensitive, Private, or Candidate (i.e., known to be highly correlated with Private variables). The identification of these variables can be important (e.g., from a trustworthy artificial intelligence, AI, perspective) because the presence of these variables in the data can 1) allow data scientists to assess their models for bias and 2) determine whether any variables that are inputs to the model might be highly correlated with these private variables. A high correlation could indicate the presence of a proxy variable. The inclusion of proxy variables in models is often what will cause unintended harm in AI model production. The data summary information can provide computer-generated information that can further guide model usage.

In some embodiments, quantitative data about the training data used for the generation of the model sources can be imported from files (e.g., from an Information Catalog). A computing system can receive user input to generate this data such as a request to run an "analysis report". Not all users may leverage these files such as information catalog in their typical organizational artificial intelligence lifecycle, and this area may not be prepopulated upon model registration. As a result, a computing system can check to see whether an analyst report is available, and if it is, populate a data summary section of a model card. If it is not available, the computing system can provide the user with options to run the report directly from the graphical user interface (e.g., using SAS® Model Manager). FIG. 22C shows an example graphical user interface element 2240. The user can select the Analyze Data icon 2242 to run a report which can automatically populate key details from the analysis report in the data summary like the one shown in FIG. 22A. If the report takes some time to prepare, the computing system can display a busy state which runs in the background and allows users to navigate elsewhere while a computing system is running the report. In this way model cards can continue to remain functional for the user even as the model card updates.

In one or more embodiments, the user can make updates to the data and need not rerun the report for the model card to update a data summary. For example, configurations can be made to dataset description, data tags, status, semantic types, and information privacy assignments and the user can use the refresh icon 2208 in FIG. 23A to pull in configured content (e.g., from an information catalog). Alternatively, or additionally, the data summary can be updated periodically or on a schedule.

FIG. 22D shows an element 2260 of a data summary section of a model card. A training data section 2270 provides a summary of the training data used to train a computer model associated with the model card. Data tags section 2262 shows tags associated with the data. In this case the tags include "ChatGPT" and "Synthetic" because the data for training a model associated with the model card was synthetically generated using ChatGPT. Data tags of "ER Visits" and "Health" describe the content of the data. Different data tags could have been used depending on the model. For instance, FIG. 22E shows an element 2280 of a graphical user interface for removing or adding data tags. Further details regarding the data can be accessed from the data summary section. For instance, selecting access link 2272 allows a user to directly navigate to a specific instance of a dataset (e.g., within an information catalog shown in FIG. 25A).

Figure 23B:
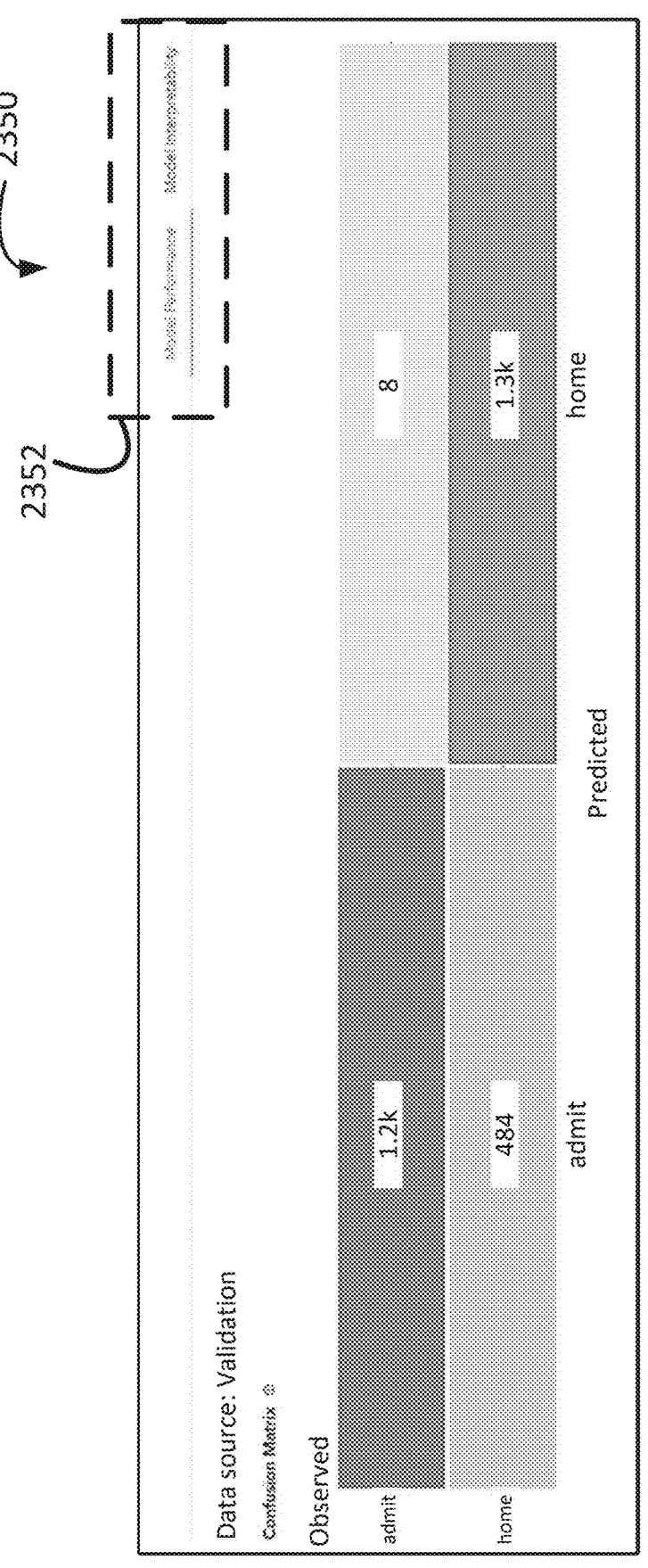
Figures 23C, 23D:
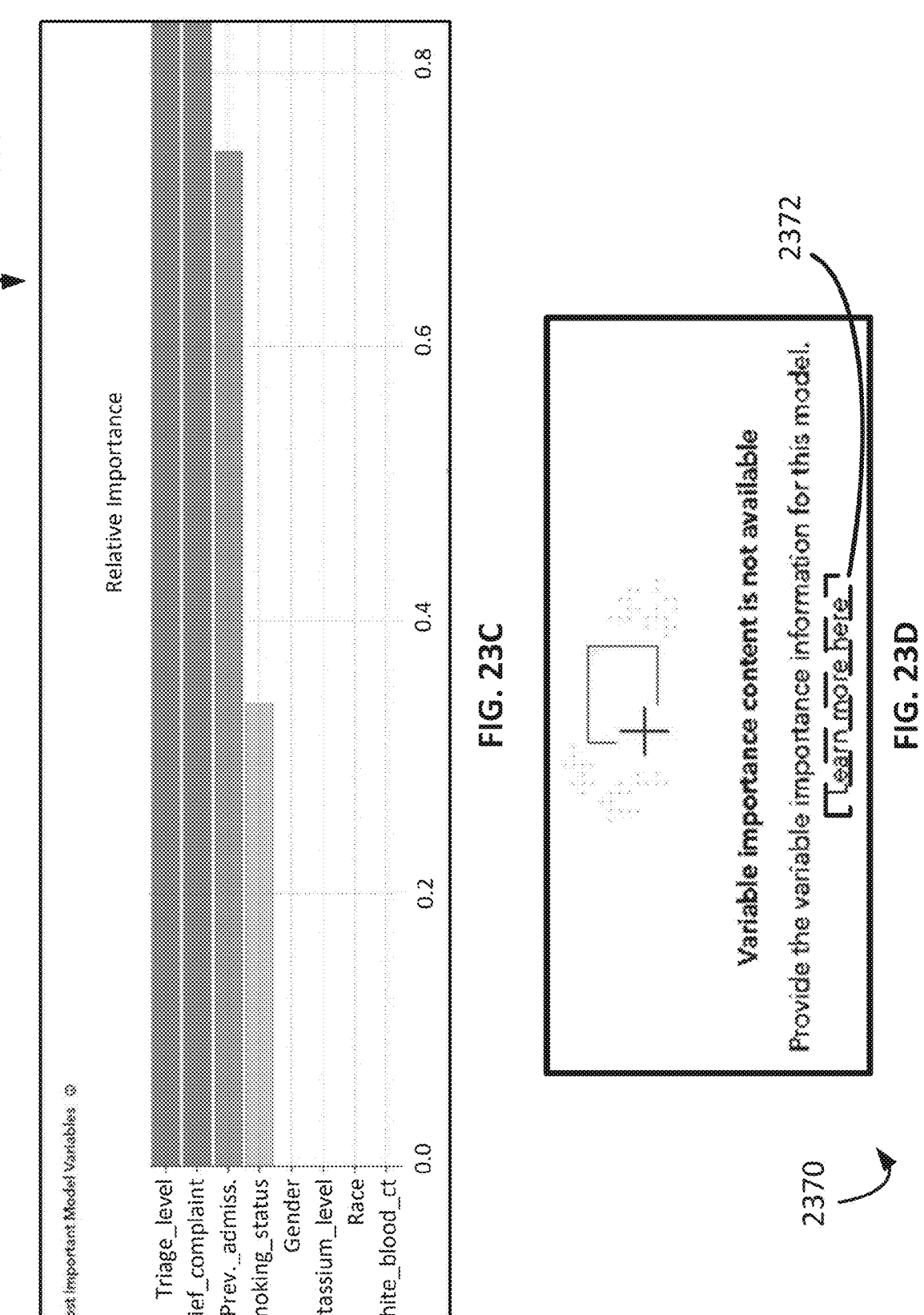

FIGS. 23A-23B illustrate a graphical user interface model summary element of a model card. A model summary can give more detailed information about a model associated with the model card. FIG. 23A shows an element 2300 of a model summary section of the model card. In this example, textual information 2310 describes the algorithm for generating a given model, the model name, the name of an associated project, whether the given model is the champion or challenger for the project, and the five most important factors. It communicates which metric was used to make that determination and on which slice of data that metric was computed. Alternatively, or additionally, fields can indicate specific information about a model. For example, algorithm field 2312 indicates a logistic regression algorithm was used to generate the model and target variable field 2314 indicates the model is generating a model for predicting admission to the hospital.

Displayed information can conditionally and dynamically change based on the partitions available at the time the model was trained. Further, the user can update the information displayed. For instance, a drop-down for metrics control 2302 allows the computing system to receive user input indicating a particular metric (e.g., to allow users to cycle through metrics and select one that is most important for their model/use case).

A model summary can also give greater details regarding model tests performed (e.g., in model test section 2304). One model test is for generalizability which measures whether the model performs similarly between training and validation data, which can indicate whether the model can generalize well to data with similar characteristics. The metrics used can be user-defined or predefined (e.g., based on the type of model). For example, the misclassification error rate (MCE) metric can be used by default for a classification model to compare the training and validation data, and an R-squared metric can be used by default for a prediction model. While an overview section of a model card can indicate whether a generalizability metric is Pass or Fail, model test section 2304 indicates more specifically that this model passed because: 'The model performs similarly between the training and validation data'. If instead the model had failed for generalizability the model test section 2304 could have said the model is Overfit (e.g., displaying message: "The model is overfit because it performs better when using the training data than it does when using the validation data.") or Underfit (e.g., displaying message: "The model is underfit because it performs worse when using the training data than it does when using the validation data."). This communicates whether the model is likely to perform on data it has not been applied to yet (i.e., it helps answer the question more specifically as to whether a model is likely to generalize to other data).

FIG. 23B provides an example of an element 2350 of a model summary depicting graphical information that can be displayed in a model summary. In this example, there is a display of model performance on training data using a confusion matrix. The confusion matrix chart shows the number of observations predicting each response level. A greater number of observations where the observed level and predicted level are the same indicates a better model. In this example, the validation data is used to compute the confusion matrix. Similar to the influential variable heat maps of FIGS. 20A and 20B, the colors on the variable importance graph can conditionally change based on the magnitude of the relationship the variables have to the model. Different graphs can be predefined. For example, a confusion matrix can be a default for classification models, and an assessment graph shown by default for prediction models. Different graphs can also be selected for display. For example, by selecting "model interpretability" in view controls 2352, the element 2350 can display additional information for model interpretability (e.g., information in FIG. 23C).

FIG. 23C shows a graphical user interface element 2360 displaying a bar graph indicating the magnitude of importance of individual variables with bars of color intensity selected to also demonstrate importance. For instance, "triage_level" and "chief_complaint" are such important variables that their bars are beyond the view of FIG. 23C, but their color can indicate the degree of importance beyond what can be easily displayed using a bar graph. If variable importance information is not available, then the Model Interpretability tab can instead display a zero-state message (e.g., a message 2370 shown in FIG. 23D). Messages can have interactive links so that a user can learn more about what is required to populate a section of the model card. For instance, the user can select the learn-more-here control 2372 to be guided towards populating this section.

Figures 19A, 19B:
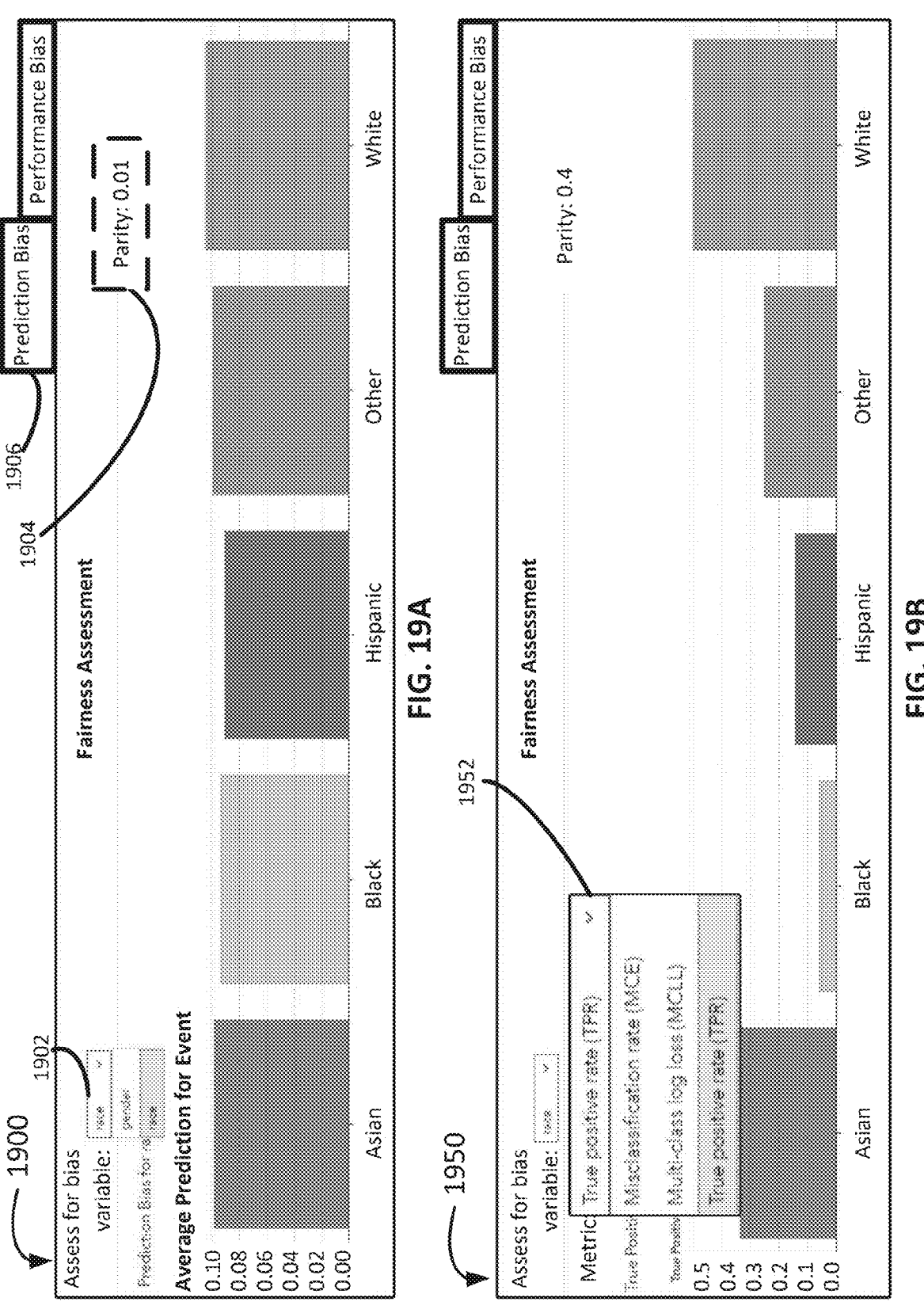
FIGS. 19A-19D illustrate graphical user interface overview element(s) of a model card pertaining to bias graphs according to at least one embodiment of the present technology.

Other textual and graphical information can be displayed in the model summary. For instance, FIGS. 19A-19D illustrate graphical user interface elements of a model card pertaining to bias graphs for a fairness assessment. Graphical information in a fairness assessment report of a model card can provide greater details on whether the model is performing differently for each level of the chosen bias assessment variable(s). Element 1900 of FIG. 19A shows a fairness assessment report that is generated automatically for the model card (e.g., if a computing system has received an indication that the user has marked at least one variable to be assessed for bias). This report can appear in the model card (e.g., in a model summary section). FIG. 19A shows report data generated for the gender and race variables marked for assessment. The graphs can be interactive. For example, the graphs can have hover-over text so users can see how many observations each level represents in the dataset and what the numeric metrics are. FIG. 19A shows an element 1900 displaying a graph for prediction bias. Variable control 1902 allows a computing system to receive user input to compare the average model output for each level of a chosen variable. Variable control 1902 allows a user to choose the variable from a drop-down options to change between the bias assessment variables.

Section 1904 shows a prediction bias parity metric. A computing system determines this metric by computing the maximum difference in a chosen model key performance indicator (KPI) metric (e.g., average model prediction) for different levels of each variable that is marked to be assessed for bias. View control 1906 allows a user to change the graphical information from predication bias to performance bias.

FIG. 19B shows an updated element 1950 updated based on view control 1906. In this performance bias view shown in FIG. 19B, the computing system can display information for the user to compare whether the model performs similarly for each level of the chosen bias assessment variable. A metric can be used for a computer-generated assessment of the model performance for different levels of each variable that is marked to be assessed for bias. In this example in FIG. 19B, for a classification model, metric control 1952 allows a computing system to receive user input indicating a choice amongst accuracy metrics (e.g., true positive rate, multi-class log loss, or misclassification rate). In another example, for a prediction model, a metric control 1952 could allow user input indicating a choice between different accuracy metrics (e.g., average squared error or root average squared error).

Figure 19C:
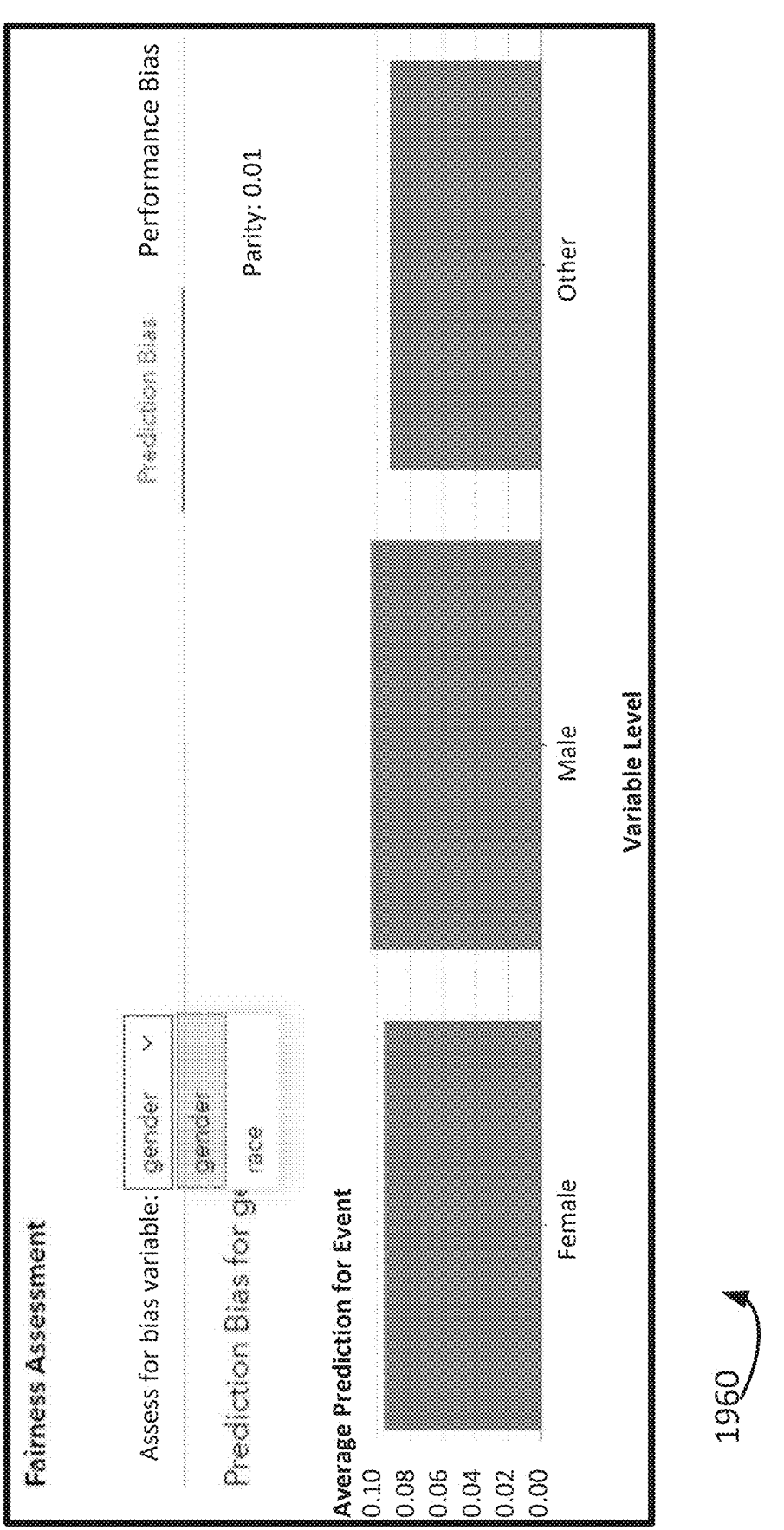
Figure 19D:

FIG. 19C shows an example element 1960 of a model card showing a graph for prediction bias for a different model than in FIGS. 19A-19C. In this example, the user has selected a variable of "gender" to analyze. FIG. 19D shows an example element 1970 of a model card showing a graph for performance bias for this variable and model of FIG. 19C. FIGS. 19A-19D are only examples. One of ordinary skill in the art will appreciate that other details pertaining to a model could be displayed in a model summary section of a model card in other implementations.

In some embodiments, a model card can additionally provide a model audit providing interactive metrics and rules applicable to model evaluation. FIG. 24A illustrates an example graphical user interface with model audit element 2400 of a model card. FIG. 24A shows helpful information pertaining to the trained computer model that is the subject of a particular model card. For instance, the example shown in FIG. 24A shows a performance monitoring last-run section 2410 providing graphical and textual information pertaining to when the performance monitoring was last performed. In this example, textual information in last-run section 2410 indicates a "model last run" date which is when the performance monitoring job started to run. Alternatively, or additionally, the textual information can indicate "data used", which is the dataset used for performance monitoring. Graphical information can include, for instance, icon 2412 indicating that if performance monitoring was run more recently for the project champion or challenger models than it was for this model, the user should interpret the model-level performance results cautiously. In this example, the last-run section 2410 for performance monitoring also provides a "project last run" date and "data used" for that project for the user to make that assessment. For instance, if multiple models are included in a single project, if in the first performance monitoring run, all are included, and if a user decides to exclude a model from performance monitoring for future runs, the results from the most recent run of performance monitoring can appear in the model audit section, but the date stamps can reflect that the selected model does not have performance monitoring run as recently as the models included in the most recent performance monitoring run.

The model audit element 2400 also shows key performance indicators (KPIs) in a KPI element 2420. These KPIs can also be interactive and subject to change. For instance, a computing system can receive user input to configure KPI rules. Once the rules have been run by the performance monitoring function of a computing system (e.g., within a model manager) the Model Audit section can be updated to display the results of the most recent evaluation from the performance monitoring run. As shown the displays can include individual metrics, the alert condition and threshold, actual value from monitoring, and note on whether that KPI rule passed or failed. One of ordinary skill in the art will appreciate other graphical or textual information that could be useful for a model audit of a model card visualization. This information can also be summarized and displayed in other aspects of a model card (e.g., a performance monitoring tab of an overview section).

Users can also choose to set up performance monitoring for their model and information from performance monitoring can be updated in the model card visualization. For example, a computing system can receive an indication of at least one key performance rule for monitoring performance of use of a trained computer model. The KPI rules the computing system receives can be used to provide information in the model card such as on overview section or model audit section of the model card.

FIG. 24B shows an example graphical user interface with KPI element 2420 for adding a KPI rule. The KPI rule relates to accuracy, fairness, or model drift of the trained computer model as shown in KPI category control 2422. These rules can be set up from within model manager (e.g., navigating to model evaluation in properties within a project).

FIG. 24C shows a graphical user interface element 2440 listing attributes of KPI rules. For example, there is a KPI rule 2441 added related to fairness. The fairness metric selected for KPI rule 2441 in KPI category was "equalized odds". However, the user could have selected other metrics such as demographic parity, equal opportunity, equal accuracy, and predictive parity. Users can add a rule on any variable marked to be assessed for bias (e.g., in Model Studio when training the model or from Model Manger once a model has been registered). As another example, KPI rule 2442 relates to model drift. Model Drift group of metrics allows users to track the Population Stability Index (PSI) of any input or output variable in a model. For example, FIG. 24D shows additional fields for KPI rule 2442 such as an alert condition field 2462 and alert threshold 2464. If a variable's PSI is above a threshold the user has specified (e.g., a KPI rule specifies "greater than" in alert condition field 2462 and specifies the threshold value in alert threshold 2464), this indicates there has been an unacceptable shift in the distribution of that variable. Other KPI rules could include, for example, a KPI category of accuracy with KPI such as area under the ROC curve (AUC) or misclassification.

Figure 24F:
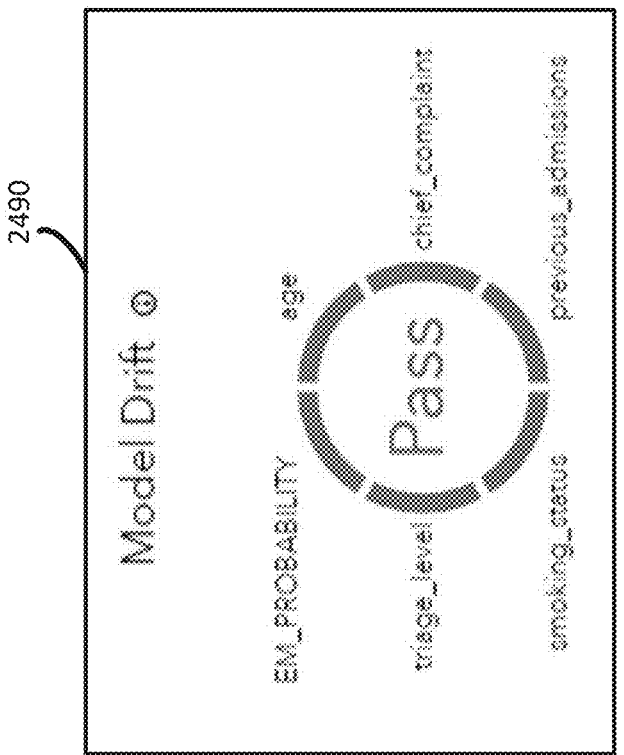
Figure 24E:
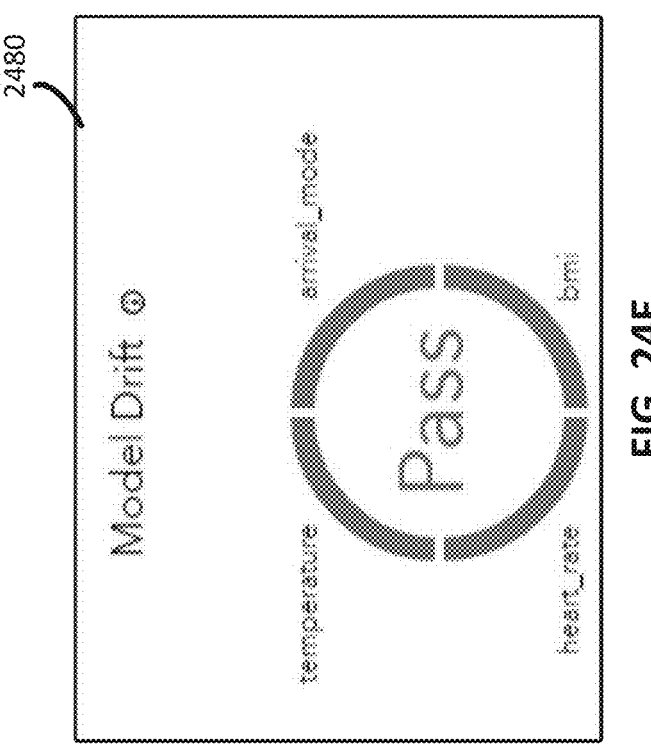

The KPI alert rules can be specific to an overall monitoring assessment that is displayed in model card visualization. For example, FIGS. 24E-F show example updates to a model card responsive to changes in the KPI rules. In this example, a graphical representation 2480 is shown in FIG. 24E. The graphical representation represents each of the multiple component assessments by an equivalent-sized component in the graphical representation. This example had the overall assessment pertaining to a model drift and component assessments corresponding to temperature, arrival mode, heart rate, and BMI data. In one or more embodiments, a computing system receives an indication of a change in a quantity of multiple component assessments (e.g., as shown in FIG. 24C the user adds KPI Alert Rules such as KPI rule 2442 a component related to triage_level.).

The computing system can receive, e.g., via a graphical user interface, a change to a quantity for the multiple component criteria, a change to threshold criteria for a given one of the multiple component criteria, or both. For example, the KPI rule 2442 has an alert threshold 2464 displayed in graphical user interface element 2460 of FIG. 24D. The user can change the threshold quantity by changing the value in the alert threshold 2464. Alternatively, or additionally, the user can change the alert condition using alert condition field 2462 (e.g., to generate a failure or pass indication for a component related to triage_level). Currently this component is set to alert when "greater than" and the user could change this to, for example, "greater than or equal to"; "less than"; or "less than or equal to". The user could also remove or add KPI rules. For example, as shown in FIG. 24E, the model drift was initial set with component criteria related to temperature, arrival mode, heart rate, and body mass index (bmi) as shown in graphical representation 2480.

In FIG. 24F, the user has removed these KPI rules and added KPI rules related to variables for EM probability, age, triage level, chief complaint, smoking status, and previous admissions. EM probability, in this example, is probability that is output by a model and ranges between 0 and 1. In response, a computing system can update, responsive to the change, the graphical representation in the model card visualization. FIG. 24F shows an updated graphical representation 2490 showing the assessments for components related to these variables and the overall model drift assessment. The computing system can then adjust the graphical user interface based on these changes. For example, 24F shows an updated graphical representation 2490 with different component assessments for the overall assessment related to model drift responsive to the KPI Alert Rule changes. The computing system has also adjusted a size of each of the equivalently-sized components based on the indication of the change. In this case the components slices are smaller to allow six components to fit within a graphical representation. Further, once a user configures KPI rules and runs performance monitoring, the computing system can update a model card's Model Audit section to display the results of the most recent performance monitoring run evaluation. This area displays each individual metric, the alert condition and threshold, the actual value from monitoring, and a pass/fail status as shown in FIG. 24A. Embodiments could have components represented with slices that are not equivalent in size (e.g., to distinguish default and components added based on user input, or for fairness to distinguish more relevant variables).

Figure 25A:
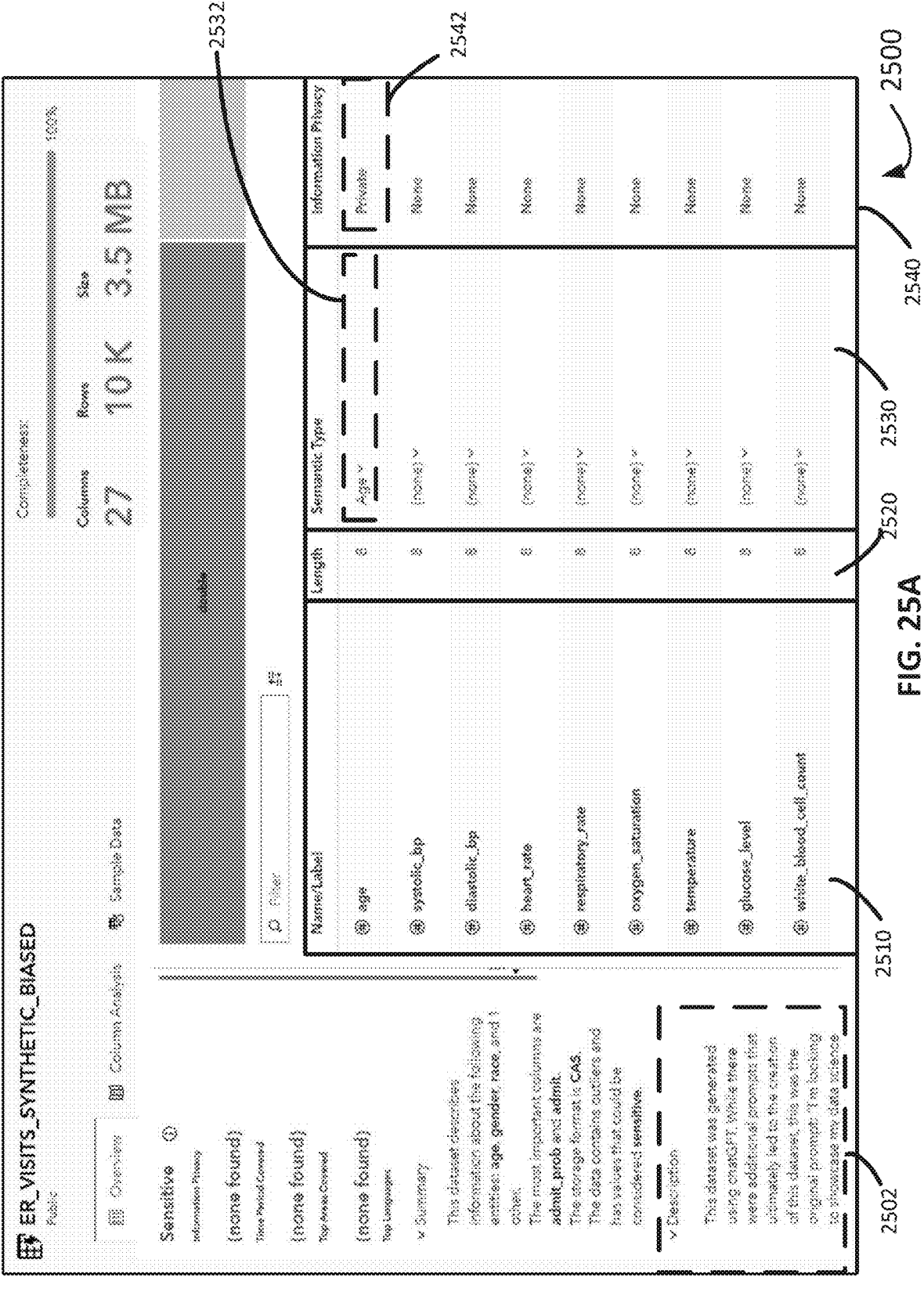
FIGS. 25A-25D illustrate graphical user interface element(s) for data classification in a model card according to at least one embodiment of the present technology.
Figure 25B:
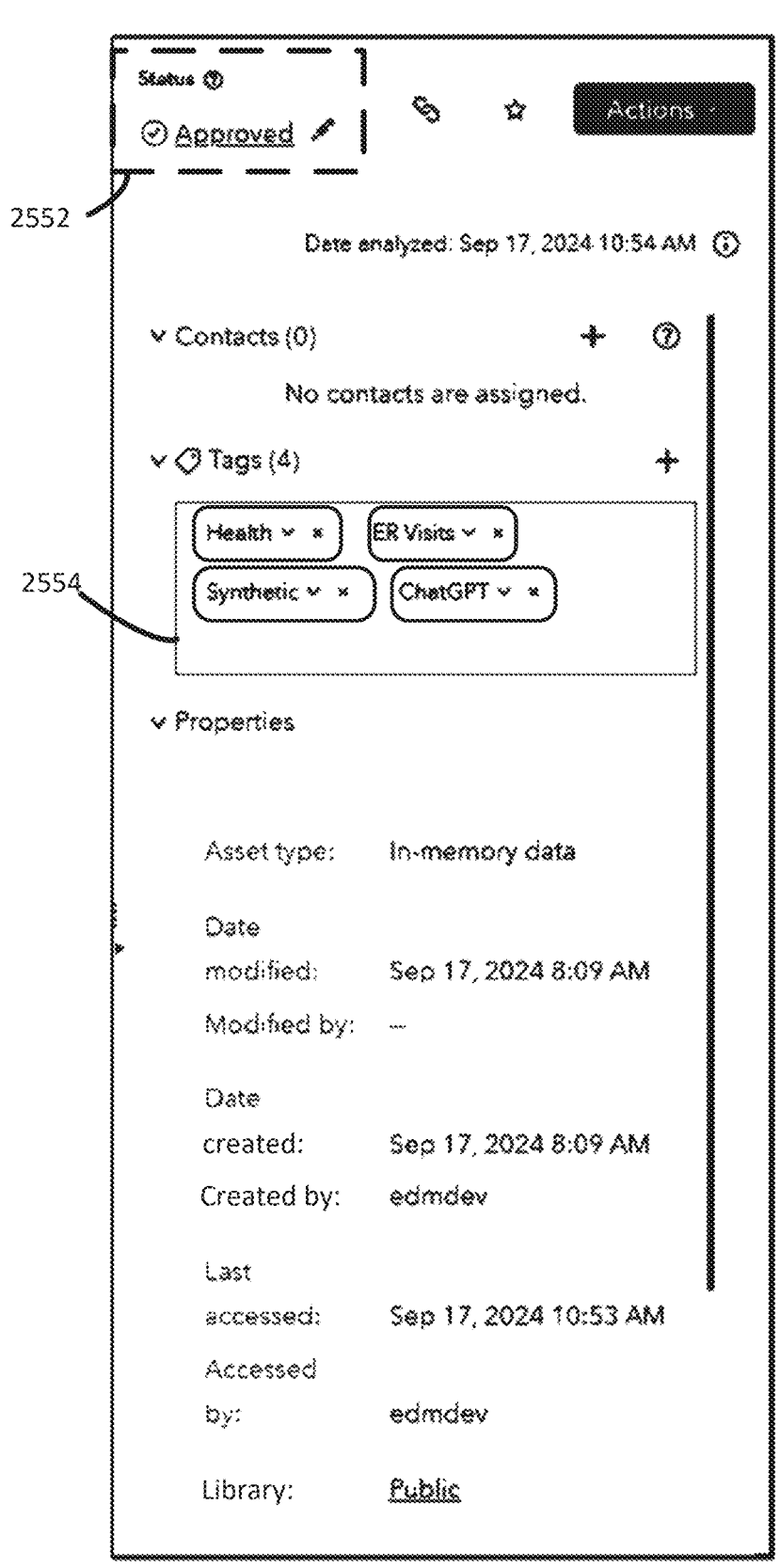
Figures 25C, 25D:
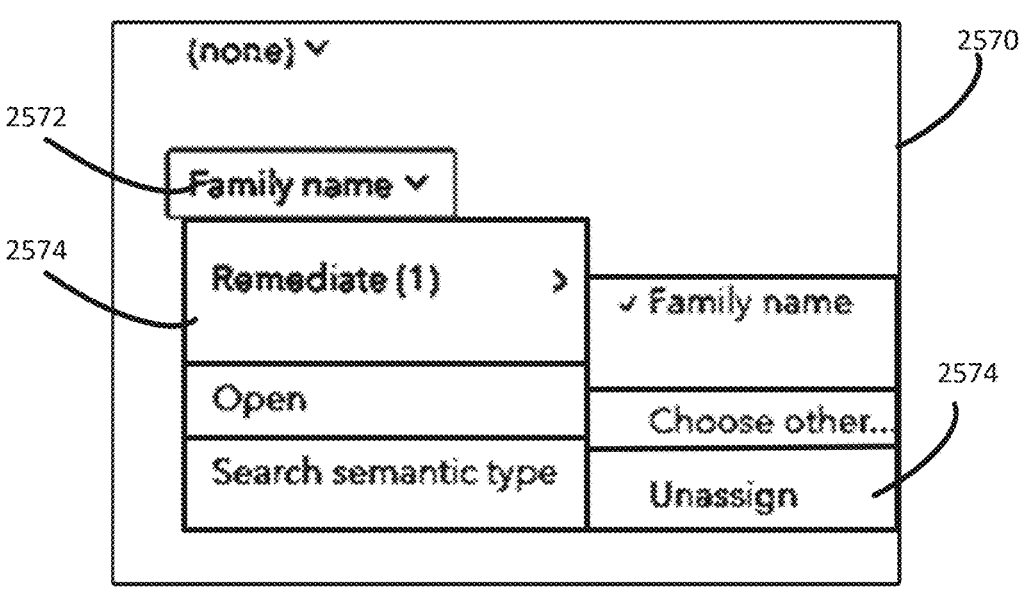

One or more embodiments allow user configuration of other user-supplied or computer-generated information. For example, FIGS. 25A-25C illustrate graphical user interface elements for data classification in a model card. FIG. 25A shows an element 2500 indicating information regarding data used for computer modeling. The element 2500 includes, for example, description of the data in section 2502. This description may initially be in a zero-state message with a default message to encourage users to populate it (e.g., a message stating to "describe the purpose of this asset and what it tracks or measures). Updating the section 2502 may update other aspects of an interactive model card or vice versa (e.g., a training data section 2270 shown in FIG. 22D). The element 2500 is from a SAS® Information Catalog but could be supported by other programs.

In one or more embodiments, a computing system can analyze, using a computer-generated semantic classification, a training dataset for elements of the training dataset likely to be private or sensitive and used for model terms in the trained computer model. In the example in FIG. 25A, variable column 2510 identifies variables in the training dataset. Length column 2520 identifies a maximum length of the data associated with a respective variable. Semantic-type column 2530 identifies the classification type performed by a computing system. Information-privacy column 2540 identifies a label for a variable (e.g., a result of the semantic classification). An example semantic classification type in FIG. 25A shows a semantic type 2532 of "age" and resulting information privacy label 2506 of "private". These labels can be changed based on user input or updated classifications.

In one or more embodiments, a computing system receiving this information can use it to generate a label indicating a private or a sensitive aspect of one or more variables used for the model terms in the trained computer model. In one or more embodiments, the generated label can be a graphical representation displayed in a model card visualization. For instance, FIG. 17A shows fairness assessment 1730 for variables labeled as private, sensitive or candidate (e.g., from a semantic classification). As another example, FIG. 20A shows a section 2010 with symbol icons indicating graphically the labels for fairness of specific variables.

In an information catalog, users can populate a description for the dataset, update the status of the dataset, and provide any data tags relevant for the dataset. FIG. 25B shows a graphical user interface element 2550 for updating statuses or tags for the dataset. The graphical user interface can receive user input in section 2552 changing a status for a training dataset (e.g., to one of the statuses shown in FIG. 22B). Changes in status can update in other aspects of a model such as a data summary element of a model card (e.g., status shown in element 2202 in FIG. 22A). Tags section 2554 allows a user to add or remove tags for the data. For instance, if the computing system used synthetic data in any capacity while training the model, the data tags area can include the label of the dataset as "Synthetic" and other tags can be custom defined by a user such as "Health" and "ER Visits" tags. Changes to data tags can update in an interactive model card such as the data tags section 2262 of element 2260 in FIG. 22D.

In one or more embodiments, the mechanism that assigns these categories is configurable to fit the needs of a user or organization. For instance, in the element 2500 of an information catalog shown in FIG. 25A, a computing system can receive user input to change the semantic type of the variable (i.e., the semantic type of "Age"). Alternatively, or additionally, the computing system can change how a given semantic type maps to an information privacy classification (Private, Sensitive, Candidate). For instance, the computing system can be used for semantic type remediation (e.g., when an information catalog incorrectly classifies a variable). FIG. 25C shows an element of a semantic-type column 2570 (e.g., as part of an information catalog like shown in FIG. 25A). If a variable is incorrectly classified as semantic type="Family name" as shown in field 2572 of FIG. 25C, the user can select this field within the semantic-type column 2570, and select remediate control 2574. The remediate control 2574 allows a user to indicate to a computing system to unassign the semantic type altogether (e.g., by selecting unassign control 2576). Unassign can remove any information privacy classification. Alternatively, the user could specify another semantic type. Information privacy mappings can also be changed (e.g., based on organizational policies).

FIG. 25D shows a graphical user interface element 2580 for a data classification tab. This tab allows changing a label for a classification (e.g., according to a semantic-type in an information catalog such as one shown in FIG. 25A). In this example, the age classification is changed from "private" to "sensitive" in section 2582. The user could have also selected "candidate" for variables known to be highly correlated with private variables or none. These changes can be a global setting that apply to all datasets in an organization or project.

It is also possible for data to not be available or properly imported by a computing system. In this case messages or other graphics can be used to guide a user towards fully populating a model card. For instance, FIG. 26A shows an example message 2600 for an overview section if training data is not linked to a model initially. The message 2600 displays saying that "no training data has been linked to this model" so that the user can manually link it. If there are errors in registration those can be communicated to the user such as if a user registers the model but outside a project a message could appear saying "content is not viable because this model is not located within a project".

As another example, content may be missing on a particular section of the model card. For example, FIG. 26B shows an example message 2630 in which no model usage information is populated. As another example it could say "model summary content is not available" and to "provide the model information and metric data for this model" or "model performance content is not available". FIG. 26C shows an example message 2660 for the model audit section where the model audit results are not available. This can happen for instance where performance monitoring has not been run and/or the model is not included in a project definition. As another example the message could say "model audit content is not available because the model is not located within a project". If at least one field is populated, then a computing system can use helper text for the fields that the user has not yet populated within a section.

Using computer-generated information and/or guided prompts, embodiments described herein provide for model cards that are consumable, domain agnostic, model specific, automated, and/or informative with key metrics and insights. For instance, they can provide insights specific to model definitions, model usage and limitations, out of scope use cases, influential variables, information privacy model interpretability, model performance, fairness and bias assessment, model health, and provide for model audits.

Embodiments are also useful for managing an asset system with different computer model related assets (e.g., using an artificial intelligence, AI, governance navigator). Consulting and governance firms, technology vendors, and hyperscalers can use asset management for AI governance, responsible AI, and ethical AI implementation. Embodiments provide improved interfaces for navigating assets and generating tasks related to the assets. FIG. 27 illustrates a flow diagram of a method 2700 for controlling a navigator interface component.

The method 2700 includes an operation 2701 for displaying a graphical user interface comprising a navigator interface component (e.g., navigator interface component 1434 in FIG. 14) for navigating an asset system. In this example, the asset system comprises multiple assets. FIGS. 28A-28E illustrate example portions of a graphical user interface with a navigator interface component for an asset system comprising multiple types of assets. For instance, the asset system can include an asset pertaining to a computer model. Alternatively, or additionally, the asset system includes an asset pertaining to a use case for a computer model. Alternatively, or additionally, the asset system includes an asset pertaining to an artificial intelligence system for one or more other computer models. Alternatively, or additionally, the asset system includes an agent for executing an action for a computer model. The plurality of assets can be based on different computer models. In some embodiments, one or more assets in the asset system are based on a shared computer model (e.g., a use case and an agent for a same model). In the example, in FIG. 27, the asset system includes a first asset and second asset. The navigator interface component comprises a first interactive graphical representation of the first asset and the second asset. However, the asset system could include more or less assets.

The method 2700 includes an operation 2702 for detecting a predefined event pertaining to the first asset. For instance, the predefined event could be a default predefined event. An example default predefined event could be one for missing information such as related to an asset owner approval for deploying or reviewing an asset, or could be one related to metadata for training or testing a computer model pertaining to the asset. Alternatively, or additionally, a predefined task can be custom defined (e.g., based on a policy for a particular asset).

The method 2700 includes an operation 2703 for, responsive to detecting the predefined event, generating an alert indicating the predefined event pertaining to the first asset.

The method 2700 includes an operation 2704 for updating the navigator interface component to indicate the alert in association with the first asset, and not the second asset, in the first interactive graphical representation. In embodiments, the first interactive graphical representation can separately track assets and display information pertinent to individual assets.

The method 2700 includes an operation 2705 for receiving, via the navigator interface component, a selection of the first asset via the first interactive graphical representation.

The method 2700 includes an operation 2706 for displaying, in the graphical user interface, a second interactive graphical representation specific to the first asset. The second interactive graphical representation of the first asset comprises: association navigation element indicating an association between the first asset and the second asset, and a task control element for controlling any tasks specific to management of the first asset. For instance, if the predefined event were related to missing information, the task could be related to providing the missing information. FIGS. 29A-29F illustrate example portions of a graphical user interface with an interactive graphical representation specific to an asset.

The method 2700 includes an operation 2707 for receiving, using the task control element: a task for resolving the alert; and an association with the task and the first asset. For instance, a task for resolving the alert could include an assignment to a particular user of a task and/or an instruction to the user for how to resolve the alert. The computing system could receive the task, using the task control element, based on user input. There could be multiple tasks for resolving the alert (e.g., for different categories of missing information). It is possible that completion of an individual task would not resolve the alert. For instance, the alert will resolve, when the alert conditions are no longer met that triggered the alert. However, embodiments enable linking alerts to one or more generated tasks.

The method 2700 includes an operation 2708 for updating the navigator interface component to indicate the association with the task and the first asset. For example, an access point can be created to the task in an area of the first interactive graphical representation for the first asset.

Figure 28A:
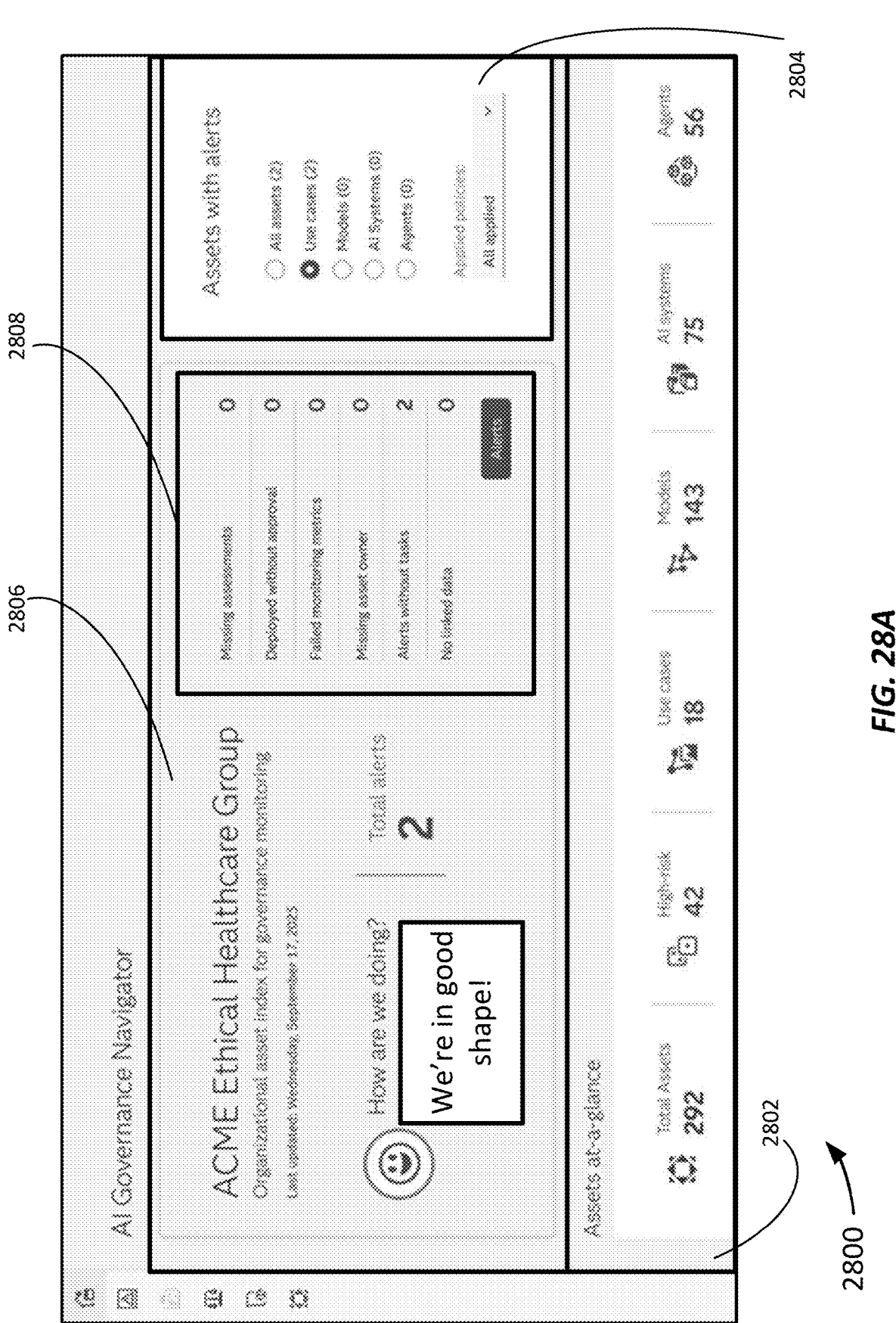
FIGS. 28A-28F illustrate portions of a graphical user interface with a navigator interface component according to at least one embodiment of the present technology.
Figure 28B:
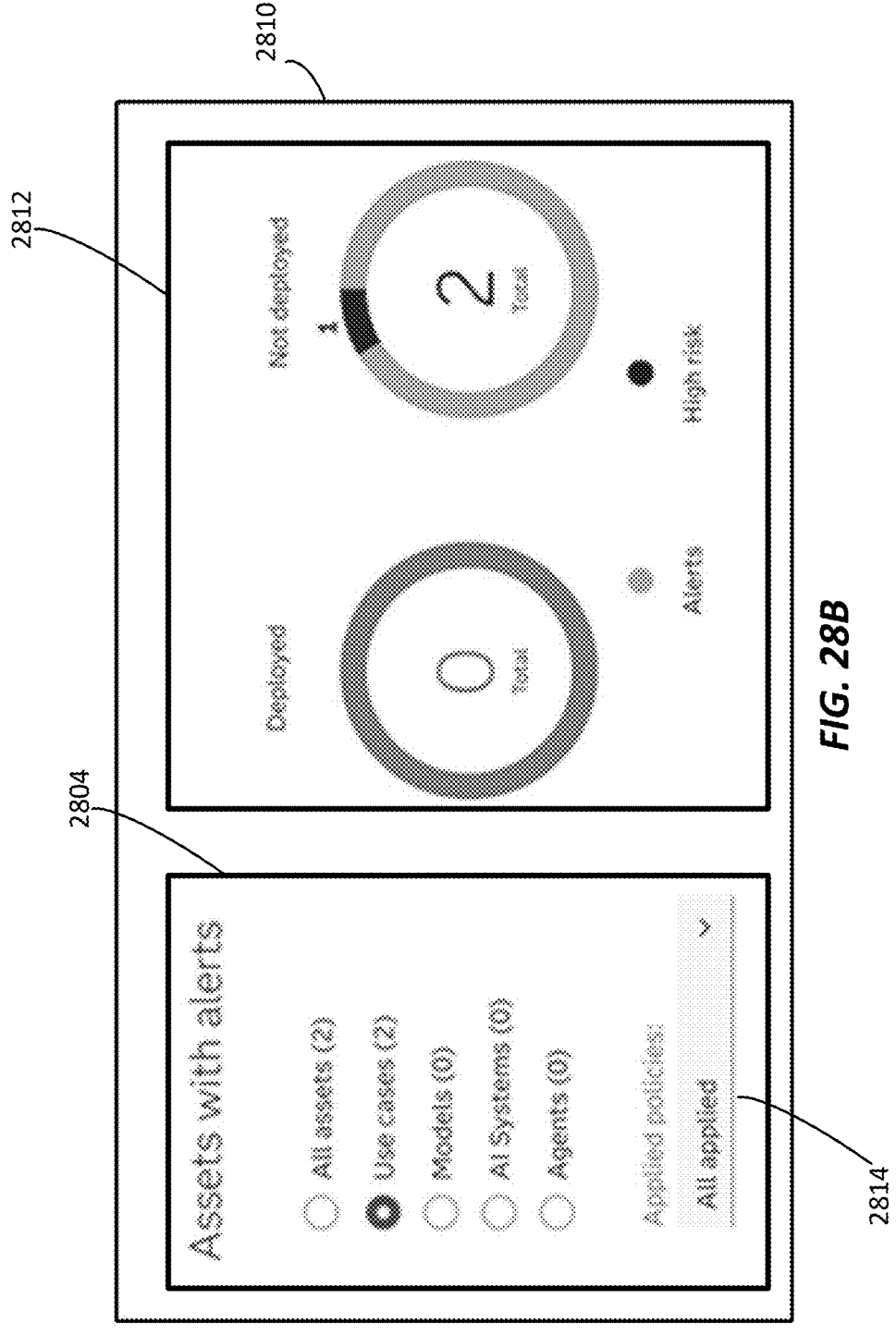
Figure 28C:
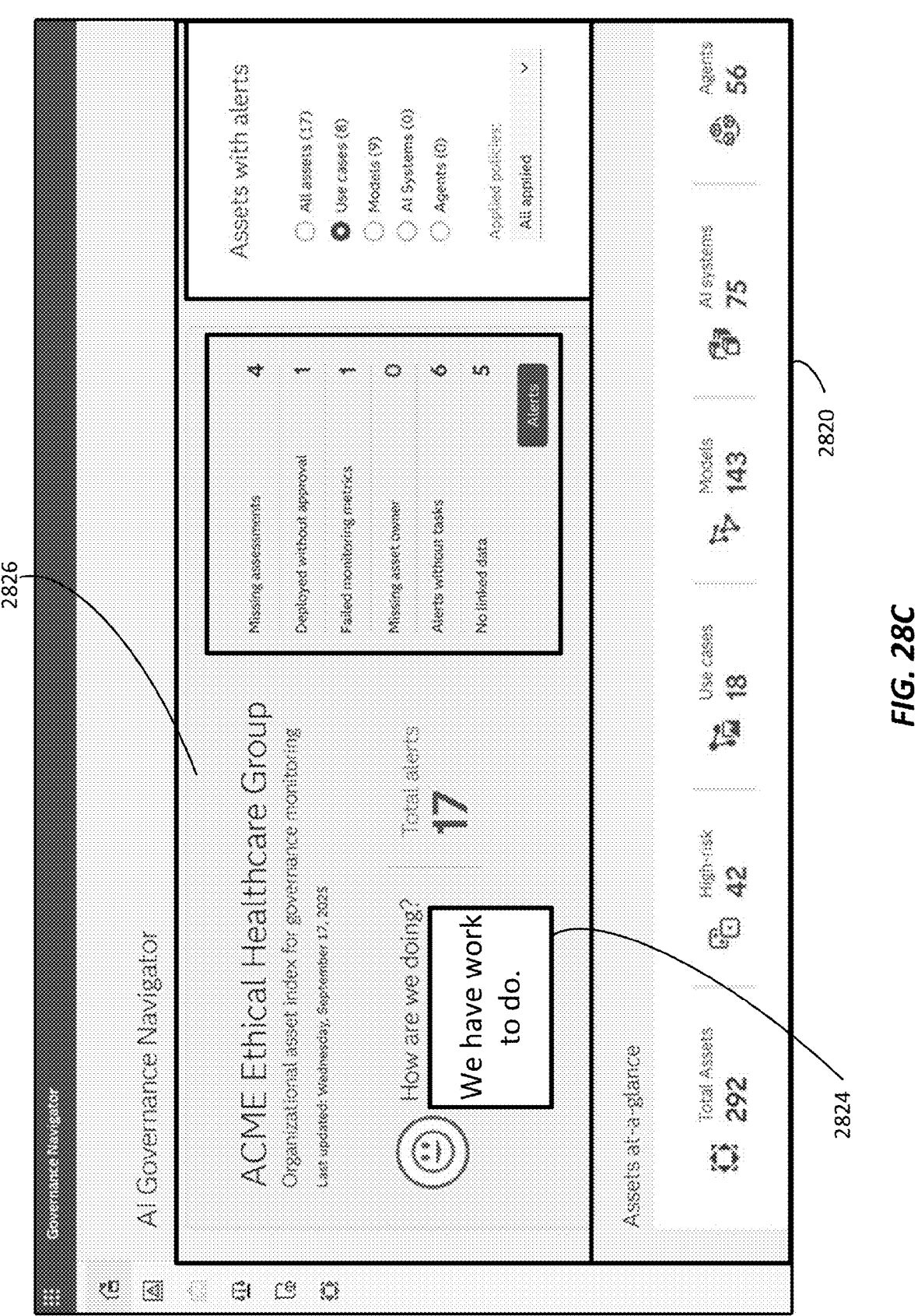

FIGS. 28A-28E illustrate portions of an interactive graphical user interface with a navigator interface component for navigating an asset system using an AI Governance Navigator. The graphical user interface or computing system supporting the graphical user interface can be referred to as an "AI Governance Navigator" because one or more assets described herein can be AI assets, and embodiments can help with governance of those AI assets. Collectively, these portions shown in FIGS. 20A-28E can show a summarized view of the health and status of assets at an organization and support the management of computer models and assets (e.g., models, AI systems, use cases, and AI agents). For instance, as shown in FIGS. 28A and 28C, one or more embodiments display summaries of alerts associated with an organization's assets (e.g., AI assets).

FIG. 28A shows a portion 2800 of a graphical user interface. A summary area 2806 indicates an overall perspective on managed assets. For instance, if there are no alerts or only alerts on non-deployed, low risk assets, then the summary area 2806 can display a unique graphical representation and/or message (e.g., a green color, a total alerts message, and a positive message such as "We're in good shape!"). The alerts type area 2808 provides a list showing the types of alerts that are affecting the assets (e.g., AI assets). In this example, the alerts are generated based on predefined events for alerts without a task.

FIG. 28A shows information 2802 regarding the managed assets. For example, information 2802 shows summaries of all managed assets and summaries per asset type (e.g. use cases, models, AI systems, agents). It also, in this example, shows summaries based on policy classification (e.g., "High-risk" assets). Information 2802 could include less or additional information.

FIG. 28A shows information 2804 regarding managed assets that have alerts. Information 2804 allows a user to break down alerts based on the type of asset or to display all assets. Other options could be available than those specifically shown here such as whether the asset has been deemed 'high risk' according to applied policies, whether the asset has been deployed, and whether the asset has tasks.

FIG. 28B shows a portion 2810 of the graphical user interface of FIG. 28A. The portion 2810 shows the information 2804 in FIG. 28A and deployment graphical representation 2812. The deployment graphical representation 2812 can show the degree of assets with predefined events who are associated with an alert (e.g., compared to the information 2802 indicting the scale of managed assets). For instance, in this example, there are only two use cases with alerts compared to 18 use cases within the system.

The deployment graphical representation 2812 in this example shows separate representations for deployed and nondeployed assets indicating the degree of assets currently in use. For instance, in this case there are zero "Deployed" assets with alerts compared to two "Not deployed" assets. However, in other embodiments, deployment graphical representation 2812 could display a cumulative view of both, or a single graph for one or the other. Deployment graphical representation 2812 can also be color coded to indicate a degree of assets that are of a high-risk status for use (e.g., policy classification of high risk or high impact). In this case there is only one high risk asset. In embodiments, a computing system updates deployment graphical representation 2812 responsive to the selections in information 2804. For instance, responsive to selection of "Use cases", only information pertaining to use cases is shown in the deployment graphical representation 2812. Alternatively, or additionally, a computing system can update deployment graphical representation 2812 based on other alert filters such as limiting alerts by policy using policy filter 2814.

In one or more embodiments, the graphical user interface displaying portion 2800 and/or portion 2810 is interactive and updates based on current status of managed assets. For instance, FIG. 28C shows an updated summary area 2826 in which the area changes gold to highlight that there are too many alerts associated with an organization's assets, in this case, 17. For instance, when there are alerts affecting deployed assets (live in production) or higher importance assets that indicate issues that require immediate attention due to their potential impact or risk level, then the message in messaging area 2824 can change from the one shown in FIG. 28A to show "We have work to do." under the "How are we doing?" question as shown in summary area 2826. A computing system could use other or additional thresholds based on organizational needs. Other embodiments could have different messaging than those specifically shown here. For example, messaging area 2824 could display additional or different answers to "How are we doing?" For instance, a message of "Not Great" or "We are Good!" based on a quantity of alerts across all assets or a subset of assets such as deployed assets (e.g., 5 alerts threshold). In embodiments, an administrator can change default criteria and/or particular messaging in the summary area 2826 using administrative settings for a particular use.

Figure 28D:
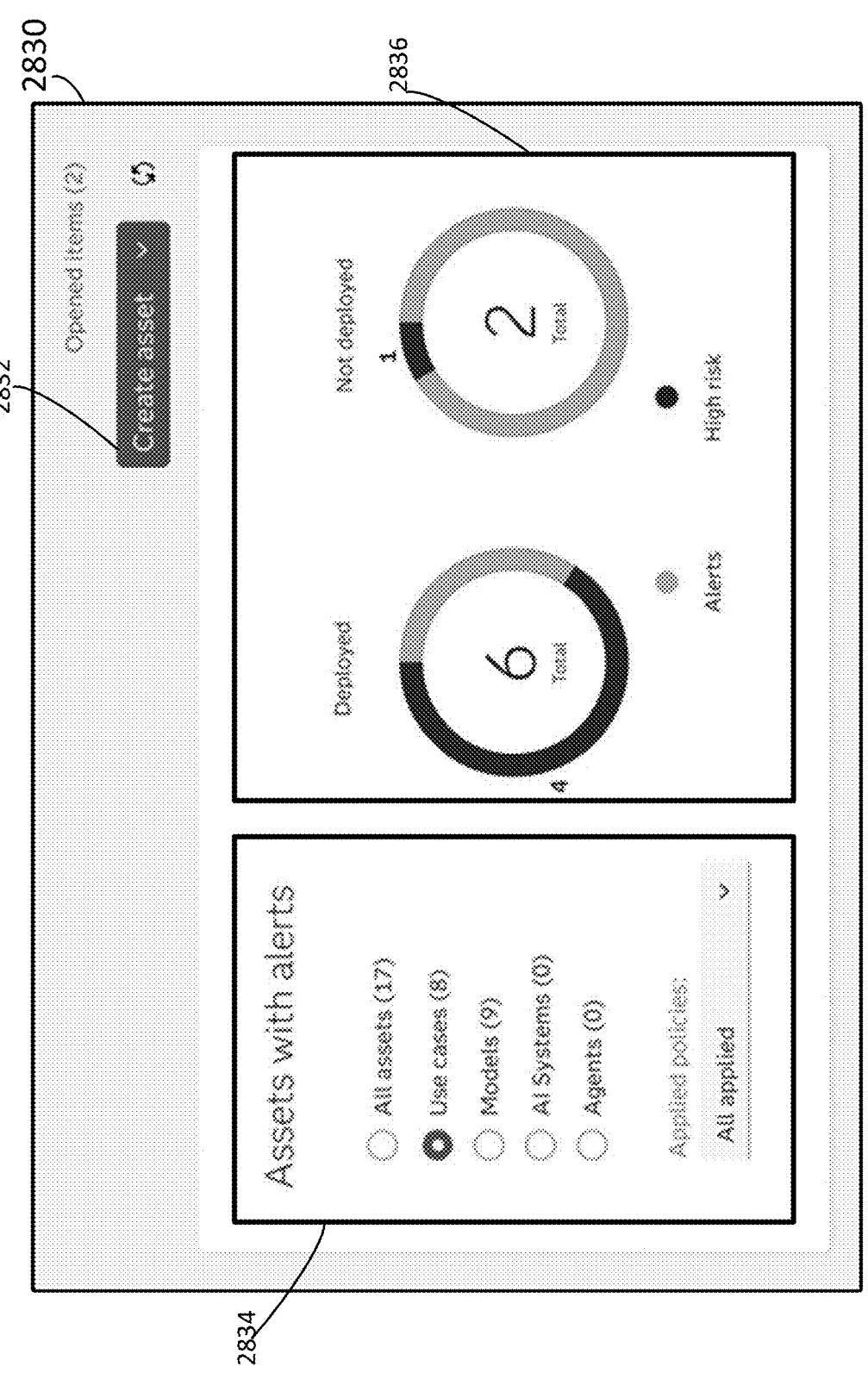

FIG. 28D shows a portion 2830 of the graphical user interface with an updated deployment graphical representation 2836 and information 2834 in view of the increased alerts from those shown in FIGS. 28A and 28B. In this case where there are more alerts, filtering to particular asset types and policies can be helpful (e.g., using information 2834 to limit displayed information in portion 2830).

In one or more embodiments, a computing system can create assets directly from an AI Governance Navigator in addition to managing assets (such as creating one of different asset types like model, use case, AI system, and agent). For instance, users can use control 2832 shown in FIG. 28D to create assets. For example, responsive to selecting an asset type, a graphical user interface can display guided prompts (e.g., using a wizard or drop-down selections) where a user can choose the asset type of interest and populate information for the particular asset. For instance, an import asset wizard can allow a user to upload a file from any source platform that contains assets and create a mapping between the source fields and the target fields. The column mapping can be saved and imported files will be reformatted so the computing system can read the files. This process effectively makes it possible for an organization to add any assets to manage regardless of the source system. Alternatively, or additionally, a wizard can allow a user to directly connect to a source platform for source fields.

Figure 28E:
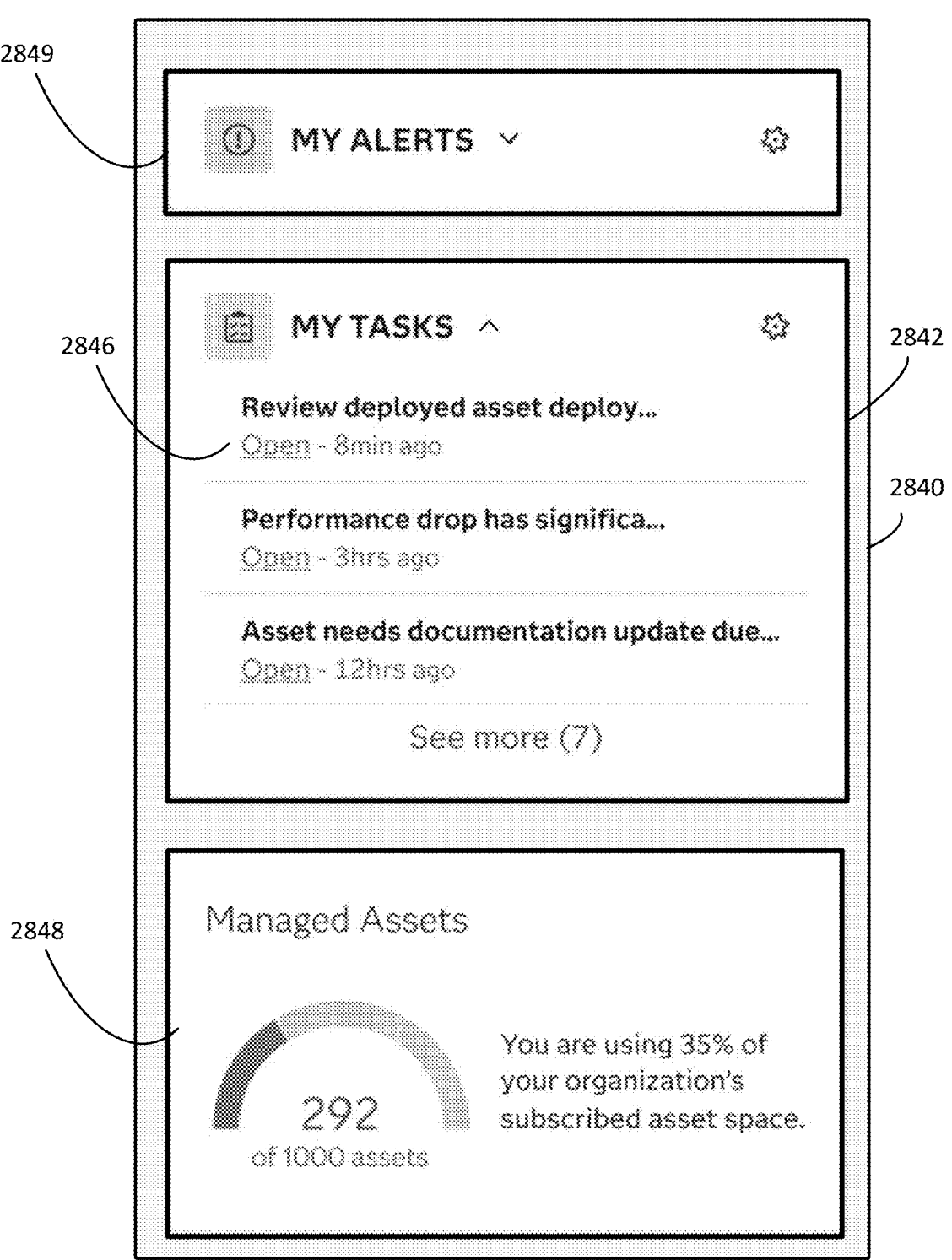
Figure 28F:
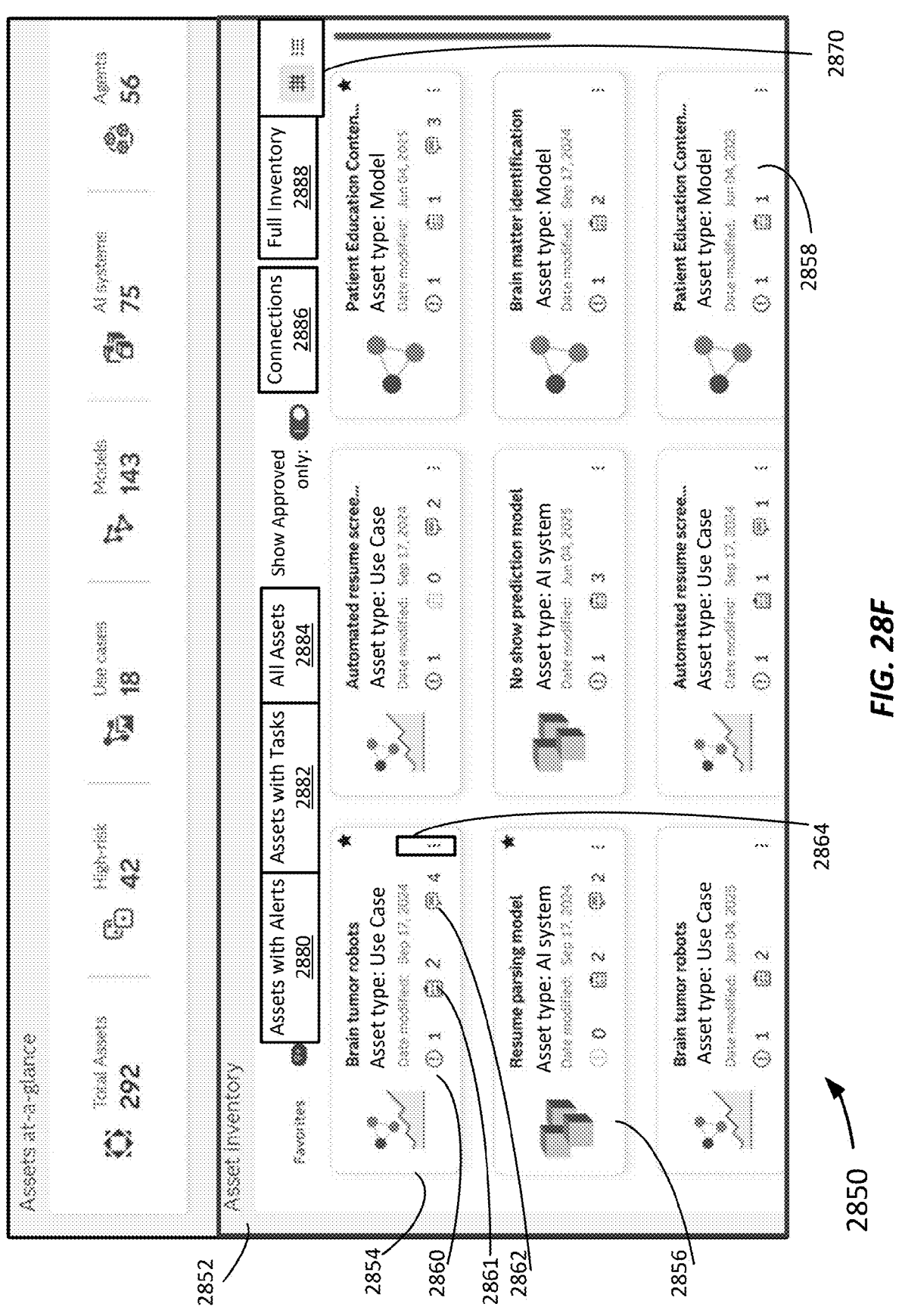
Figure 28G:
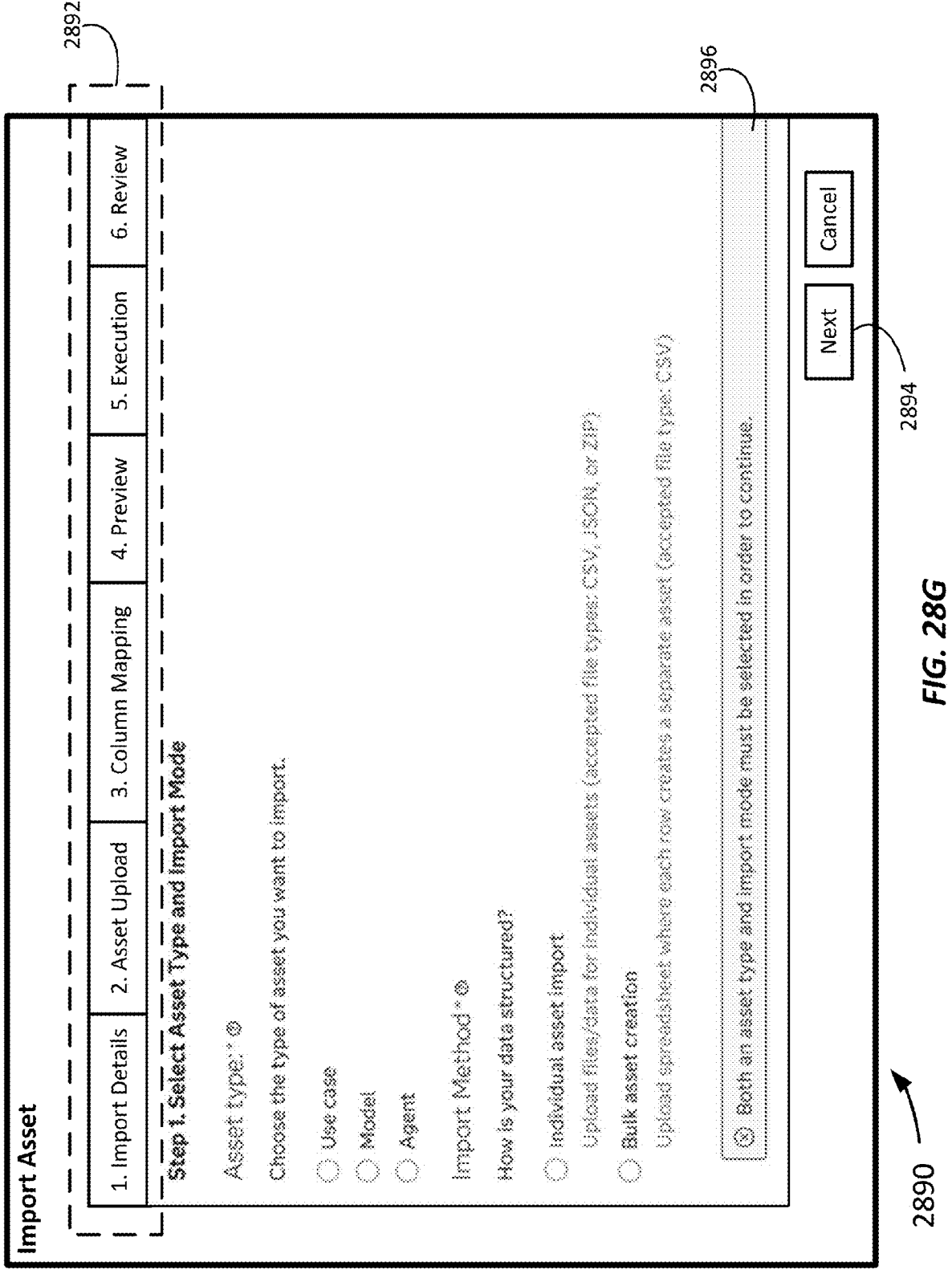
FIG. 28G illustrates a portion of a graphical user interface for importing an asset according to at least one embodiment of the present technology.

FIG. 28G shows an example portion 2890 of a graphical user interface for importing an asset according to an embodiment. An import details page is shown in portion 2890 with guided prompts for importing an asset. Controls such as tabs 2892 or navigation control 2894 can be used to navigate through the prompts (e.g., prompts pertaining to asset upload or column mapping). Additional informational messages (e.g., information 2896) can dynamically appear to ensure required prompts are answered before importing an asset.

In one or more embodiments, the graphical user interface has an interactive graphical representation related to tasks for assets. For instance, FIG. 28E shows a tasks area 2842 in FIG. 28E displaying tasks for completion related to managed assets. For instance, the tasks area can allow a user to see all tasks assigned to the user, all tasks they have created, and/or all tasks they have completed. A user can view a particular task by selecting the task (e.g., by selecting access point 2846 to "open" an associated asset detail page with the task). The interactive graphical representation can display other summarizations related to the assets collectively. For instance, graphical representation 2848 summarizes the total quantity of assets managed and navigable within the navigator interface. Alerts area 2849 can display alert information pertaining to the managed assets. Tasks area 2842 and alerts area 2849 can be specific to an individual member within an organization account or shared amongst members. For instance, if a user has the appropriate permissions, they will be able to see all of the tasks assigned to the users or user groups they have specified.

There are many different types of alerts possible. For instance, alerts could be related to missing information such as missing assessments. For example, there may be required questions that a user has not yet answered for a given asset that are associated with a policy that the asset needs to adhere to. As another example, there could be missing asset owner or asset review overdue by the asset owner. Accountability is important for AI governance. An alert can notify an administrator if an asset does not have an owner associated with it. Alternatively, or additionally, alerts could be related to models or assets deployed without approval. An asset may need approval first for deployment. If the source modeling system connected to the AI Governance Navigator deployed the model without this approval, an alert can notify the user. Alerts could be related to alerts without tasks. When an alert appears for an asset, the next step is to either resolve that alert, or to create a task for another user to resolve this alert. When users create tasks, they can link alerts to those tasks. Alerts for assets that do not yet have any assigned tasks can notify a user (e.g., to encourage them to create a task to address the alert). There could be no linked data. Metadata for assets made available can be useful for governance purposes. If the user has not specified the data used to train and test the model, an alert can notify the user.

Alternatively, or additionally, alerts could be related to failures such as failed monitoring metrics. In some embodiments, users will be able to configure the monitoring metrics and associated thresholds in the source modeling system (e.g., an external system) and monitor those metrics over time (e.g., in an internal system). If one of these thresholds is unmet during a performance monitoring check, an alert can notify the user. In embodiments, a computing system displays monitoring of models and other aspects of assets. A computing system can receive a user-defined metric or threshold for monitoring an asset, and a predefined event for triggering the alert can be predefined according to the user-defined metric or threshold. Alerts could also indicate platform connection failure or a failed finding with a critical priority. Additional or different alerts can be predefined or custom defined for a computing system.

In one or more embodiments, the graphical user interface can display asset specific information regarding managed assets. FIG. 28F shows a portion 2500 of the graphical user interface. The portion 2500 has an interactive graphical representation of "Asset Inventory" 2852, which shows multiple assets in the asset system. For instance, it shows a first asset 2854 pertaining to a use case for a first computer model. It shows a second asset 2856 pertaining to an artificial intelligence system. The artificial intelligence system can include one or more other computer models different than the first computer model or can include a computer model of one or more other assets in the asset system. "Asset Inventory" 2852 includes a third asset 2858 pertaining to a particular computer model. The interactive graphical representation of "Asset Inventory" 2852 could include other or additional assets than these shown (e.g., ones specific to an agent for a computer model).

The "Asset Inventory" 2852 represents the individual assets in an asset tile format although other formats can be available. For instance, the user can toggle to a list or details view using controls 2870. In this example, the asset tiles display some metadata about a given asset viewable directly in the tile. For instance, the tiles show the name of the asset and the asset type directly on the title. Alternatively, or additionally, some metadata is navigable from the tile (e.g., by selecting control 2864). The exact information can differ based on the asset type. For instance, an asset pertaining to use case or AI agents can show policy classification, and an assessment completeness for assessments of the first computer model. As another example, a model or AI system can show model language, metadata completeness, and asset statuses.

Each tile can show the number of alerts associated with that given asset, the number of tasks associated with the asset, and the number of comments associated with each asset. It can also show the user icons for the asset owner and any users that have at least one assigned task. For instance, first asset 2854 shows an alert icon 2860 and a comment icon 2862. In this case there is one alert navigable from the alert icon 2860. Responsive to the alert, the interactive graphical representation could update icon 2861 to have an access point to navigate to one or more task to complete to resolve the alert (in this case two). However, depending on the alert, a task may not be necessarily automatically assigned a task. There are four comments in the electronic record of comments as shown in comment icon 2862.

The "Asset Inventory" 2852 can have one or more filters for interactively changing the quantity and type of tiles displayed. For instance, "Asset Inventory" 2852 can be part of a graphical user interface with portions shown in FIGS. 28A-28D. Other portions can affect "Asset Inventory" 2852. For instance, users can select any of the alert types shown in alerts type area 2808 in FIG. 28A, and the graphical user interface will automatically filter the "Asset Inventory" 2852. Alternatively, or additionally, the table for information 2802, information 2804 and type area 2808 is dynamic and will allow users to choose any of the values or descriptions in associated tables, which will dynamically filter the "Asset Inventory" 2852 to that given selection. Alternatively, or additionally, there is a control 2880 for displaying "assets with alerts" that when selected will show the asset types if those assets have at least one alert. Users can also filter to assets with tasks using control 2882, or they can choose to select all assets using control 2884. Additionally, the current view only has approved assets showing, but this can be toggled to display even unapproved assets.

One or more embodiments will have a control 2886 to allow users to set up an application programing interface (API) connections with external systems external to the computing system (e.g., modeling platforms). Users will be able to perform an initial load of one or more models into AI Governance Navigator (e.g., after configuring a connection to a modeling platform). For instance, the computing system can receive, using the application programming interface, metadata pertaining to a model asset from the external system and register the model asset in the asset system. A new title will appear in the "Asset inventory" 2852. The computing system can update the model asset registered in the asset system based on updates from the external system using the application programing interface. User will be able to configure the information push frequency for loaded models. This connection will support all changes made in the source modeling platform including training, deployment, or monitoring changes and updates.

The control 2888 allows a user to access a full inventory or asset inventory section showing all assets at the user's organization. The full inventory can have additional filters than those shown in the asset inventory section to help users find a particular asset. The full inventory can use one or more filters such as asset type, users with assigned tasks, risk level, applied policy, whether the asset includes Generative AI, deployed or not, and a keyword search. Alternatively, or additionally, "Asset Inventory" 2852 can itself have different filters to control displayed assets.

As shown in FIG. 28F, the computing system shows an alert icon 2860 in association with the first asset 2854. Alerts can be individualized to particular assets. For instance, a computing system can update the navigator interface component to indicate the alert in association with the first asset 2854 but not the second asset 2856 which shows no alerts. Alerts can be responsive to a computing system detecting a predefined event pertaining to the first asset. Responsive to detecting the predefined event, a computing system can generate an alert indicating the predefined event pertaining to the first asset 2854. In embodiments, a computing system can update the navigator interface component to indicate the alert by dynamically updating the navigator interface component to have an access point for a user to navigate to the alert (e.g., by selecting alert icon 2860). If there are no alerts, an alert icon can be in a gray mode indicating there is no access point. For instance, second asset 2856 currently has no alert access points.

Alternatively, or additionally, users can input tasks in the computing system to describe and assign the actions that need to be completed in order to resolve the alert and update tasks area 2842 in FIG. 28E. The computing system can update the navigator interface component to indicate the association with the task and a given asset by updating the interface component to dynamically have an access point for a user to complete the task for resolving the alert (e.g., by selecting access point 2846 to "open" the task).

In one or more embodiments, a computing system can receive, via the navigator interface component, a selection of the first asset via the first interactive graphical representation and display, in the graphical user interface, a second interactive graphical representation specific to the first asset. For instance, FIGS. 29A-29F illustrate portions of a graphical user interface pertaining to an asset (e.g., first asset 2854). Asset detail pages for assets can contain more detailed AI governance information for that asset.

Figure 29A:
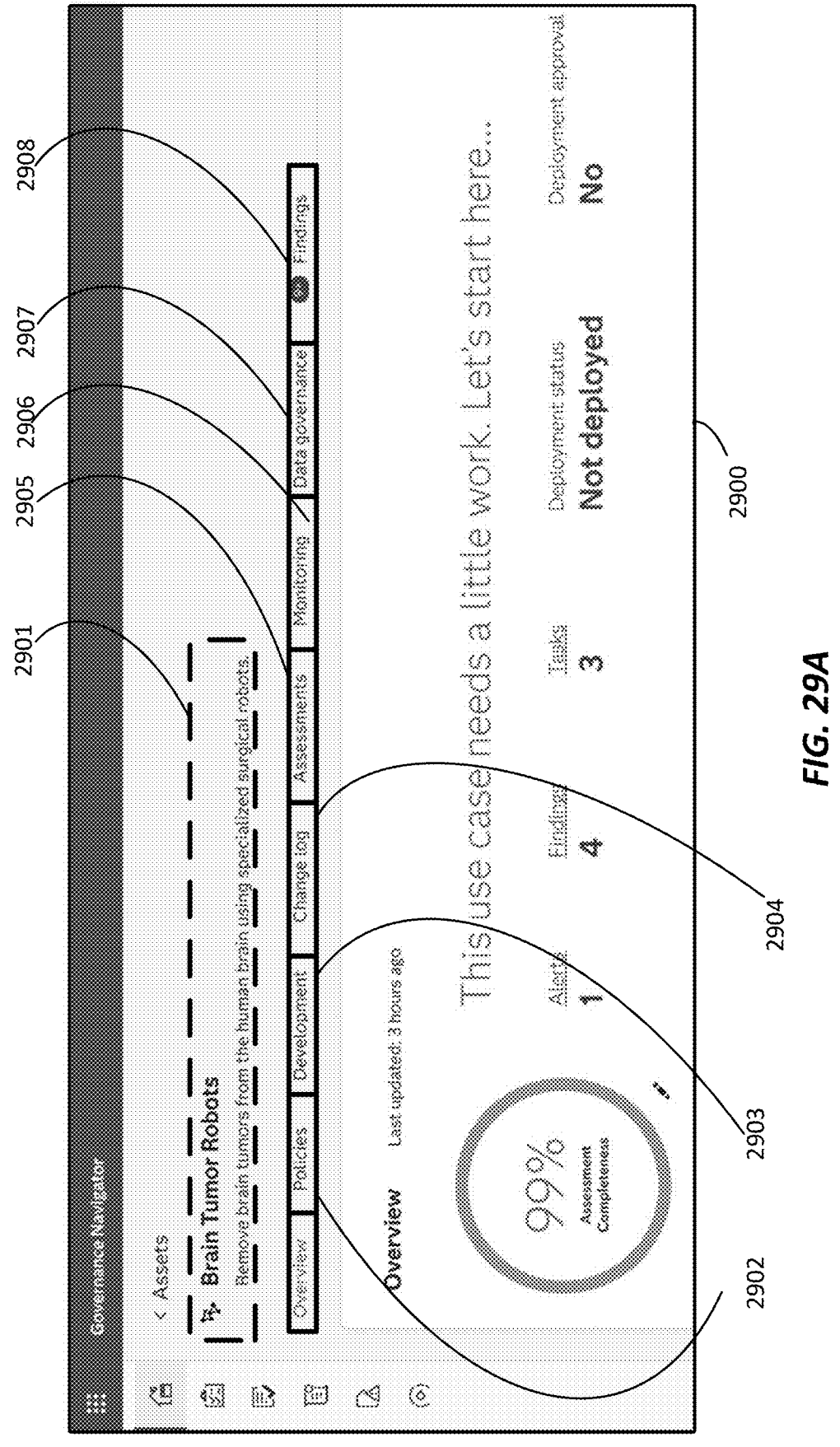
FIGS. 29A-29F illustrate portions of a graphical user interface pertaining to an asset according to at least one embodiment of the present technology.

FIG. 29A shows an example portion 2900 of an interactive graphical representation pertaining to the first asset 2854 as an example (e.g., in an overview view). The first asset is a "use case" asset, but embodiments could apply to other asset types. The portion 2900 has a title area 2901 with the name of the asset and a short description. The overview can provide information regarding alerts or tasks and information for the models used by the assets.

Figure 33A:
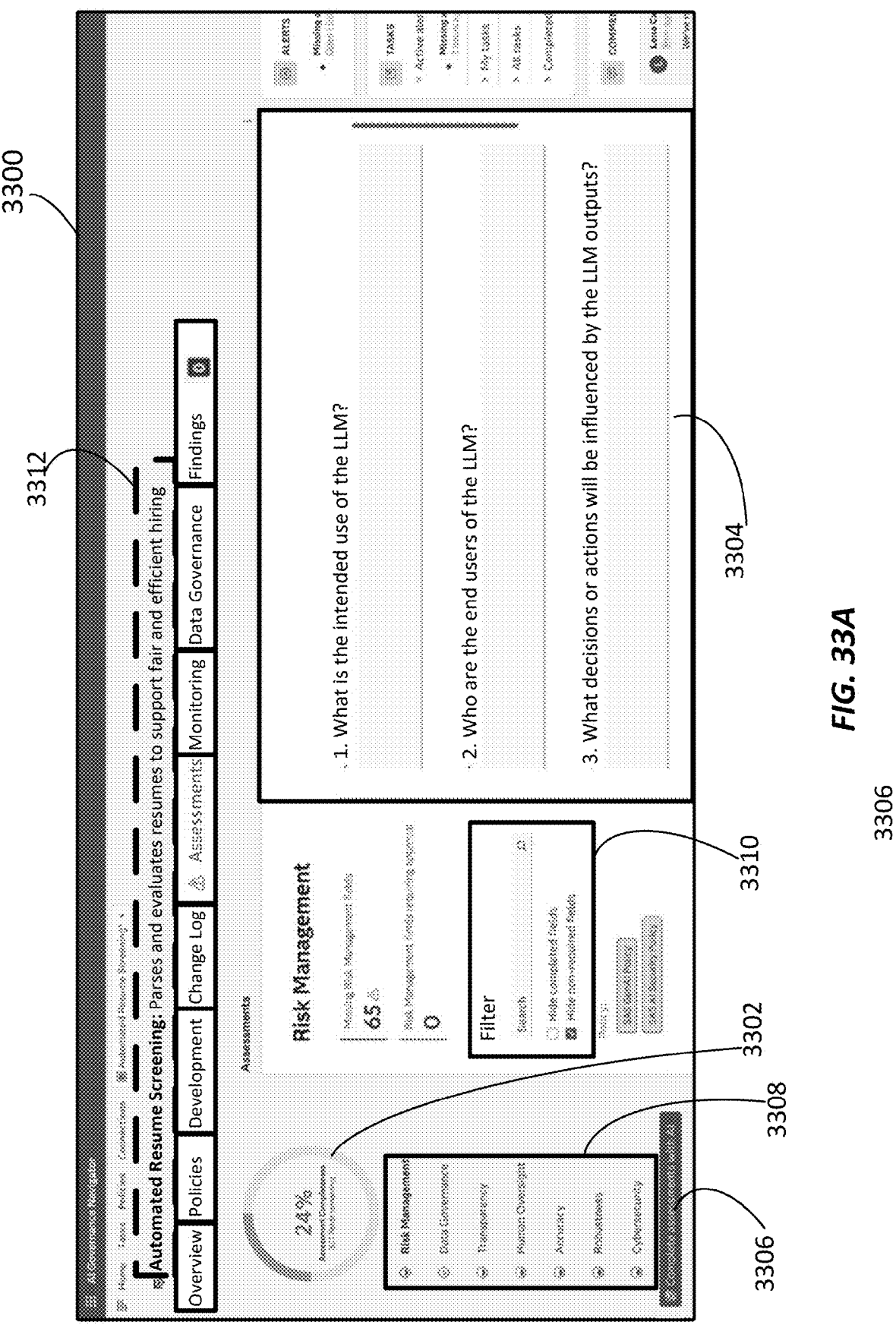
FIGS. 33A-33F illustrate portions of a graphical user interface pertaining to using generative artificial intelligence to synthesize existing organization documentation and populate the corresponding assessment content according to at least one embodiment of the present technology.
Figure 33C:
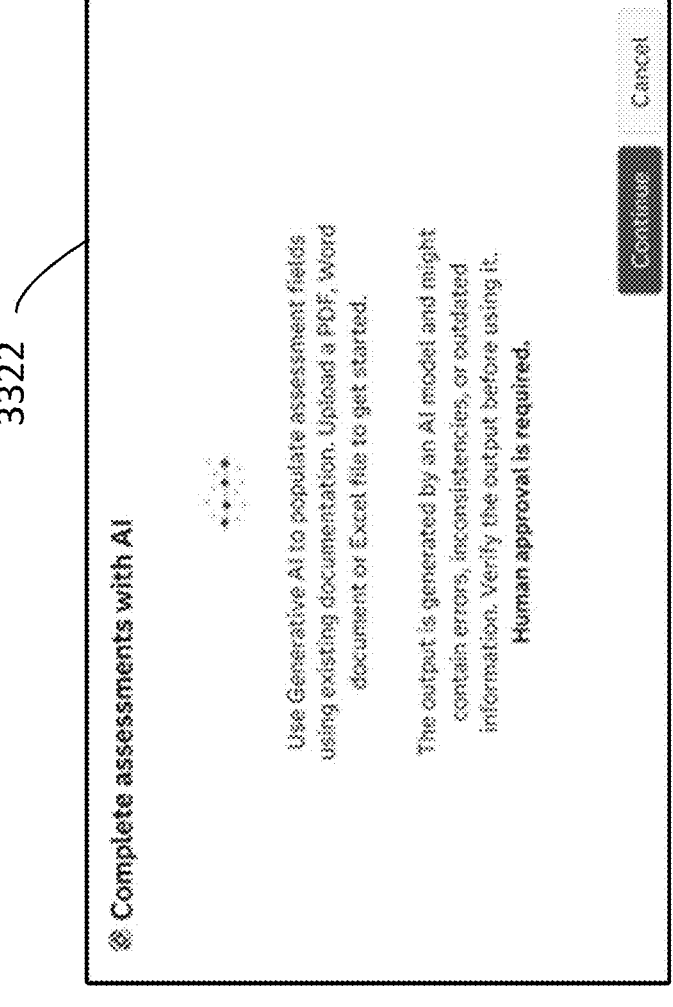
Figure 33B:
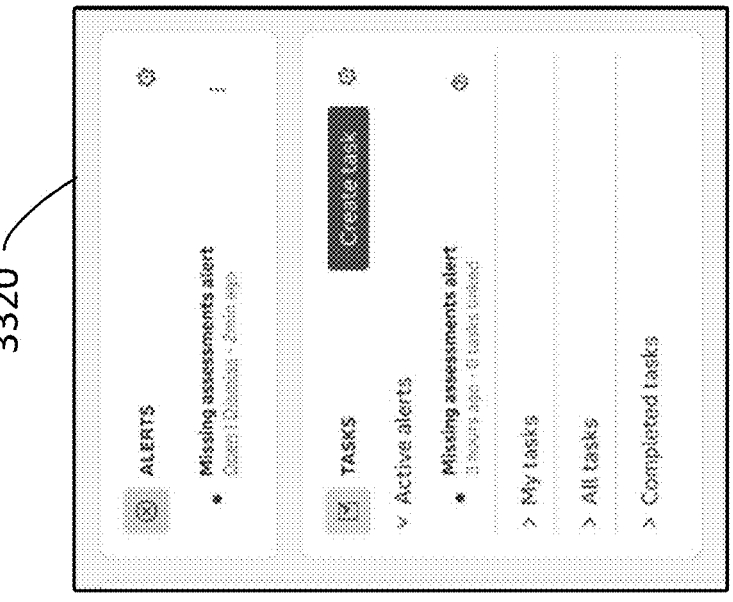

The overview can also provide access points to navigate to additional asset specific information. For instance, "Policies" tab 2902 can navigate to policies pertaining to the asset and/or to choose which policies should apply to an asset. In embodiments, once a computing system applies a policy to the asset, the associated questions for the applied policy can automatically populate in the "Assessments" tab 2905. FIGS. 33A-33C show example graphical user interface for an assessment tab for a different asset. "Development" tab 2903 can include the technical specifications about the model(s) associated with an asset. "Change log" tab 2904 can record changes made to an asset (e.g., the nature of the change, the user who made the change, and when). "Monitoring" tab 2906 can be used to navigate to a monitoring graphical representation that is specific to monitoring the first asset 2854. For instance, embodiments herein describe model cards that can monitor user-defined metric or threshold for a computer model such as one pertaining to the asset. "Data Governance" tab 2907 can include information useful for governance of datasets or models based on datasets. "Findings" tab 2908 can record user findings related to an asset.

In embodiments, "Development" tab 2903 can include the technical specifications about the model(s) associated with an asset in many ways. For instance, because there could be multiple models, there can be a way to toggle between the different models included in the asset. Statistics made available on the relevant data partitions (training, validation, test described herein) from the source modeling platform can be available (e.g., via a dropdown where users will be able to compare the chosen value amongst the data partitions). Alternatively, or additionally, the "Development" tab 2903 can include the list of variables included in the model (e.g., depending on the viewing permissions based on the user). Many organizations will only want the full variable list for a model shown to a key set of stakeholders. Alternatively, or additionally, the "Development" tab 2903 can include space for standard graphs if the source modeling platform has the appropriate data (e.g., confusion matrix, variable importance, other explainability graphs described herein). Alternatively, or additionally, the "Development" tab 2903 can include detailed information about the connection(s) that are sourcing the metadata. Alternatively, or additionally, the "Development" tab 2903 can include an area to describe the tests and sensitivity analyses conducted to ensure model robustness.

In embodiments, "Change log" tab 2904 can be useful for creating an audit trail to support artificial intelligence governance. For instance, a computing system can log automatically one or more of the following actions: creation of an asset, assessment approval, when an alert appears/resolves, policy assignment, policy classification assignment, asset linkages, task creation/resolution, updates to assets or models, and monitoring plan changes.

In embodiments, "Monitoring" tab 2906 can include a monitoring plan for an asset. Any information that is automatically available from a source modeling platform, a computing system can automatically populate. If there is metadata in the source platform that already describes how often a computing system runs performance monitoring, this will populate automatically. One or more embodiments, standardize all model metadata so a computing system can consistently receive reports, regardless of the vendor or model type. Alternatively, or additionally, "Monitoring" tab 2906 can show the list of metrics and their respective alert thresholds, logs or histories of all instances where any of these metrics failed to meet their thresholds, and/or how the computing system pulls information from the source modeling platform (which could be separate from the monitoring frequency). Alternatively, or additionally, "Monitoring" tab 2906 can show the names and details of each source modeling platform and the owner of the modeling process.

In embodiments, "Data Governance" tab 2907 can include questions that users need to answer about the data used to train the model(s) related to the assets. Alternatively, or additionally, users can associate an asset with a data source (e.g., if a computing system did not do this automatically when loading the asset). Alternatively, or additionally, "Data Governance" tab 2907 can display dataset metadata. If there are multiple models/datasets used for an asset, the display can toggle between the datasets'/models' metadata. Users can supply information about individual datasets or models such as fields related to metadata, governance, privacy, modification, and/or provenance. The computing system allows configuring of required fields or questions such as individualized settings for domain, asset type, geography, or policy classification.

Users can use "Findings" tab 2908 to document their own discoveries about an asset. These findings could be issues with the asset, and/or they could also be results for the testing of the asset. When a user creates a finding, they can classify the finding type and/or set a priority level (using default or user-defined types and levels). These finding types and levels can be associated with alerts. For instance, if the finding receives a "critical" priority, then this can automatically trigger attaching an alert to an asset. When a finding is filed, there is also an optional document upload the user can use that can include more detail about that finding. The "Findings" tab 2908 can display information icon letting others know a quantity or degree of findings (e.g., a count of findings or a warning if some are a "critical" priority).

One or more embodiments include less or additional tabs for asset specific information than those specifically shown. For instance, there can be an "Asset Relationships" tab where users will select which assets relate to one another. Alternatively, or additionally, tabs can be referred to differently. For instance, "Policies" tab 2902 can be referred to as "Applied Policies".

Figure 29B:
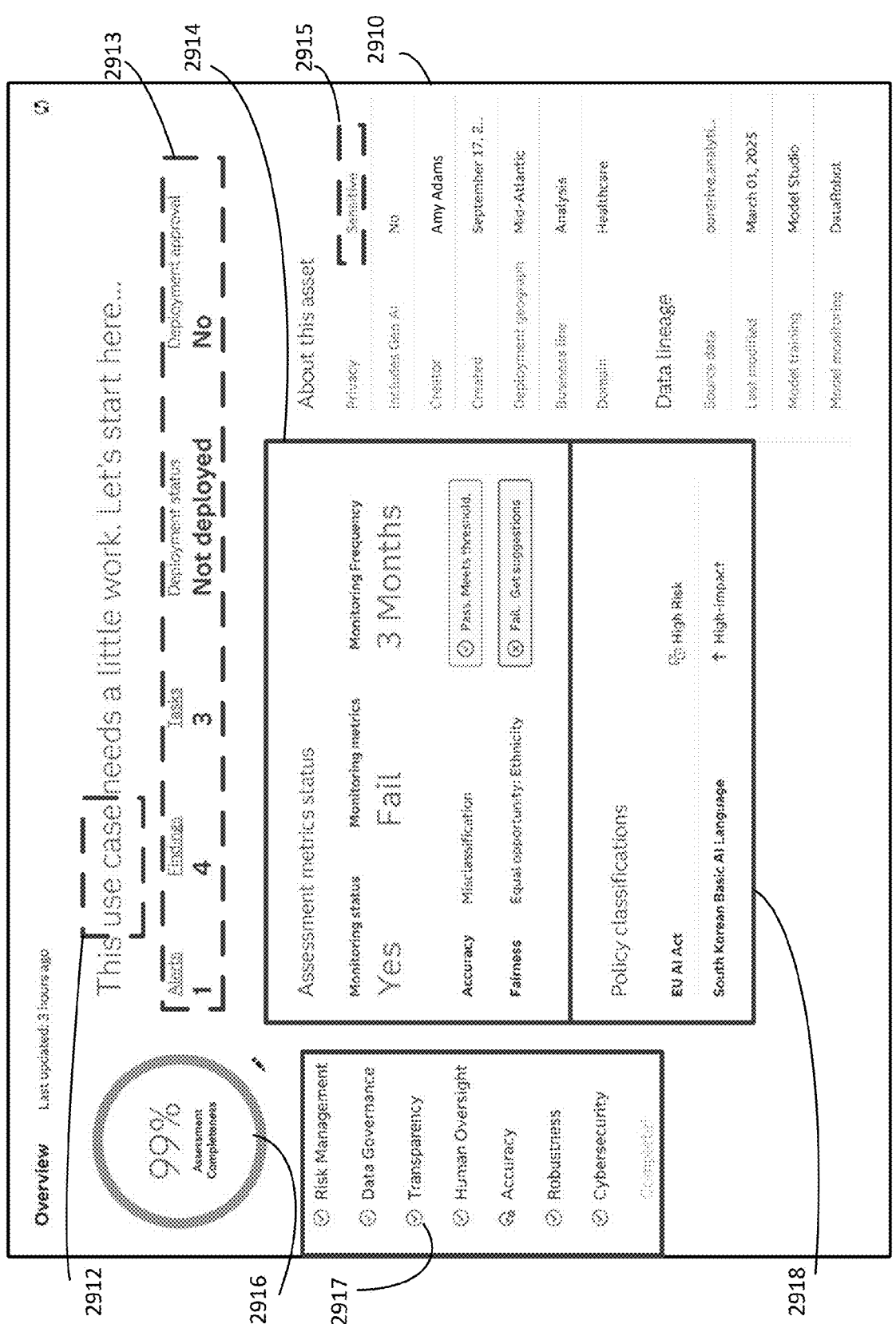

FIG. 29B shows an interactive graphical representation pertaining to the first asset 2854 (e.g., on overview tab shown in portion 2900 of FIG. 29A). For instance, it includes an asset type 2912 ("use case"), summary information 2913, a policy classification (e.g., policy classifications portion 2918), and an assessment completeness for assessments of the first computer model (e.g., assessments icon 2916). For instance, a policy classification could shows which policies this asset adheres to and/or how this particular asset classifies as it relates to each policy. For example, the policy classification, could indicate a risk level (e.g., high risk) or an impact level (e.g., high impact) given the policy terms. As shown in policy classifications portion 2918, an individual asset can have multiple policies associated with it. In this example, a computing system applies two policies: the European Union (EU) AI Act and the South Korean Basic AI Law. In embodiments, a user manually applies an associated policy classification. Alternatively, or additionally, a Generative AI tool can assist users in selecting the appropriate policy classification based on the details of their asset. In this example, the policy classifications were "High risk" and "High-impact" for respective policies.

In this example, summary information 2913 shows quantities of alerts, findings, and tasks, as well as deployment status, and deployment approval status. The computing system can display additional or different information to summarize the asset. For instance, the computing system can instead of "deployment status" have an "asset stage" or instead of "deployment approval" refer to it as "approval status".

Assessments icon 2916 can be specific to particular topic categories for assessment questions according to the policies. Users can select question topic categories in topics area 2917 to navigate to that specific section on the "Assessments" tab 2905. The topics area 2917 can itself be a graphical representation. For instance, the green icon indicates that the assessment questions are complete and approved, the blue icon indicates that the questions are partially complete, and the red icon indicates that none of the questions are complete.

In this example, assessment metrics area 2914 shows metrics. For instance, it could indicate whether a computing system is actively monitoring the asset or underlying model and how often. In this case the monitoring status is "Yes", and the monitoring frequency is every three months. Alternatively, or additionally, it can specify metrics configured for performance monitoring and whether the configured metrics are at acceptable thresholds per the monitoring plan. In this case that includes accuracy assessments and fairness assessments with the former passing a set threshold. Metrics that have not met the configured threshold can have an interactive alert and task in proximity. For instance, fairness indicator has a "Get Suggestions" control which will allow users to use Generative AI to retrieve recommendations on how to resolve the alert in question via suggestions.

The computing system can determine a privacy classification characterizing the asset and display it in the graphical representation in proximity to the interactive graphical representation concerning a specific asset. For instance, privacy classification 2915 shows a label indicating a privacy classification of "sensitive" under "About this asset". The label could be based on a user specification for a dataset or received from a user's source system characterizing a dataset. Other assets could have different privacy classification as described herein (e.g., private, sensitive, and candidate).

In one or more embodiments, the computing system determines a privacy classification based on information a user has provided. For instance, a computing system could receive the information during registration of an asset in the asset system. Alternatively, or additionally, the computing system could receive the information during registration of a model. For instance, the use case could pertain to a trained computer model trained on a training dataset. The asset privacy classification can be based on privacy classification applied to any of the variables included in the associated models. Alternatively, or additionally, this privacy designation is determined based on whether there are variables in the model that have a certain classification per the information privacy classification rules in Information Catalog as described in more detail herein. The computing system generates a label for a privacy classification indicating a private or a sensitive aspect of one or more variables used for the model terms in the trained computer model. Where there are multiple different privacy classifications, a computing system can apply, for instance, the "most severe" classification to the asset. A computing system's ability to assign a privacy status to assets is broader than privacy classification simply to a model, which can be helpful feature when assessing privacy of assets.

Other information can be provided about the asset in portion 2910 such as one or more indicators for whether the asset includes Generative AI, the creator of the asset, the creation date, the deployment geography, the business line, the domain, the name and location of the source data, the last modified date for the data, the platform used to train the associated model(s), the platform used to monitor the associated model(s), etc. Embodiments advantageously provide asset-specific pages reachable from a navigator interface.

Figures 29C, 29D, 29E:
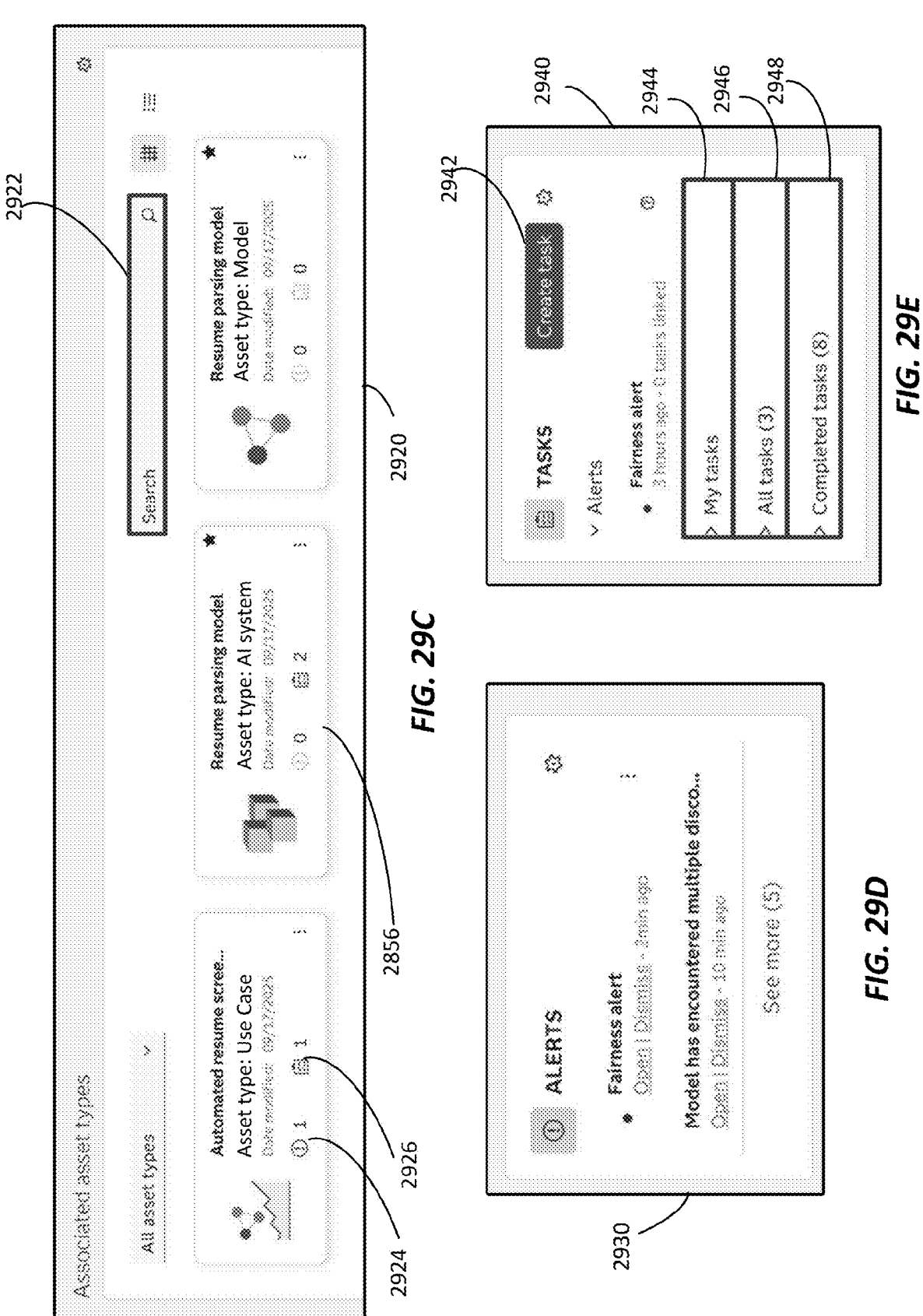

Additionally, embodiments provide computing systems that can create relationships between assets, which the asset-specific pages reflect (e.g., relationships between AI assets such as use cases, AI systems, AI agents and models). FIG. 29C illustrates an association navigation element 2920 indicating an association between the first asset and other assets (e.g., second asset 2856). Even though this association navigation element 2920 is part of an interactive graphical representation of the first asset 2854 and is specific to the first asset 2854, it can graphically represent a connection first asset 2854 has with the second asset 2856. Alternatively, or additionally, search bar 2922 can receive input for searching for additional assets. For instance, in embodiments, an interactive graphical representation specific to an asset can include a connection control element for connecting one or more assets of the plurality of assets (e.g., by searching for additional assets to associate in association navigation element 2920). An asset connected using the connection control element can then be displayed in an association navigation element for both assets. Any alerts or comments for a related asset would then be displayed on each association navigation element and navigable directly from the associated asset. For instance, alert icon 2924 and comment icon 2926 are shown in the association navigation element 2920 for a different asset. A computing system can represent assets in association navigation element 2920 in the same format as those on the asset system pages (e.g., as described with respect to FIG. 28F), or a different format. For example, this particular format does not show comments within the tile view.

The interactive graphical representation can keep an alerts log of alerts (and their types) specific to the particular asset (i.e., the use case) as shown in alerts area 2930 of FIG. 29D. The interactive graphical representation can also keep an electronic record of tasks completed or needing to be completed specific to an asset. For instance, FIG. 29E illustrates a task control element 2940 for controlling any tasks specific to management of an asset (e.g., first asset 2854). In embodiments, the task control element 2940 receives task(s) for resolving alerts and an association with a given task and a given asset. Asset specific pages can be linked to system pages such that changes in one affect changes in the other. For instance, in response to receiving a task or update to a task in task control element 2940, the navigator interface component can be updated to indicate the association with the task and a given element (e.g., by updating task area 2842 in FIG. 28E).

In embodiments, a computing system can associate the task and an asset with a particular user account of the computing system, and update the graphical user interface herein to indicate the association with the task, the asset, and the user account. For example, a computing system can display particular tasks associated with a user account in the "My tasks" area 2944 and other tasks not associated with the user account in the "All tasks" area 2946. "Completed tasks" area 2948 can show completed tasks. Alternatively, or additionally, a user can create a task using control 2942 and associate it with a particular user account. In embodiments, a user can create a task either for themselves or for another user. A computing system can link the alerts that are associated with this asset to assigned tasks. A single alert can have multiple, assigned tasks.

Figure 29F:
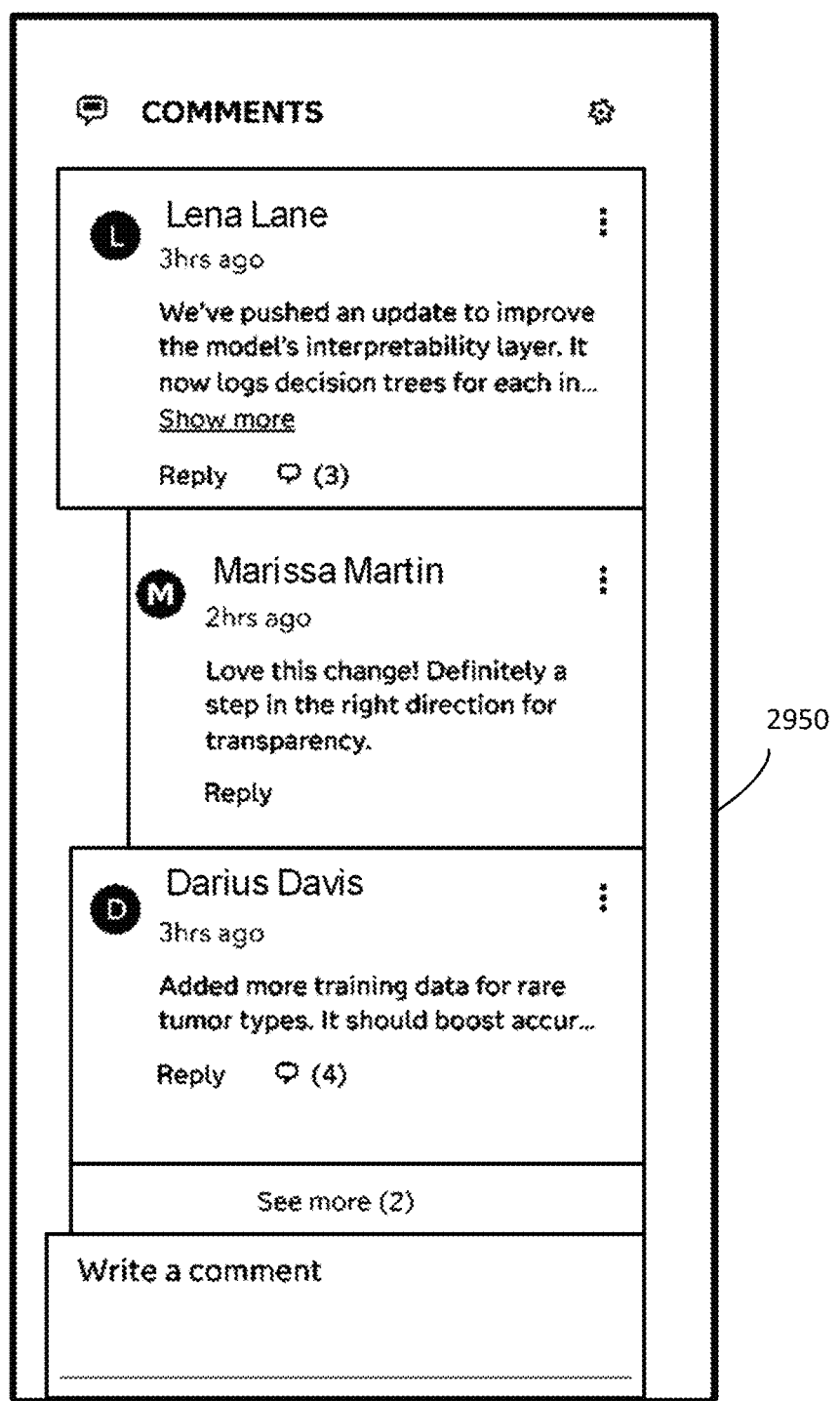

The interactive graphical representation can keep an electronic record of comments. FIG. 29F shows a comments area 2950 with comments specific to ones pertaining to a specific asset (i.e., the use case). The comments area 2950 can be useful in allowing team communication about the asset where a task may not be necessary or generated, but it may still be useful to have communication about the asset for tracking over time. For instance, the computing system can support "mentions," and notify users in the platform when they are mentioned in a comment.

One or more embodiments display additional or different, information or access points to information, pertaining to an asset or a model that the asset pertains than those specifically shown in FIGS. 29A-29E. For instance, the interactive graphical representation specific to an asset can indicate a model card visualization associated with a model for the asset (e.g., a model card visualization described herein). For instance, the model card visualization can include textual and graphical representations of a computer model and a training dataset for training the computer model. As another example, there can be an option to create a report that provides key information for the asset (e.g., using content configured by a user or summarized view of different tabs).

In embodiments, alerts reference herein can be related to policies for the assets (e.g., missing information concerning the policies). One or more embodiments use artificial intelligence to complete assessments for assets (e.g., to resolve alerts). For instance, FIG. 30 illustrates a flow diagram of a method 3000 for artificial interface control. The method 3000 includes an operation 3001 for displaying in a graphical user interface, a policy graphical representation that is specific to a policy for the first asset. The policy graphical representation comprises an input field for an assessment for the policy and an artificial intelligence control for generating a computer-generated response for the assessment.

The method 3000 includes an operation 3002 for receiving, using the artificial intelligence control, an indication to generate a computer-generated response for the assessment for the policy (e.g., for missing information). The method 3000 includes an operation 3003 for generating the computer-generated response for the assessment.

The method 3000 includes an operation 3003 for updating, based on the computer-generated response, the navigator interface component to remove the alert in proximity to the first asset. The alert pertains to the assessment for the policy.

Figure 31A:
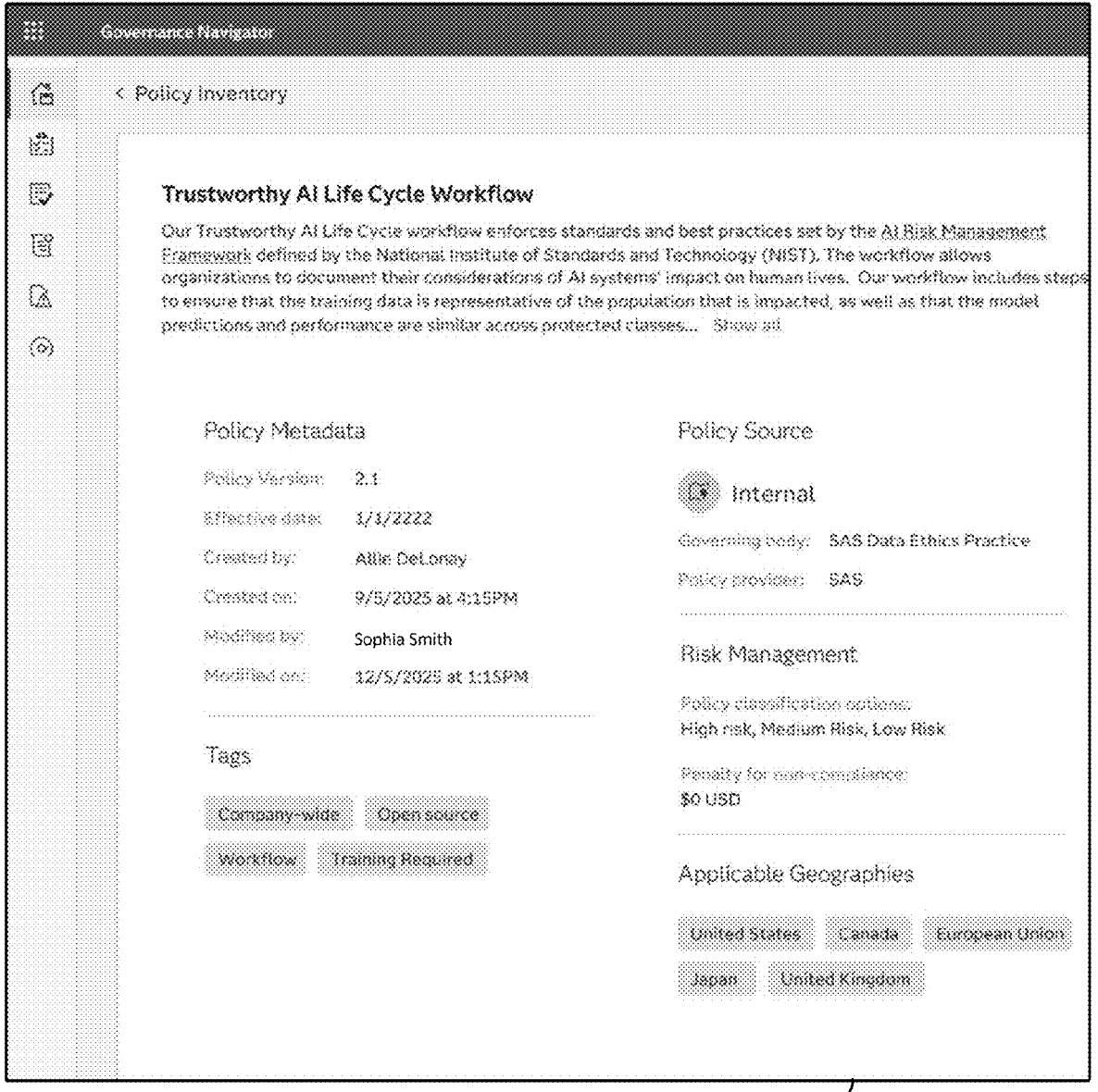

In one or more embodiments, a computing system can obtain, via a graphical user interface, a first policy for one or more assets (e.g., first asset 2854, second asset 2856, and/or third asset 2858). FIGS. 31A-31C illustrate portions of a graphical user interface pertaining to a computer model policy for application to an asset of an asset system. FIG. 31A shows an example policy. In this case, it was a policy created internally with different policy classification options under the policy such as ("High risk, Medium Risk, and Low Risk" with no penalties for noncompliance). The policy only applies to specific geographic areas (e.g., United States, Canada, European Union, Japan, and the United Kingdom). A computing system can then link a policy to a particular asset. For example, FIG. 31B shows example linked use cases to different available policies.

In one or more embodiments, a policy can primarily consist of a set of questions where some of the questions apply at the artificial intelligence asset (local) level and/or some of the questions will apply at the organization (global) level. In embodiments, a user can upload a file (e.g., a CSV file) with specific column names to provide an assessment.

For instance, the columns could include one or more of policy name, question text, question topic, required indicator, required for high risk only, and answer type (such as text, multiple choice, yes/no, true/false). Policies can also include other policy level metadata such as geographics, internal/external policy indicator, domain/industry, version, date created/updated.

FIG. 31C shows a policy file 2150 for a given policy. For instance, this policy file 3150 has a "Question" column 3151 that has questions related to whether technology qualifies as an AI system under different definitions such as the EU AI Act and As a General-Purpose AI model. It is possible that two different assets, even with the same policy, can have different predefined events or different events triggered. For instance, it may be available in model documentation whether an asset pertaining to an AI system meets the EU AI Act (e.g., generated from sources pertaining to the AI system). However, there may not be information as to whether the definition applies to an asset related to a use case. In this case, a computing system can detect a predefined event related to missing information for the asset related to the use case.

The policy file 3150 has a "Required" column 3152 indicating whether to generate an alert and/or task if the question is unanswered. For instance, if there are questions that particularly resonate for the user from a policy that the asset does not need to adhere to, a user can add any questions that are available in the main question repository for the product (i.e., all questions for all configured policies). In addition to manually adding questions, users with appropriate permissions will also be able to remove questions from the assessments tab that they do not think are necessary or needed for this specific asset.

The "Level" column 3153 indicates whether it is an organizational or individual level question. As shown in "Topic" column 3154, questions can be associated with a topic. In embodiments there can be a default list of question topics (e.g., "accuracy and robustness", "data management", and "model performance"). Alternatively, or additionally, embodiments allow the user to delete or add other topic categories that are applicable for their industry and the policies they configure.

"Classification" column 3155 allows specifications of classifications based on the answers (e.g., what would constitute "high risk"). In one or more embodiments, configured policies can be uploaded to a repository that can be shared with other users outside the organization (e.g., using a GITHUB™ page). Embodiments provide automated mechanism that allow organizations to create their own policies or modify retrieved policies. For instance, embodiments can allow users to dynamically choose question topics/categories for ease of use and make assessments more intuitive for the user (e.g., for assessments icon 2916 and topics area 2917 in FIG. 29B). Embodiments also allow users to add any available policy pack question from the repository to any given artificial intelligence asset, even if that policy does not apply to the asset.

Figure 32A:
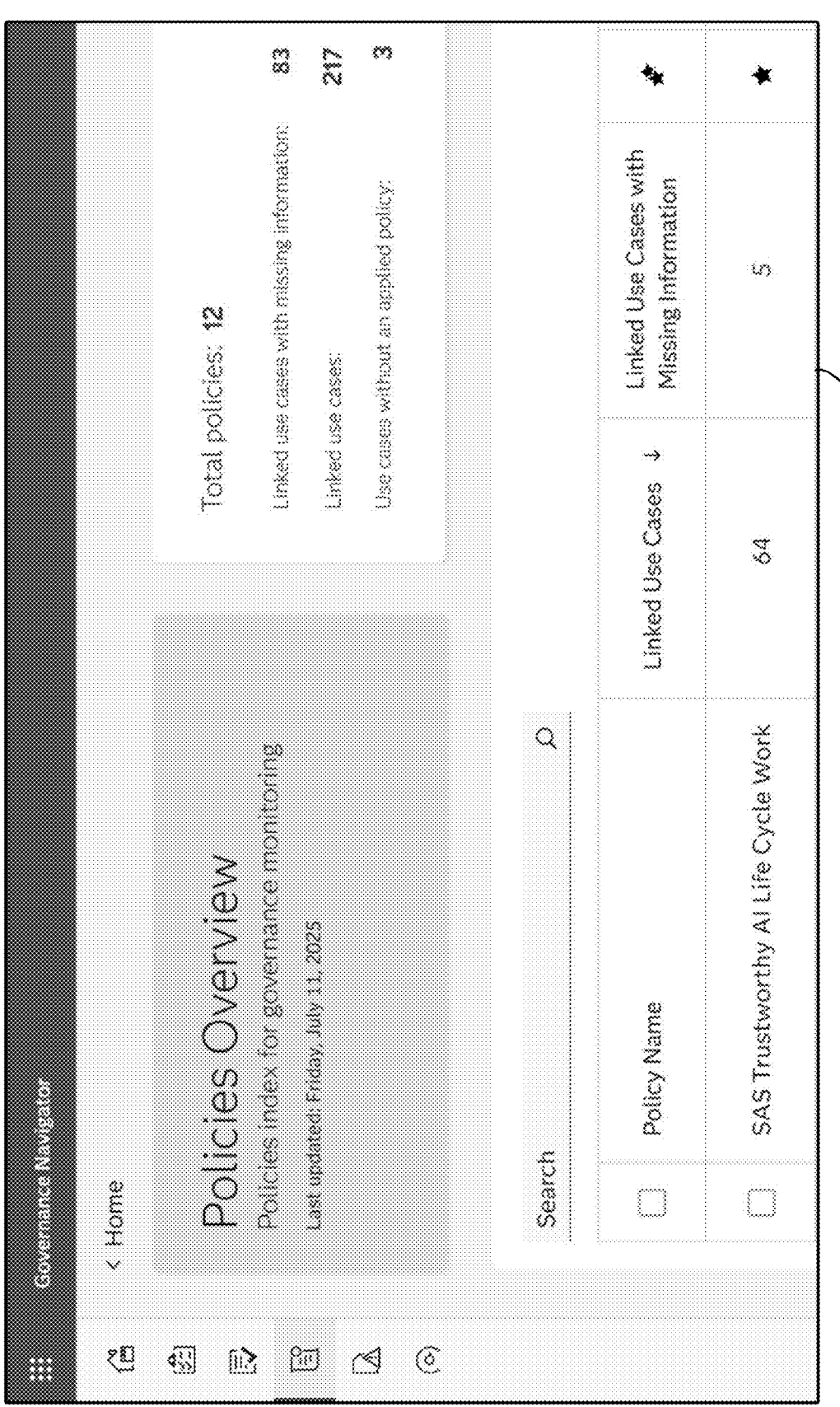
FIGS. 32A-32C illustrate portions of a graphical user interface pertaining to a policy system for an asset system according to at least one embodiment of the present technology.
Figure 32B:
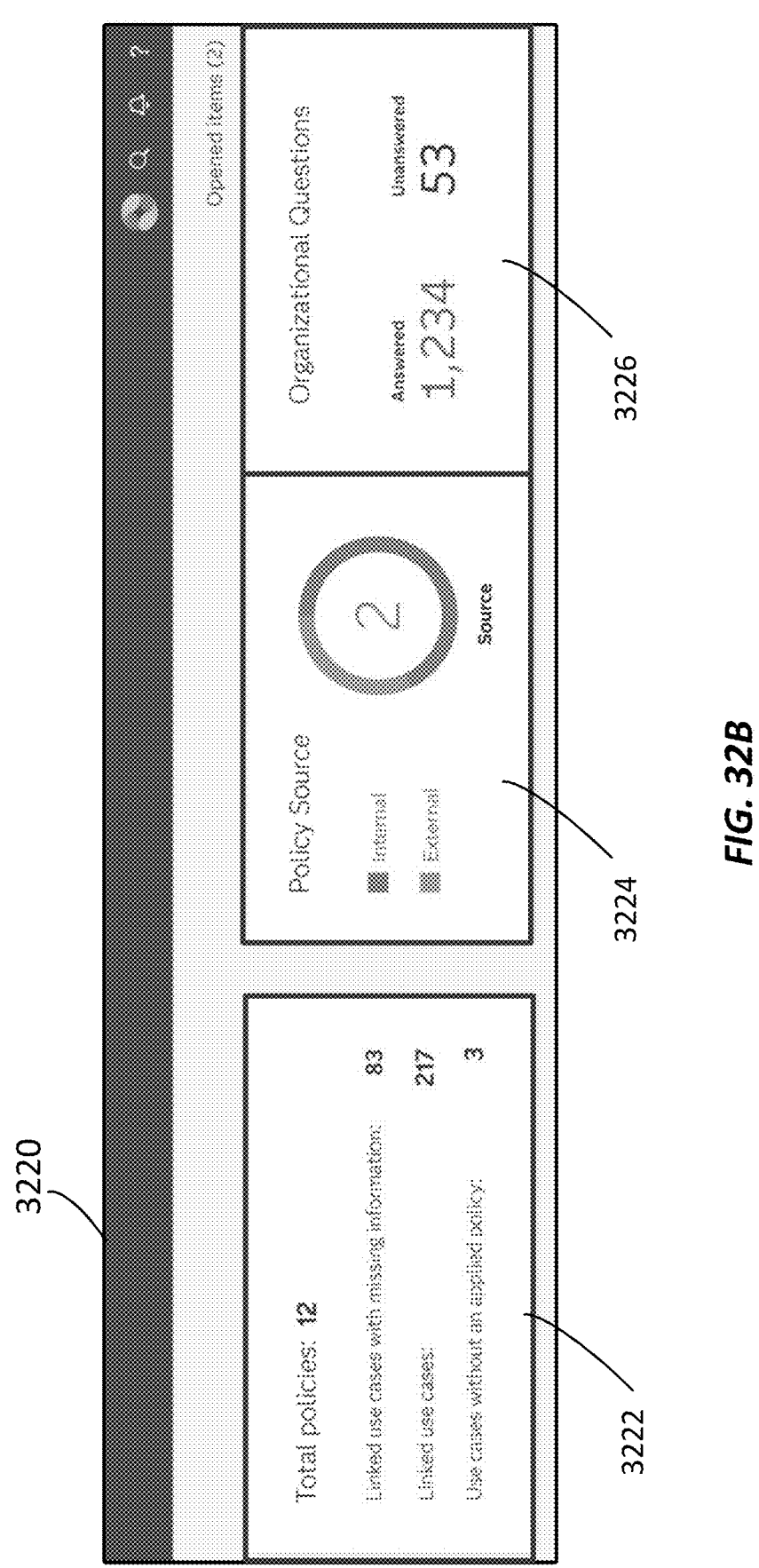
Figure 32C:
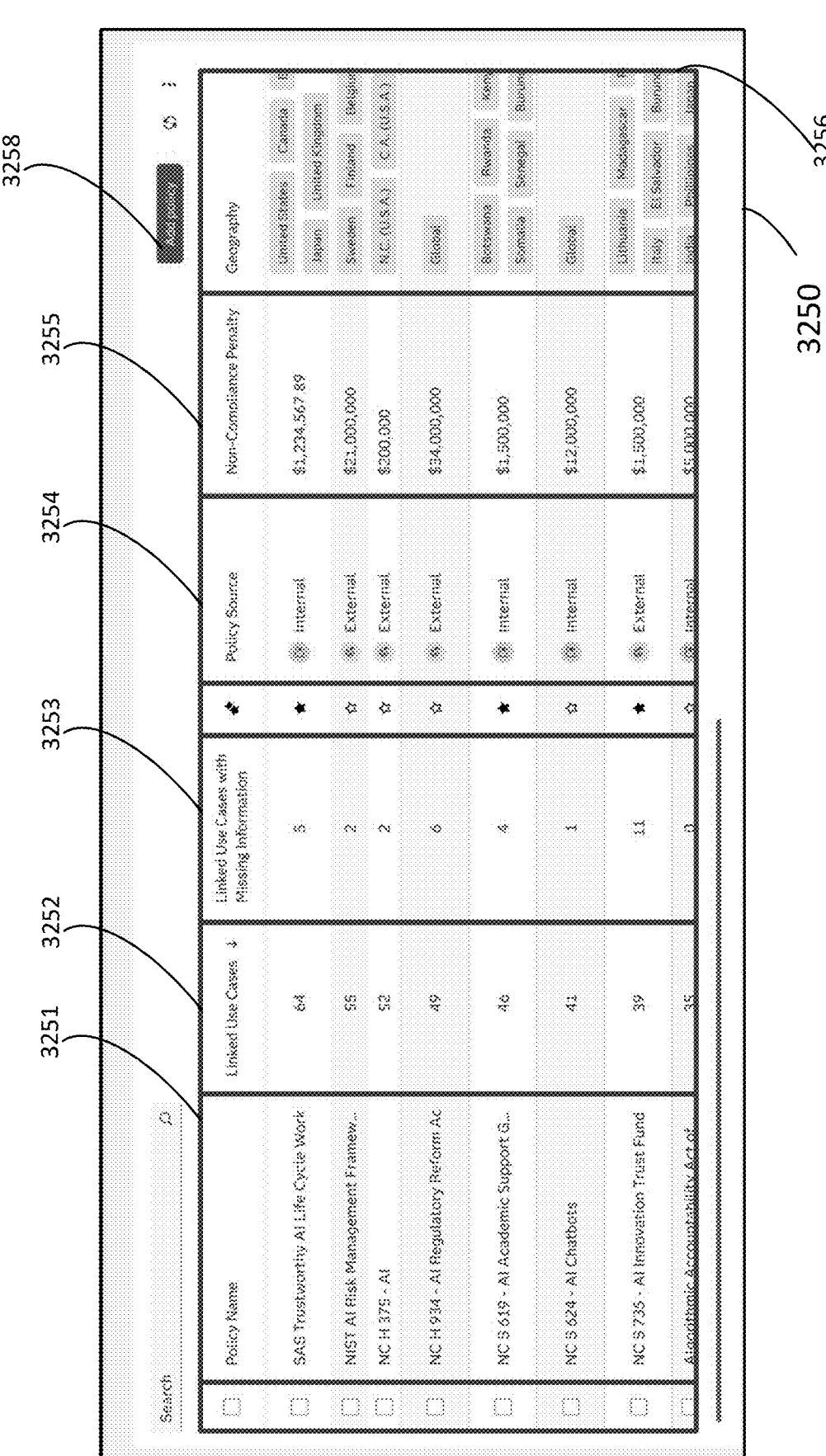

FIGS. 32A-32C illustrate portions of a graphical user interface pertaining to a computer model policy system for an asset system. FIG. 32A shows a portion 3200 of a graphical user interface. The portion 3200 shows a policies overview page where users can search for policies and upload and configure their own policies. For instance, portion 3200 shows the example policy of FIG. 31A applied or linked to 64 use cases. FIG. 32B shows an interactive graphical representation 3220 of a summary of policies for managed assets. As shown in policy summary area 3222 there can be multiple policies for managed assets, and several, different assets can share those policies. Policy source graphical representation 3224 shows that the policies can be from external systems external to a computing system or internal systems of the computing system. For instance, an external system external to the computing system can determine a policy for assessments for a model different than the model associated with assets of the system. The computing system can import and associate a model with a particular policy. When this happens, some questions in the policies may be unanswered and the computing system can detect a predefined event responsive to associating the asset with the imported policy (e.g., missing information for questions). Graphical representation 3220 is interactive in that it will update responsive to added policies or when assessments are missing. For instance, area 3226 shows a summary of answered and unanswered organizational level questions.

FIG. 32C shows a portion 3250 of the specific policies displayed in an interactive graphical user interface of FIG. 32A. For example, column 3251 shows specific policy names, and column 3252 shows totals of asset linked to the particular policy.

In one or more embodiments, a computing system can generate an additional policy to add to this collection and associate the additional policy with a given asset by selecting control 3258 to add a policy. This can be useful when the additional policy has one or more assessments for an asset different than an existing policy associated with the asset. However, those assessments can be incomplete, and the computing system detects one or more events responsive to associating the first asset with the additional policy. For instance, column 3253 shows policies with linked use cases with missing information. A computing system can generate the additional policy internally or import it from an external system. Column 3524 shows different policy sources. Policies can also have additional summarized assessment information such as non-compliance penalties shown in column 3255 and geographic scope of the policy shown in column 3256.

In one or more embodiments, Generative AI can be useful for assisted assessment and model documentation (e.g., to resolve missing information). FIGS. 33A-33F illustrate portions of a graphical user interface pertaining to using generative artificial intelligence to provide model assessment and documentation.

FIG. 33A illustrates a portion 3300 of a graphical user interface pertaining to assessment for an asset. A title area 3312 identifies the asset name and description. In this example, the computing system receives a policy for the asset. Questions area 3304 displays questions associated with the policies linked to the asset. A computing system can group and display questions by topic. For example, the questions shown pertain to a "Risk Management" topic with a displayed tag proximate to the question. A computing system displays assessments according to a policy in a policy graphical representation. The policy graphical representation in this example includes a graphical representation 3302 indicating a degree of completion of multiple assessments for the policy. In some embodiments, questions area 3304 can additionally have controls so users will be able to mark answers as complete which will indicate the answer is "ready for approval." Graphical representation 3302 can include as completed only those "approved" as complete.

Graphical representation 3302 allows a user to know which topics have questions that still need to be populated and approved and to select dynamically a topic. Selecting a topic in topics area 3308 can mean the questions area 3304 filters to see the remaining questions for that section and/or the graphical representation 3302 updates to see the overall completion percent and the total number of questions that need to be populated for a topic. Filter area 3310 provides an example filtering function that allows a user to only see questions that are missing, and/or to filter to required questions only. There is also a search field to help users find a question of interest. These tools can be helpful for navigating amongst polices with many questions where there can be dozens of questions that need answers.

In embodiments, a computing system responsive to missing assessment(s) detects a predefined event pertaining to missing assessment(s) according to the policy. In one or more embodiments, a computing system can use artificial intelligence to synthesize user documentation to complete missing assessments (e.g., by selecting control 3306). For instance, by selecting control 3306, a user can upload model documentation that could answer many of the questions in questions area 3304. For instance, a fine-tuned language learning model (LLM) can process the information in provided document(s) and then populate the answers to the questions in the questions area 3304.

FIG. 33B shows a portion 3320 of a graphical user interface indicating alerts for "missing assessments" and tasks for "missing assessments" generated responsive to the missing assessments.

FIG. 33C shows a graphical user interface 3322 for providing guided prompts for updating the assessment fields responsive to selecting artificial intelligence to complete assignments. For instance, the guided prompts may allow for uploading existing documentation for an artificial intelligence model to use to complete the assessments.

Figure 33D:
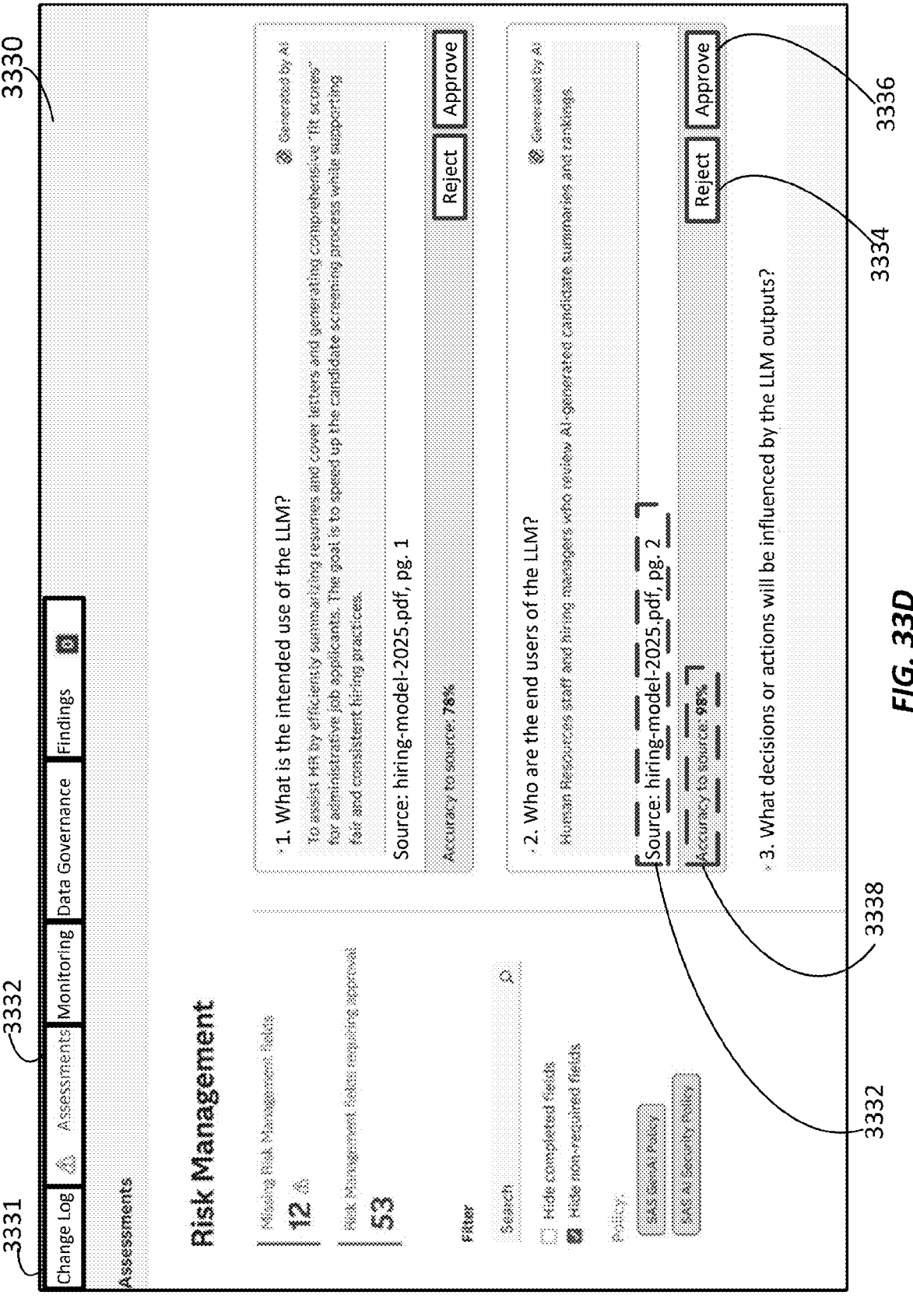

FIG. 33D shows a portion 3330 of a graphical user interface after the computing system has generated the computer-generated response for assessment(s) (e.g., using control 3306). The computer-generated response indicates one or more sources for the computer-generated response and indicates a likelihood of accuracy of the computer-generated response. For instance, assessment for question 2 shows a source 3332 for the answer based on a particular pdf and a page of that pdf. Sources could also include other policies. For instance, if there are multiple policies that include similar questions, Generative AI can map those related questions together to make it easier for users to more quickly populate all assessment questions that apply to a given asset.

In one or more embodiments, a computing system receives an indication to accept the computer-generated response. For instance, in this case the user can select to "approve" the AI generated assessment using control 3336. Alternatively, or additionally, the user can "reject" the AI generated assessment using control 3334. Responsive to either control, the computing system can create an audit trail with the user and time stamp logged (e.g., "Change log" tab 3331 can show a user who approved and time of approval). In this example, a user approves individual questions, but in other embodiments, there can be a top-level question approval process that approves all answers. The computing system can allow configuration of the approval process (e.g., by an administrator). Having a user approval process can ensure provided answers are accurate. Tabs described herein can also show status information. For instance, "Assessments" tab 3332 shows a warning symbol indicating that there are still assessments missing or needing of approval.

In one or more embodiments, a graphical user interface displays an accuracy score (e.g., accuracy score 3338). For instance, for a LLM generated answer, the accuracy to source score represents the percent of content in the answer directly pulled from the model document. This gives the user a sense of whether the LLM is hallucinating (i.e., a low score would indicate that a computing system hallucinated a large portion of the content because the content did not come from the model document). For lower accuracy scores, the user can then use the source comment (e.g., source 3332) associated with the answer to tell the user which document this content came from and where in the document that content came from. This will make it easier for reviewers to reference the original document to confirm the results are accurate.

Responsive to the selections (e.g., indications to accept the computer-generated response), the computing system can update the degree of completion of the multiple assessments.

Figures 33E, 33F:
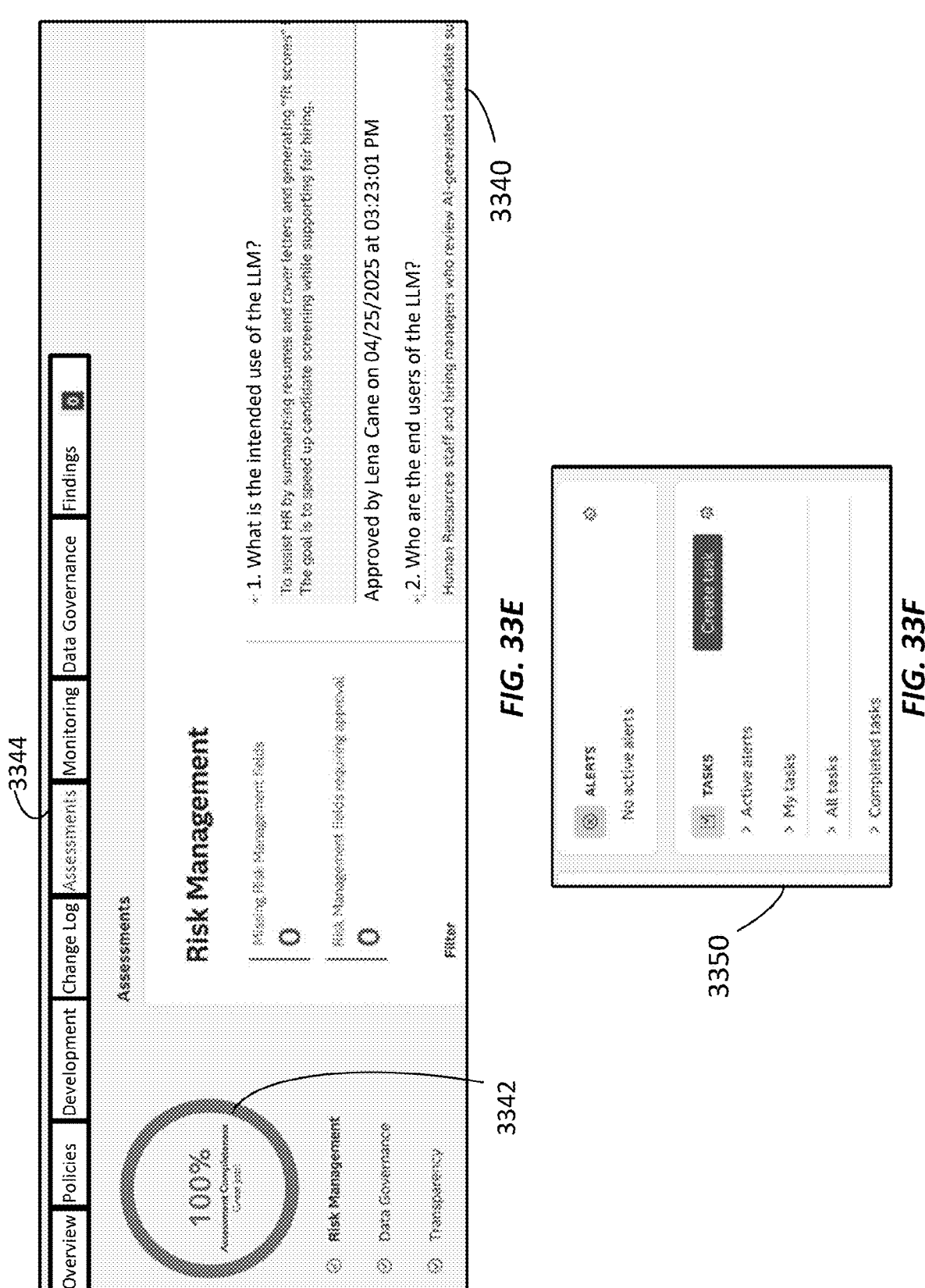

FIG. 33E shows a portion 3340 of a graphical user interface in which the user has selected all the AI-generated assessments. Graphical representation 3342 shows 100 percent completion of assessments in response. The computing system has cleared any alerts associated with incomplete question answers. For instance, "Assessments" tab 3344 no longer shows a warning symbol as did "Assessments" tab 3332 in FIG. 33D.

FIG. 33F shows a portion 3350 of a graphical user interface showing that the computing system has cleared all alerts by displaying the message "No active alerts".

In one or more embodiments, various tabs can have a "Create Report" control which will allow users to configure and generate an electronic document from information referenced on the tabs (e.g., a PDF or word file). For instance, with respect to the "Assessments" tab 3344, users can decide which policies they would like represented in the output document. When a computing system generates the output document, it can reorganize the questions, so it is sorted by policy instead of by topic category. Embodiments provide improved methods for reporting and resolving assessments specific to an asset related to an asset management system.

What is claimed is:

1. A computer-program product tangibly embodied in a non-transitory machine-readable storage medium, the computer-program product including instructions operable to cause a computing system to:

display a graphical user interface comprising a navigator interface component for navigating an asset system, wherein the asset system comprises a plurality of assets;

wherein the plurality of assets includes a first asset pertaining to a use case for a first computer model and a second asset pertaining to an artificial intelligence system for one or more other computer models different than the first computer model; and wherein the navigator interface component comprises a first interactive graphical representation of the first asset and the second asset;

detect a predefined event pertaining to the first asset;

responsive to detecting the predefined event, generate an alert indicating the predefined event pertaining to the first asset;

update the navigator interface component to indicate the alert in association with the first asset, and not the second asset, in the first interactive graphical representation;

receive, via the navigator interface component, a selection of the first asset via the first interactive graphical representation;

display, in the graphical user interface, a second interactive graphical representation specific to the first asset, wherein the second interactive graphical representation of the first asset comprises:

association navigation element indicating an association between the first asset and the second asset;

a task control element for controlling any tasks specific to management of the first asset; and receive, using the task control element:

a task for resolving the alert; and an association with the task and the first asset; and update the navigator interface component to indicate the association with the task and the first asset.

2. The computer-program product of claim 1, wherein the instructions are operable to cause the computing system to:

update the navigator interface component to indicate the alert by dynamically updating the navigator interface component to have an access point for a user to navigate to the alert; and update the navigator interface component to indicate the association with the task and the first asset by updating the interface component to dynamically have an access point for a user to complete the task for resolving the alert.

3. The computer-program product of claim 1, wherein the instructions are operable to cause the computing system to further obtain, via the graphical user interface, a first policy for the first asset;

wherein the predefined event pertains to the first asset and not the second asset according to the first policy; and wherein the second interactive graphical representation of the first asset is specific to the first asset and graphically represents a connection it has with the second asset.

4. The computer-program product of claim 1, wherein the first interactive graphical representation and the second interactive graphical representation of the first asset collectively include an asset type, a policy classification, and an assessment completeness for assessments of the first computer model.

5. The computer-program product of claim 1, wherein the first interactive graphical representation includes an asset type, a model language for the one or more other computer models different than the first computer model, and a metadata completeness indication for metadata related to the artificial intelligence system.

6. The computer-program product of claim 1, wherein the first interactive graphical representation and second interactive graphical representation indicate an electronic record of comments or tasks completed related to the first asset.

7. The computer-program product of claim 1, wherein the navigator interface component further displays a graphical representation indicating one or more of:

a degree of assets of the plurality of assets currently in use;

a degree of assets that are of a high risk status for use; and a degree of assets with predefined events.

8. The computer-program product of claim 1, wherein the instructions are operable to cause the computing system to:

associate the task and the first asset with a user account of the computing system; and update the navigator interface component to indicate the association with the task, the first asset, and the user account.

9. The computer-program product of claim 1, wherein the instructions are operable to cause the computing system to:

determine a privacy classification for variables associated with the first computer model to which the first asset pertains; and display a graphical representation of the privacy classification in proximity to the second interactive graphical representation of the first asset.

10. The computer-program product of claim 1, wherein the first asset pertaining to the first computer model, pertains to a trained computer model trained on a training dataset; and wherein the instructions are operable to cause the computing system to:

generate a label for a privacy classification indicating a private or a sensitive aspect of one or more variables used for model terms in the trained computer model; and display a graphical representation of the privacy classification depicting the label.

11. The computer-program product of claim 1, wherein the instructions are operable to cause the computing system to:

receive, via the graphical user interface, a policy for the first asset;

wherein the predefined event pertains to one or more missing assessments according to the policy; and wherein the task is related to providing a missing assessment of the one or more missing assessments.

12. The computer-program product of claim 1, wherein the instructions are operable to cause the computing system to:

display in the graphical user interface, a policy graphical representation that is specific to a policy for the first asset, wherein the policy graphical representation comprises an input field for an assessment for the policy and an artificial intelligence control for generating a computer-generated response for the assessment;

receive, using the artificial intelligence control, an indication to generate a computer-generated response for the assessment for the policy;

generate the computer-generated response for the assessment; and update, based on the computer-generated response, the navigator interface component to remove the alert in proximity to the first asset, wherein the alert pertains to the assessment for the policy.

13. The computer-program product of claim 12, wherein the instructions are operable to cause the computing system to:

display in the policy graphical representation an indication of a degree of completion of multiple assessments for the policy, wherein the assessment is one of the multiple assessments;

generate the computer-generated response for the assessment, wherein the computer-generated response indicates one or more sources for the computer-generated response and indicates a likelihood of accuracy of the computer-generated response;

receive an indication to accept the computer-generated response; and update the degree of completion of the multiple assessments, responsive to the indication to accept the computer-generated response.

14. The computer-program product of claim 1, wherein the predefined event pertaining to the first asset is a default predefined event for missing information;

wherein the missing information is related to an owner approval for deploying or reviewing an asset, or related to metadata related to training or testing the first computer model; and wherein the task is related to providing the missing information.

15. The computer-program product of claim 1, wherein the instructions are operable to cause the computing system to:

display in the graphical user interface, a monitoring graphical representation that is specific to monitoring the first asset; and receive, a user-defined metric or threshold for monitoring the first asset; and wherein the predefined event is predefined according to the user-defined metric or threshold.

16. The computer-program product of claim 1, wherein the instructions are operable to cause the computing system to:

receive a first policy from an external system external to the computing system, wherein the first policy indicates assessments for a model different than a model associated with the assets of the plurality of assets;

associate the first asset with the first policy; and detect the predefined event responsive to associating the first asset with the first policy.

17. The computer-program product of claim 16, wherein the instructions are operable to cause the computing system to:

generate by the computing system a second policy;

associate the second policy with the first asset, wherein the second policy has one or more assessments for the first asset different than the first policy; and detect one or more events responsive to associating the first asset with the second policy.

18. The computer-program product of claim 1, wherein the instructions are operable to cause the computing system to:

display in the navigator interface component, or the second interactive graphical representation that is specific to the first asset, a connection control element for connecting one or more assets of the plurality of assets;

connect, using the connection control element, the first asset to a third asset of the plurality of assets; and display on a third interactive graphical representation for the third asset an indication of the alert indicating the predefined event pertaining to the first asset.

19. The computer-program product of claim 1, wherein the instructions are operable to cause the computing system to:

receive an indication to set up an application programming interface connection with an external system external to the computing system;

receive, using the application programming interface, metadata pertaining to a model asset from the external system;

register the model asset in the asset system; and update the model asset registered in the asset system based on updates from the external system using the application programing interface.

20. The computer-program product of claim 1, wherein the plurality of assets comprise:

a third asset that is a second computer model;

a fourth asset that is an agent for executing an action for a third computer model; and wherein the first computer model, the second computer model, the third computer model are different from each other.

21. The computer-program product of claim 1, wherein the instructions are operable to cause the computing system to:

wherein the second interactive graphical representation of the first asset indicates a model card visualization associated with the first computer model; and wherein the model card visualization comprises textual and graphical representations of the first computer model and a training dataset for training the first computer model.

22. A computer-implemented method comprising:

displaying a graphical user interface comprising a navigator interface component for navigating an asset system, wherein the asset system comprises a plurality of assets;

wherein the plurality of assets includes a first asset pertaining to a use case for a first computer model and a second asset pertaining to an artificial intelligence system for one or more other computer models different than the first computer model; and wherein the navigator interface component comprises a first interactive graphical representation of the first asset and the second asset;

detecting a predefined event pertaining to the first asset;

responsive to detecting the predefined event, generating an alert indicating the predefined event pertaining to the first asset;

updating the navigator interface component to indicate the alert in association with the first asset, and not the second asset, in the first interactive graphical representation of the first asset;

receiving, via the navigator interface component, a selection of the first asset via the first interactive graphical representation;

displaying, in the graphical user interface, a second interactive graphical representation specific to the first asset, wherein the second interactive graphical representation of the first asset comprises:

association navigation element indicating an association between the first asset and the second asset;

a task control element for controlling any tasks specific to management of the first asset; and receiving, using the task control element:

a task for resolving the alert; and an association with the task and the first asset; and updating the navigator interface component to indicate the association with the task and the first asset.

23. The computer-implemented method of claim 22, wherein the computer-implemented method further comprises:

updating the navigator interface component to indicate the alert by dynamically updating the navigator interface component to have an access point for a user to navigate to the alert; and updating the navigator interface component to indicate the association with the task and the first asset by updating the interface component to dynamically have an access point for a user to complete the task for resolving the alert.

24. The computer-implemented method of claim 22, wherein the computer-implemented method further comprises obtaining, via the graphical user interface, a first policy for the first asset;

wherein the predefined event pertains to the first asset and not the second asset according to the first policy; and wherein the second interactive graphical representation of the first asset is specific to the first asset and graphically represents a connection it has with the second asset.

25. The computer-implemented method of claim 22, wherein the computer-implemented method further comprises:

determining a privacy classification for variables associated with the first computer model to which the first asset pertains; and displaying a graphical representation of the privacy classification in proximity to the second interactive graphical representation of the first asset.

26. The computer-implemented method of claim 22, wherein the first asset pertaining to the first computer model, pertains to a trained computer model trained on a training dataset; and wherein the computer-implemented method further comprises:

generating a label for a privacy classification indicating a private or a sensitive aspect of one or more variables used for model terms in the trained computer model; and displaying a graphical representation of the privacy classification depicting the label.

27. The computer-implemented method of claim 22, wherein the computer-implemented method is implemented by a computing system and further comprises:

receiving a first policy from an external system external to the computing system, wherein the first policy indicates assessments for a model different than a model associated with the assets of the plurality of assets; and associating the first asset with the first policy; and wherein detecting the predefined event comprises detecting the predefined event responsive to associating the first asset with the first policy.

28. The computer-implemented method of claim 22, wherein the computer-implemented method further comprises:

displaying in the navigator interface component, or the second interactive graphical representation that is specific to the first asset, a connection control element for connecting one or more assets of the plurality of assets;

connecting, using the connection control element, the first asset to a third asset of the plurality of assets; and displaying on a third interactive graphical representation for the third asset an indication of the alert indicating the predefined event pertaining to the first asset.

29. The computer-implemented method of claim 22, wherein the computer-implemented method is implemented by a computing system and further comprises:

receiving an indication to set up an application programming interface connection with an external system external to the computing system;

receiving, using the application programming interface, metadata pertaining to a model asset from the external system;

registering the model asset in the asset system; and updating the model asset registered in the asset system based on updates from the external system using the application programing interface.

30. A computing device comprising processor and memory, the memory containing instructions executable by the processor wherein the computing device is configured to:

display a graphical user interface comprising a navigator interface component for navigating an asset system, wherein the asset system comprises a plurality of assets;

wherein the plurality of assets includes a first asset pertaining to a use case for a first computer model and a second asset pertaining to an artificial intelligence system for one or more other computer models different than the first computer model; and wherein the navigator interface component comprises a first interactive graphical representation of the first asset and the second asset;

detect a predefined event pertaining to the first asset;

responsive to detecting the predefined event, generate an alert indicating the predefined event pertaining to the first asset;

update the navigator interface component to indicate the alert in association with the first asset, and not the second asset, in the first interactive graphical representation of the first asset;

receive, via the navigator interface component, a selection of the first asset via the first interactive graphical representation;

display, in the graphical user interface, a second interactive graphical representation specific to the first asset, wherein the second interactive graphical representation of the first asset comprises:

association navigation element indicating an association between the first asset and the second asset;

a task control element for controlling any tasks specific to management of the first asset; and receive, using the task control element:

a task for resolving the alert; and an association with the task and the first asset; and update the navigator interface component to indicate the association with the task and the first asset.

\* \* \* \* \*